US005617528A

United States Patent [19]
Stechmann et al.

[11] Patent Number: 5,617,528
[45] Date of Patent: Apr. 1, 1997

[54] METHOD AND APPARATUS FOR INTERACTIVELY CREATING A CARD WHICH INCLUDES VIDEO AND CARDHOLDER INFORMATION

[75] Inventors: Jonathan H. Stechmann, Minneapolis; Joel T. Powell, Delano; Loren Nyflot, Richfield, all of Minn.

[73] Assignee: DataCard Corporation, Minneapolis, Minn.

[21] Appl. No.: 384,401

[22] Filed: Feb. 6, 1995

Related U.S. Application Data

[63] Continuation-in-part of Ser. No. 192,042, Feb. 4, 1994, abandoned.
[51] Int. Cl.$^6$ ...................................................... G06K 15/00
[52] U.S. Cl. ........................................... 395/326; 358/540
[58] Field of Search ................................... 395/133, 137, 395/139, 155, 161, 600; 364/468; 358/500, 538, 540

[56] References Cited

U.S. PATENT DOCUMENTS

| 4,675,746 | 6/1987 | Tetrick et al. | 358/269 |
| 4,687,526 | 8/1987 | Wilfert | 156/64 |
| 4,873,643 | 10/1989 | Powell et al. | 364/468 |
| 5,075,769 | 12/1991 | Allen et al. | 358/500 |

OTHER PUBLICATIONS

"QuikWorks™ Image Capture Station: Installation and Technical Reference Manual," Datacard Corporation, pub., Jan. 1994.

*Primary Examiner*—Thomas G. Black
*Assistant Examiner*—John C. Loomis
*Attorney, Agent, or Firm*—Merchant, Gould, Smith, Edell, Welter & Schmidt, P.A.

[57] ABSTRACT

A card creation apparatus including a microprocessor which controls operation of the card creation apparatus based on a predetermined card design that specifies positions on a planar surface of a card for layout frames of a video picture and cardholder information fields which are to be printed on the card is provided. An input mechanism is operatively coupled to the microprocessor to input a plurality of user commands and cardholder information corresponding to the cardholder information fields. A video camera is operatively coupled to the microprocessor to obtain a video picture of a subject. A display is operatively coupled to the microprocessor to display an image of the predetermined card design including the video picture and cardholder information within the predetermined card design substantially as can be printed in response to one user command of the plurality of user commands. A method of creating a card also is provided.

48 Claims, 64 Drawing Sheets

FIG. 11

User Privileges

Full Name

Login Name

Password

Confirm Password

☐ Card Design  ☐ Security
☐ Link Design  ☐ Log Files
☐ Database Design ☐ Configuration
☐ Production OK    Select All    Help...    Cancel

User Privileges

Full Name: John Doe
Login Name: DOE
Password: *******

☒ Card Design    ☐ Security
☐ Link Design    ☐ Log Files
☐ Database Design   ☐ Configuration
☒ Production

[DELETE]    [Help...]    [Cancel]

FIG. 13

Database Design

Field Name: [    ]

Field Type
- ○ Character  ○ Auto Increment
- ○ String     ○ Logical
- ○ Integer    ○ Date
- ○ Long       ○ Currency
               ○ Image

Length [0]    Decimal Places [0]

☐ Not Null
☐ Unique

[Delete Field]   [Add a Field]

114

| Field Name | Length | Field Type | Key | No Nulls | Decimals |
|---|---|---|---|---|---|
| | | | | | |
| | | | | | |

116

[Previous]  [Help...]  [Done]  [Cancel]  [Next]

FIG. 18

Database Design

Field Name: ☐

Field Type
- ○ Character  ○ Auto Increment
- ○ String     ○ Logical
- ○ Integer    ○ Date
- ○ Long       ● Currency
              ○ Image Length: [0]   Decimal Places: [0]

☐ Not Null
☐ Unique

[Delete Field]    [Add a Field]

| Field Name | Length | Field Type | Key | No Nulls | Decimals |
|---|---|---|---|---|---|
| NAME | 20 | Character | TRUE | FALSE | |
| STREET ADDRESS | 20 | Character | TRUE | FALSE | |
| CITY | 10 | Character | TRUE | FALSE | |
| STATE | 2 | Character | TRUE | FALSE | |
| ZIP | 5 | Integer | TRUE | FALSE | |

[Next] [Previous]    [Help...]    [Done] [Cancel]

FIG. 19

Database Design

Field Name: [      ]     Length [0]     Decimal Places [0]

Field Type:
- ○ Character
- ○ String
- ● Integer
- ○ Long
- ○ Auto Increment
- ○ Logical
- ○ Date
- ○ Currency
- ○ Image ☐ Key
☐ Not Null

[Delete Field]     [Add a Field]     [Update Field]

| Field Name | Length | Field Type | Not | Key | Dec |
|---|---|---|---|---|---|
| FIRSTNAME | 20 | Character | TRUE | FALSE | 0 |
| LASTNAME | 20 | Character | TRUE | FALSE | 0 |
| STREET | 10 | Character | TRUE | FALSE | 0 |
| CITY | 2 | Character | TRUE | FALSE | 0 |
| ZIP | 5 | Integer | FALSE | FALSE | 0 |

[Help...]     [Cancel]

[Done]

Production Query

Database Tables
EMPLOYEE

Database Fields
ADDRESS
CITY
EMPLNUMBER
FIRSTNAME
LASTNAME
PHONE
ZIP

Query Builders

| Select | Where |
| From | For |
| Exists | Having |
| Group By | Order By |
| All | District |
| Between | Like |
| Match | Unique |

Attributes

| < | = | ! | AND |
| > | % | - | OR |
| ( | × | / | IN |
| ) | + | - | NOT |
| .. | . | ? | AS |

Query Statement
Select EMPLOYEE.FIRSTNAME, EMPLOYEE.LASTNAME From EMPLOYEE

[OK] [Cancel] [Help...]

Barcode Type

Barcode Available
- ○ UPC-A
- ○ UPC-E
- ○ EAN/JAN 13
- ○ EAN/JAN 8
- ○ CodeBar
- ○ Code 39
- ○ Extended 39
- ○ MIS Plessey
- ○ Code 93
- ○ Extended 93
- ○ WC 128
- ○ HIBC
- ○ Int. 2 of 5
- ○ Code 128
- ○ Zip+4 PostNet ☐ Has a Check sum

[OK]  [Cancel]

FIG. 36

Enter Barcode Sample

Enter Barcode Sample Data

[OK]  [Cancel]

Link Definition

Badge Name: Employee 1

Linked Schema: Connect ?

Linked DataBase: [ ] ⇩

Linked CardDesign: Employee 1 ⇩

Field Definition

Field Type: TEXT ⇩

Field Name: FirstName

Field Equation String: [ ]

Field Prompt String: Enter FirstName:

Field Validation String: [ ]

Field Width: 15

Field Capture Order: 1

Linked DataBase Field: [ ] ⇩

Field Image Type: TARGA ⇩

Field Compression Type: LINEAR ⇩

Image Capture Device: CAMERA ⇩

CardDisign Field Links:
FirstName
LastName
image

☐ Mandatory Entry Field:
☐ Changeable Field?
☐ Save in Audit Log?

[Next] [Previous] [Add] [Delete] [List]

[OK] [Help...] [Cancel]

FIG. 47

FIG. 52 Pad Character dialog: Enter Pad Character: [ ], Enter Number Times: [0], OK, Cancel

FIG. 53 Strip Character dialog: Enter Character: [ ], OK, Cancel

Log Query

Database Fields
- USER
- OPERATION
- DATE
- TIME
- MESSAGE

Users
- ADMIN

Database Fields
- Cards
- Configure
- Database
- Links
- Loos

Formats
[Date] [Time]

Query Builders
[Select] [Where] [All] [Sort by]

[Query]

Attributes
[>] [<] [=] [≠] [(] [)] [OR] [AND]

Query Statement

Build your SELECT statement here.

[Help...] [Class] [OK] [Cancel]

FIG. 55

*Cropping Box*

Reactivate the capture window to retry or create a new signature

Save the written image to a file

Leave the capture utility

METHOD AND APPARATUS FOR INTERACTIVELY CREATING A CARD WHICH INCLUDES VIDEO AND CARDHOLDER INFORMATION

RELATED INVENTION

The present invention is a continuation-in-part of U.S. patent application Ser. No. 08/192,042 filed on Feb. 4, 1994, which is entitled "Card Creation System And Method" by Stechmann et al. and which is assigned to the assignee of the present invention and now abandoned.

FIELD OF THE INVENTION

The present invention relates to a card creation system and method.

BACKGROUND OF THE INVENTION

Various card creation systems and methods have been used to produce a variety of cards for various applications including employee badges, student identification badges, membership cards, transaction cards, and other photo identification cards.

However most existing systems are rather expensive requiring rather elaborate card production equipment. Most of these systems require specially trained operators to produce cards using these systems. In addition, such systems are not suited for making a card on demand such as is often the case with various membership cards, badges, etc. Moreover, few systems are capable of capturing images and printing them on a card.

Some systems do exist for making a membership card or the like on demand; however, such systems are rather limited in their capability. They typically do not allow storage and/or retrieval of card holder information to and from various database structures. Moreover, such systems do not allow much flexibility in the layout of card designs.

Existing card production systems are often not real user friendly in that they do not provide the user with a "what you see is what you get" (WYSIWYG) display presentation of card layout.

The present invention provides a card creation system and method which offers numerous advantages over existing systems.

SUMMARY OF THE INVENTION

The present invention relates to a card creation apparatus and method which captures images and data from databases and/or user input devices such as a keyboard or mouse and print cards containing such images and data.

In one embodiment, a card creation apparatus including a microprocessor which controls operation of the card creation apparatus based on a predetermined card design that specifies positions on a planar surface of a card for layout frames of a video picture and cardholder information fields which are to be printed on the card is provided. An input mechanism is operatively coupled to the microprocessor to input a plurality of user commands and cardholder information corresponding to the cardholder information fields. A video camera is operatively coupled to the microprocessor to obtain a video picture of a subject. A display is operatively coupled to the microprocessor to display an image of the predetermined card design including the video picture and cardholder information within the predetermined card design substantially as can be printed in response to one user command of the plurality of user commands. In another embodiment, a method of creating a card also is provided.

These and various other advantages and features of novelty which characterize the invention are pointed out with particularity in the claims annexed hereto and forming a part hereof. However, for a better understanding of the invention, its advantages, and the objects obtained by its use, reference should be made to the accompanying drawings and descriptive matter, which form a further part hereof, and in which there is illustrated and described a preferred embodiment of the invention.

BRIEF DESCRIPTION OF THE DRAWINGS

In the drawings wherein like reference numerals generally indicate corresponding parts throughout the various views:

FIG. 11 is an illustration of a User Privileges Dialog Box present in a preferred embodiment of the present invention;

FIG. 13 is an illustration of a User Privileges dialog box;

FIG. 18 is an illustration of a Data Design Box present in a preferred embodiment of the present invention;

FIG. 19 is an illustration of the Data Design Box with a sample listing of fields;

FIG. 22 is an illustration of a Database Design dialog box;

FIG. 23 is an illustration of a Query Dialog Box present in a preferred embodiment of the present invention;

FIG. 36 is an illustration of a Bar Code Dialog Box present in a preferred embodiment of the present invention;

FIG. 37 is an illustration of a Bar Code Data Sample Dialog Box present in a preferred embodiment of the present invention;

FIG. 42 is an illustration of a Data Capture Window present in a preferred embodiment of the present invention where cardholder data is not saved to a database;

FIG. 43 is an illustration of a Data Capture Window present in a preferred embodiment of the present invention where cardholder data is saved to a database;

FIG. 46 is an illustration of the Data Capture Window with an image of the card to be printed proximate the bottom of the display;

FIG. 47 is an illustration of a Link Definition Dialog Box present in a preferred embodiment of the present invention;

FIG. 52 is an illustration of a Pad Character dialog box;

FIG. 53 is an illustration of a Strip Character dialog box;

FIG. 55 is an illustration of a Log Query dialog box present in a preferred embodiment of the present invention;

DETAILED DESCRIPTION OF THE PREFERRED EMBODIMENT

Figure 1:
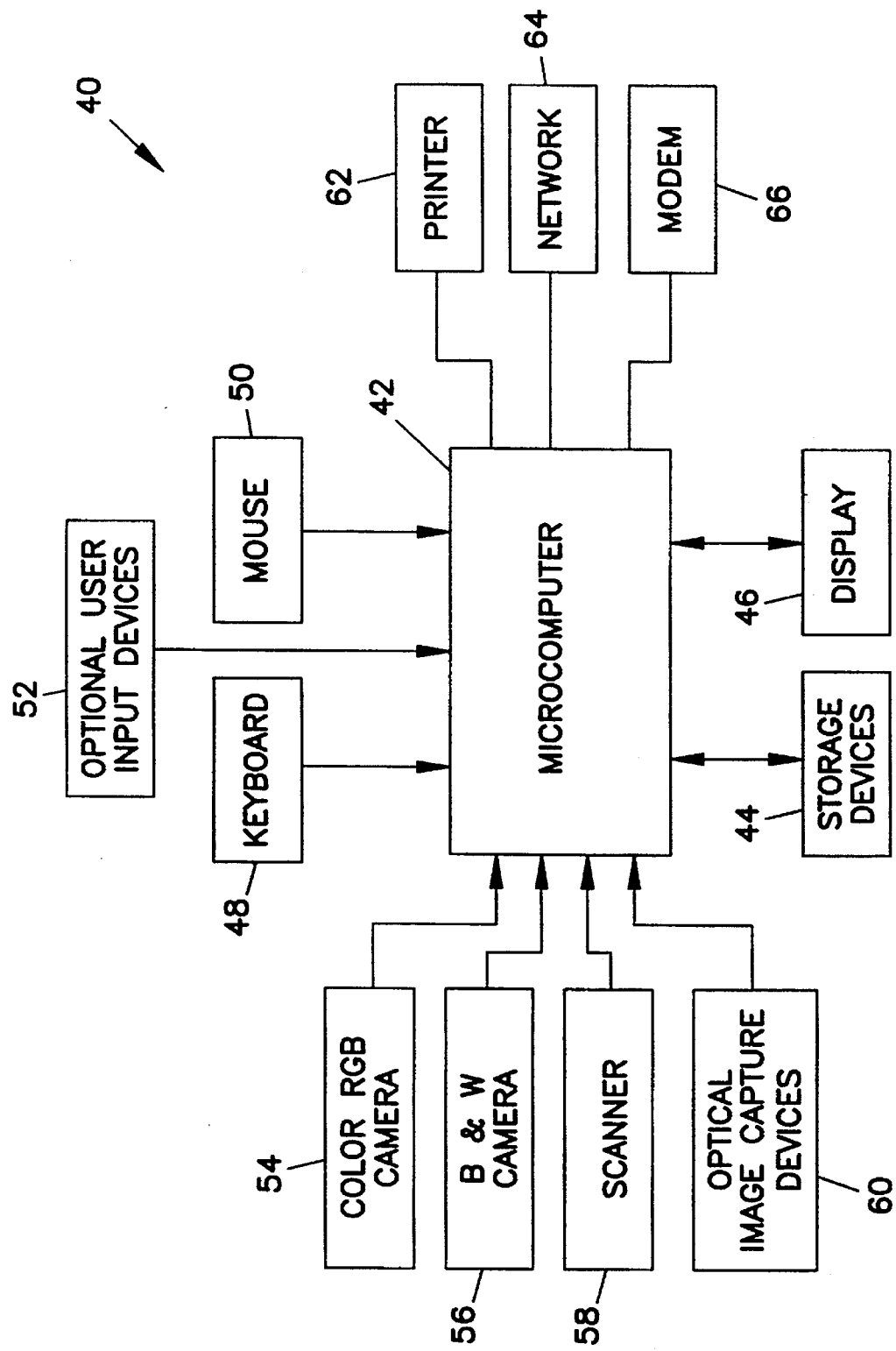
FIG. 1 is a system block diagram of a preferred embodiment of a card creation apparatus and method in accordance with the principles of the present invention.

Referring now to the drawings, there is illustrated in FIG. 1 a system block diagram of a preferred embodiment of a card creation apparatus and method in accordance with the principles of the present invention, the apparatus being generally designated by the reference numeral 40. The card creation apparatus 40 includes a microcomputer 42 having a conventional processor such as an Intel 486DX. In addition, the microcomputer 42 includes appropriate storage devices 44 such as a hard disk drive and a floppy disk drive. The storage devices might be used for storing various programs and for storing card holder information. The microcomputer 42 includes a color display 46 for displaying various information including card holder information. This monitor/display 46 displays graphic and live video images. You use the live image option on the monitor 46 to focus the cardholder's image captured by the camera 54. Therefore, you must learn how to adjust the monitor 46 controls to display the clearest picture possible. A keyboard 48 is interconnected to the microcomputer 42 for providing entry of text data, such as card holder information, into the microcomputer. A mouse 50 or other pointing device is used for inputting information and controlling operation of the card creation apparatus and method. You operate the mouse 50 by moving it on a flat surface. The mouse communicates the movements to the microcomputer 42. The computer translates these motions into movements of the cursor, or pointer. The mouse 50 has buttons you use to indicate the position of the pointer in the display. Additional optional user input devices 52 might also be present for inputting various information and controlling the card creation apparatus and method.

Various types of image captured devices such as a color red-green-blue (RGB) camera 54, a black and white camera 56, and/or a scanner 58 might be interconnected to the microcomputer 42 for inputting images. The scanner 58 scans color images you can use as images on cards. Various other additional optional image capture devices 60 might also be present. For example, a signature capture device which captures the image of a cardholder signature to the card may be present. A color printer 62 is interconnected to the microcomputer 42 for printing cards with the information and design as determined by the card creation apparatus and method. The microcomputer 42 of the card creation apparatus and method 40 might be a stand alone computer or it might be interconnected to a plurality of other terminals by a suitable network connection 64. In addition, other devices such as a modem 66 might be interconnected to the microcomputer 42 so as to allow communication with remote terminals, image capture devices, printers, etc. In addition, a magnetic stripe encoder (not shown) may be used to apply a magnetic security code to the card. Also, the image capturing site may be augmented by a camera tripod, counter stand, backdrop, or other accessories as needed.

The printer 62 is preferably a table top unit capable of printing full-card continuous tone color images, mass transfer bi-level black images and a full- or variably-sized overlay within 0.10 inch (0.254 centimeters (cm)) of the edge of a PVC plastic card. The printer has an input hopper and provides single-card output. In addition to the printer 62, it will be appreciated that other devices might be utilized for outputting information.

In one embodiment of the present invention a CCD 4000 RGB flash-sync camera manufactured by Kodak is utilized. The camera is utilized in conjunction with an electronic flash to compose and capture a card holder's picture or an image. The Kodak CCD 4000 RGB Flash-synch Camera provides card creation apparatus and method with solid-state CCD (charge-coupled device) image capture system optimized for flash to produce outstanding image quality, free from geometric distortion and artifacts.

Normally, live image capture applications using video camera input require constant sources of illumination that are usually hot and cumbersome. The use of the synchronized flash, however, provides positive, uniform lighting with a minimum amount of effort. The camera uses existing ambient lighting for focusing and composition and the flash mode for capturing live images. The camera provides the timing and interface to a variety of devices with frame capturing capabilities, including computers and frame grabber boards alike.

TABLE 1

Kodak CCD 4000 RGB Video Camera Specifications

| | |
|---|---|
| Dimension | 7.62 ± 0.254 cm (3.0 ± 0.1") high × 9.144 ± 0.254 cm (3.6 ± 0.1") wide × 9.652 ± 0.254 cm (3.8 ± 0.1") long |
| Scanning | 525 lines, (2:1 interlace) |
| Image Device | 0.847 cm (⅓ inch) interline transfer CCD |
| Interlace | 2:1 |
| Edge Enhancement | 10IRE overshoot on 50 IRE Step (horizontal only) |
| Resolution | 768 horizontal × 484 vertical pixels |
| Signal to Noise Ratio | Gamma Correction = 0.45 50 dB minimum (luminance) 45 dB minimum (chroma PM) |
| Lens Mount | C-mount |
| Camera Mounting | ¼-20 UNC |
| Connectors | Lens Control: 6-pin female Mini-Din External (genlock): 8-pin female Mini-Din Frame-Store: 8-pin female Mini-Din Power: 4-pin female Mini-Din RGB/S/NTSC Composite Video: 9-pin D-Subminiature female |
| Electrical | Voltage: 12 VDC Consumption: 6.72 Watts maximum (12V @ 560 mA) Output: NTSC Video: 1.0 Vp-p, Z = 75 W RGB Video: 0.7 Vpp, Z = 75 W RGB Sync: 2.0 Vp-p, 75 W |
| Operating Temperature Range | −5° C. (23° F.) to 40° C. (104° F.) |

The camera assembly includes an automatic electronic flash, as detailed in Table 2.

TABLE 2

Electronic Flash Specifications

| | |
|---|---|
| Dimensions | 14.91 cm (5.87") wide × 8.89 cm (3.5") high × 4.75 cm (1.87") deep |
| Accessories | Removable sensor, 30.48 cm (12") shutter cord |
| Intensity | 2900 beam candle power seconds (BCPS) minimum 5500° Kelvin color temperature |
| F-Stop Settings | 4 automatic F-stop selections to match the depth of field |
| Flash Duration | ¹⁄₁₀₀₀ to ¹⁄₃₀₀₀₀ second in automatic mode |
| Angles of Illumination | 45° vertical, 60° horizontal |

The camera assembly also includes a zoom lens, as detailed in Table 3.

TABLE 3

Zoom Lens Specifications

| | |
|---|---|
| Focal Length | 1.2 cm–7.2 cm |
| F-Stop | F1.4 |
| Iris Adjust | Manual |
| Lens Mount | C-mount |

A frame grabber printed circuit board, as detailed in Table 4 is installed in the microcomputer 42 (e.g., personal computer (PC)) for converting the video image from the camera into an image format that the microcomputer can read, display, and save. It is the device that captures and digitizes the live video image as the image is sent from the video camera.

TABLE 4

Frame Grabber Specifications

Interface 16-bit data bus host (PC/AT compatible)

Digitizing real-time, interlaced video (30 frames per second)

Memory 1 Megabyte (MB), RGB composite S-Video, 15-bit Color

Output video graphics adapter (VGA)

The card creation apparatus and method of the preferred embodiment operates in the Microsoft Windows operating system. Although it will be appreciated, that the present invention might be utilized in other operating systems.

The basic card creation apparatus 40 consists of the following software components:

Windows Operating System

Printer Driver

Capture Board Driver

Database Driver

Image Capture Software

In addition, your system may include the following software drivers for peripheral devices:

Scanner Option Driver

Signature Pad Option Driver

Magnetic Stripe Encoder Option Driver

The following information briefly describes all of the software driver components.

The printer driver translates the image and text output of the card creation system 40 into a language that the card or report printer can read.

The capture driver controls the camera's capturing an of an image and the computer monitor's display of that image.

The database driver software program enables communication between the card creation system 40 and the database to which you save data. The card creation system 40 ships with four different database drivers. Each card creation site must install at least one. If the site does not save cardholder data, the site will not use the database driver.

The scanner option driver interprets a scanned image, digitally reconstructs it, and then displays the image on your screen. It also enables you to adjust the scanner settings you see on your screen.

The signature option driver enables communication between the signature pad and the card creation system 40. It also enables you to adjust the signature option settings you see on screen.

The magnetic stripe encoder option driver allows the card creation system 40 to work with your magnetic stripe encoder. It delivers data to be encoded to the encoder and reads encoded information back into the card creation system 40 once you encode the card.

Figure 84:
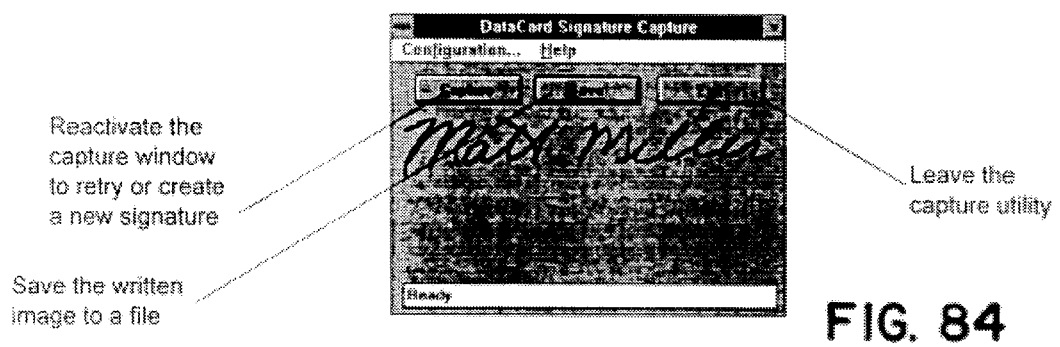
FIG. 84 is an illustration of a Signature Capture Main Window dialog box.

The card creation apparatus 40 can be summarized as follows in reference to FIGS. 1–84. The card creation apparatus includes a microprocessor 42 which controls operation of the card creation apparatus 40 based on a predetermined card design which specifies positions on a planar surface of a card for layout frames of a video picture and cardholder information fields which are to be printed on the card. An input mechanism 48, 50, 52 is operatively coupled to the microprocessor 42 to input to the microprocessor 42 a plurality of user commands and cardholder information corresponding to the cardholder information fields. A video camera 54, 56 is operatively coupled to the microprocessor 42 to obtain a video picture of a subject. A display 46 is operatively coupled to the microprocessor 42 to display an image of the predetermined card design including the video picture and cardholder information within the predetermined card design substantially as can be printed in response to one user command of the plurality of user commands.

The microprocessor 42 preferably includes a design mechanism 74 for interactively creating the predetermined card design by displaying the predetermined card design on the display 46 and modifying specific positions on a planar surface of a card for each of the layout frames of the video picture and the cardholder information fields in response to several user commands of the plurality of user commands. This interactive card design is further enhanced by having precision placement capabilities of the card fields by specifying exact coordinates, height, and width of card fields. This allows a user to pinpoint card fields which makes alignment and placement easier.

The design mechanism 74 preferably is programmed to provide for placing static fields in the predetermined card design such that a card background can be specified for use with several related cards. By using these static fields a picture and text background can be specified for use by one customer company, department within a company, or security level group within a company.

The microprocessor 42 preferably provides for automatic selection of a card background from a plurality of card backgrounds based on contents of cardholder information associated with a particular cardholder. This automatic selection is termed data driven production and it eliminates a user from some types of data entry so that strict conformity with other generated cards is enforced within a single group or company by the microprocessor 42 making decisions based on data entered as of cardholder information.

The design mechanism 74 also preferably includes the capability to designate a particular cardholder information field in the predetermined card design as a bar code field. Optionally, the card creation apparatus includes a bar code field type which is a black on black bar code. This printing of bar codes on a black background makes photocopying of the bar codes from a card very difficult.

The microprocessor 42 preferably further includes a database interface for storing and retrieving the cardholder information in a card creation database.

The microprocessor 42 preferably further includes a linker 76 for generating a link file and a Data Capture Window by selecting one predetermined card design from a plurality of predetermined card designs with associated cardholder information fields. Subsequently, particular sources for the cardholder information as well as particular storage destinations for the cardholder information are determined in response to user commands. The linker 76 preferably includes a mechanism for incorporating particular source and destination designations for the video picture in the link file and the Data Capture Window in response to user commands.

The database interface in the preferred embodiment is open database connectivity (ODBC) compliant such that at least some customer information can be stored and retrieved from a database external to the card creation apparatus. Details of the ODBC compliant will be discussed in later sections.

The microprocessor 42 also preferably includes a filter for extending functionality of the card creation apparatus 40 beyond a core set of features. For example, a bar code check digit calculation and a data validation scheme can be implemented within the Windows Dynamic Link Library (DLL) structure.

In addition, the microprocessor 42 preferably includes an external command mechanism for exposing a core set of features of the card creation apparatus 40 to function calls external to the card creation apparatus 40. In the preferred embodiment, this is the Window Dynamic Data Exchange (DDE) feature set and preferably includes a DDE API as well.

An interface operation is preferably performed by a frame grabber board which operatively couples the video camera 54 and the microprocessor 42 such that the video picture is stored into a memory of the microprocessor 42 in response to another user command of the plurality of user commands.

The microprocessor 42 preferably includes a Chroma Key processing feature for editing the stored video picture to revise a picture background of the video picture with another picture background. Subsequently, the edited video picture is stored in place of the stored video picture in the memory of the microprocessor 42. The Chroma Key process includes a software package as well as a bright blue back drop. It is a solution for those customers who desire the ability to change background color hue or pattern. With an image captured through the card creation apparatus 40, Chroma Key software replaces the blue background with a user selected color. The components that make up the chroma Key process are as followed:

Input image with blue background edge detection shoulder block (generated base on edge information)

eye block (generated base on edge information)

chroma key (base on pixel color, shoulder and eye block)

intensity replacement (base on original image intensity)

Output image with new background color

The ability to change background color offers the utility of color background as classification, aesthetic and security purposes. Sixteen hues are available to user to choose from as shown in Table 5.

TABLE 5

| Color hue | R value | G value | B value |
|---|---|---|---|
| Saturated Red | 250 | 10 | 10 |
| Light Red | 250 | 100 | 100 |
| Saturated Green | 10 | 250 | 10 |
| Light Green | 100 | 250 | 100 |
| Saturated Blue | 10 | 10 | 250 |
| Saturated Magenta | 250 | 10 | 250 |
| Light Magenta | 250 | 100 | 250 |
| Saturated yellow | 250 | 250 | 10 |
| Light yellow | 250 | 250 | 100 |
| Saturated cyan | 10 | 250 | 250 |
| Light cyan | 100 | 250 | 250 |
| gray | 100 | 100 | 100 |
| black | 0 | 0 | 0 |
| orange | 250 | 150 | 50 |
| purple | 150 | 50 | 250 |
| Twill | 50 | 250 | 150 |

It should be noted that the software only changes the hue, not brightness nor saturation of the color. The brightness of the original background is maintained in the new image to create a smoother transition between background and image. Maintaining the original intensity also hides some of the error in Chroma Key process. In addition to the limitation of color change, user should also note that the color they perceive the monitor is not identical to the color printed on the card. The color error between monitor and printed card is a result no color translation between color devices.

Some errors in the Chroma Key process may occur based on the particular subject being imaged.

Blonde hair produces large error while errors with dark hair is less visible. Also, frizzy hair is more difficult to "key" while clean short hair styles is easy to segregate from background.

Blue clothing or similar color to the back drop may result in edge detection errors. The result is changing of shirt color as well as background.

Lighting must be the similar to the current photo capture procedure in the card creation apparatus. Poor lighting on subject or on back drop may result low signal to noise thus reducing the software's ability to segregate background from subject.

The Chroma Key feature can be enhanced by having a dynamic neckline finder and shoulder edge smoothing. The likelihood of these errors is high when the head to shoulder size ratio is different in the image field. This problem is especially likely to occur with subject wearing blue clothes. Another improvement is the selection of a replacement background color. It may be desirable to have all possible color combinations available to user. Furthermore, customer should have the option to create a background pattern instead of a solid color.

Figure 65:
FIG. 65 is an illustration of a Post Exposure Enhancement dialog box.

The microprocessor 42 further includes a post-exposure processing feature for editing the stored video picture to alter an average light intensity level of the video picture and subsequently storing the edited video picture in place of the stored video picture in the memory of the microprocessor 42. This option allows you to display, as shown in FIG. 65, a series of nine images with varying exposures after you freeze a temporary image. You click the option with the best exposure to save as your permanent capture. This complexion enhancement feature is particularly important for correcting light exposure levels on light or dark complexion subjects.

The microprocessor 42 further includes an image processing feature for editing by scaling and cropping the stored video picture. Subsequently, the edited video picture is stored in place of the stored video picture in the memory of the microprocessor 42. You use the Crop Image window, shown in FIG. 66, to choose the part of the image that will appear on the card. The Crop Image window displays the captured image, along with a cropping box. Only the portion of the image within the cropping box's border will appear on the card. You can move and size the cropping box.

To crop the image, move the pointer inside the cropping box. Hold down the right mouse button. The pointer becomes a four-way arrow. Move the pointer toward the center of the cropping box to make the image smaller. Move the pointer toward the outside of the cropping box to enlarge the image.

To move the cropping box, move the pointer inside the cropping box. Hold down the left mouse button. The pointer appears as cross hairs. Move the mouse in the direction in which you want to move the cropping box.

To save the cropped image, choose the Save button.

Figure 42:
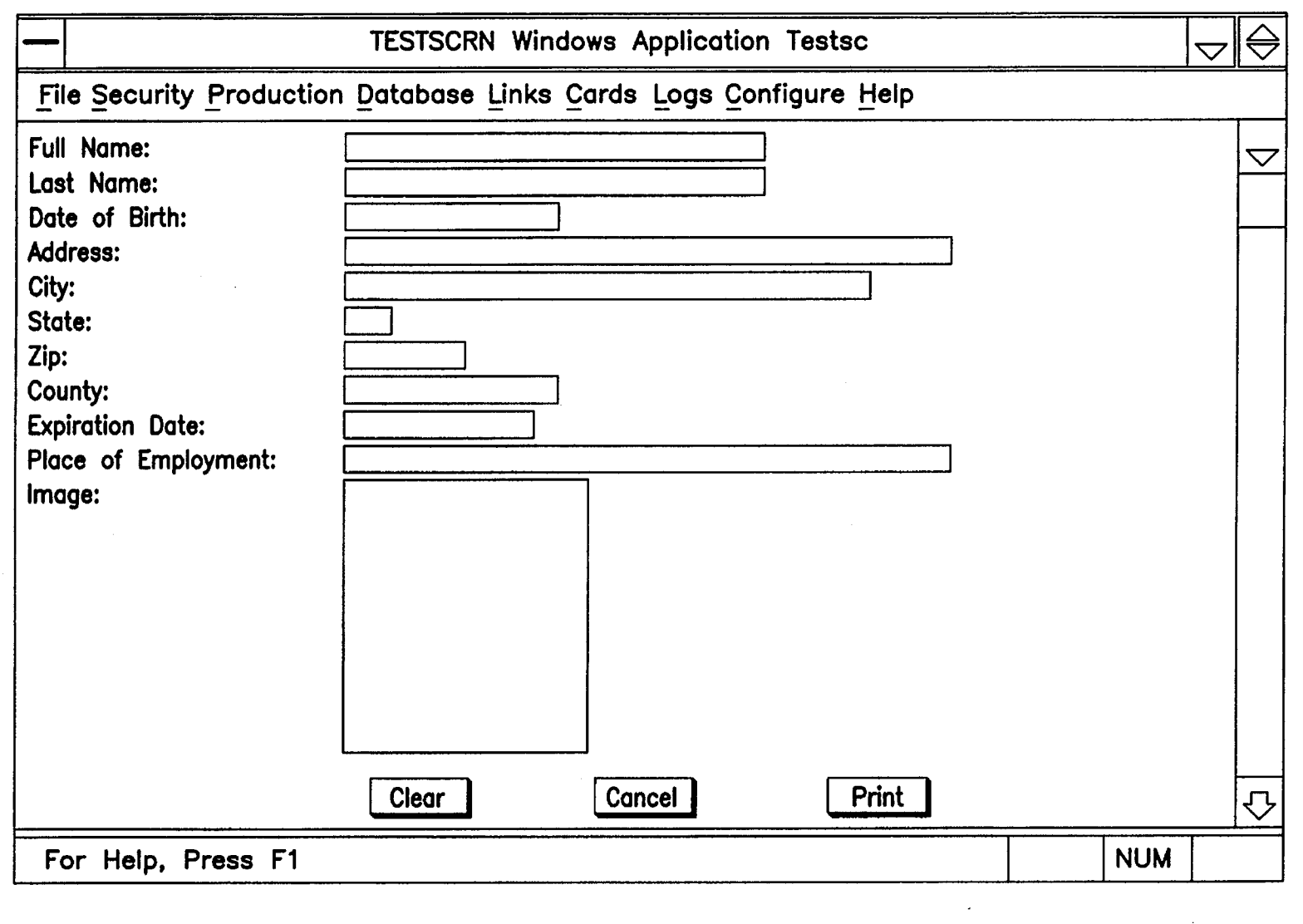

You return to the Production window, shown in FIG. 42.

Figure 44:
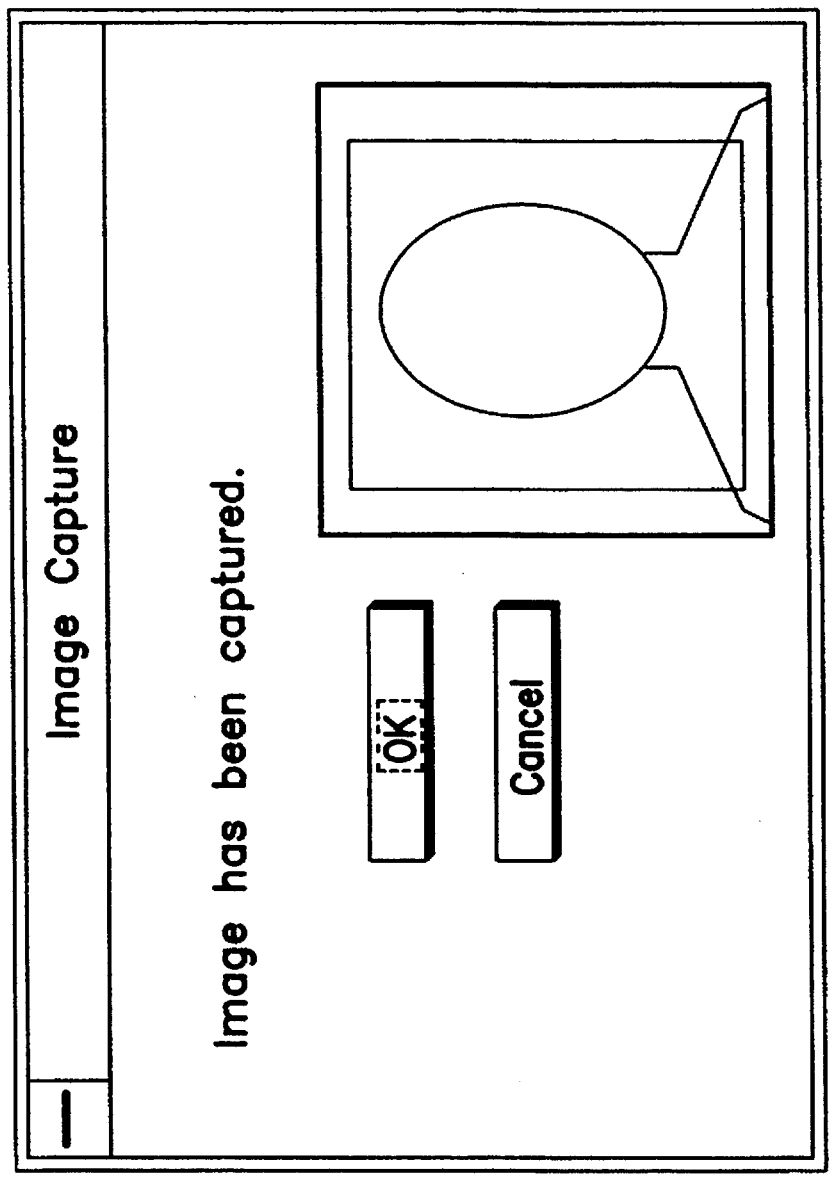
FIG. 44 is an illustration of an Image Capture Screen present in a preferred embodiment of the present invention.

To return to the Live Image window, shown in FIG. 44, choose Cancel.

The microprocessor 42 preferably also includes an automatic data input feature for enhancing cardholder information input through the input mechanisms 48, 50, and 52.

The automatic data input feature offers many functions. One function is placing a default value in one of the cardholder information fields. Users are able to select the following default types of field entry on the linker screen.

System DATE
System TIME
User Name
DOS Environment variable (such as Station ID)
User Defined String
Auto Increment Fields If users want Data and Time, they can use a composite field. For simplicity, default data and time formats are the formats specified in the WIN.INI file. A User Defined string is simply text that is inserted to a field. This is similar to a static field on a card but it can be inserted into the database. Just before inserting a record, with autoincrement fields, reads the database and finds the highest value in the autoincrement column (e.g., uses the SQL max function call). Subsequently, the auto-increment value is added to this value for the record and inserted in the field. It is very advisable to make the auto-increment column a numeric type. Also, it is very advisable to make the auto-increment column an index.

The automatic data input feature also preferably provides a function for adjusting a font size assigned to a particular cardholder information field in the predetermined card design when data input to the particular cardholder information field exceeds a predetermined character length. This is particularly useful, for example, when a user has a long last name and wants all of the name to print on a card, but the space allotted for the last name is not large enough if the default font size is used. As such the font size is reduced until all of the name fits on the card.

The automatic data input feature also preferably includes a function for automatically incrementing a numeric value in a particular cardholder information field when an associated card is printed. A new type of link field called PrintAction-Link is created. This special link cause "things" to happen when a card is printed. The "things" are to insert a '1' in a field (mark the card as printed) and update the record and, to increment a field (count the number of times a card is printed) and update the record Reasons for this PrintActionLink are:

A customer wants a field in the database "flagged" when a card is printed.

A customer wants a field in the database to be incremented when a card is printed.

A customer wants batch printing to only print unprinted cards.

The Linker 76 will have a new type of link field: PrintActionLink. The name represents the fact that certain actions will take place when a card is printed. The field types in the linker will then be:

ImageLink
PromptLink (a text field)
CompositeLink
PrintActionLink

With this change, the inheritance hierarchy in the Linker 76 will appear as:

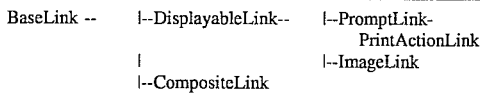

```
BaseLink --   |--DisplayableLink--   |--PromptLink-
                                              PrintActionLink
              |                      |--ImageLink
              |--CompositeLink
```

A PrintActionLink class will inherit from PromptLink, DisplayableLink and BaseLink. A PrintActionLink link element needs information from DisplayableLink. It doesn't need everything from DisplayableLink but the slight waste of space is compensated by the simplicity of implementing it this way. A PrintActionLink field will have the following properties:

The PrintActionLink class will add the following variables:

```
PRN_TRIGGER_TYPE    PrintActionType;
                    // see enum below
BOOL                FilterOnBatchPrint;
                    // If true, during batch print,
                    // only print non-printed cards
```

An enum will be created to classify the PrintActionLink types:

```
enum PRN_TRIGGER_TYPE
{
    INSERT_ONE,
    INCREMENT
};
```

The user chooses a PrintAction Link element just as they would any other type of link element.

The following variables are added to the capture window:

```
MyEdit *PrintedControl;
        // points to "set to one" control
MyEdit *IncrementControl;
        // points to "increment" control
BOOL BatchFilter;
        // TRUE if we filter on PrintedControl
```

After the link is read in AND the screen controls exist, scan the link field list. If any PrintTrigger fields are present, set the two pointers as appropriate (otherwise set them to NULL), and set BatchFilter to TRUE or FALSE;

When the Clear key is pressed, set PrintedControl and IncrementControl to 0 (assuming the fields exist). New records should start out as not printed, and 0 cards printed. In Single Print Mode, when the Print button is pressed (or selected via menu), if (BatchFilterControl !=NULL) OR (IncrementControl !=NULL) call the PrePrint() function.

The PrePrint() function is named since it will take care of any details before the card is printed. The PrePrint function looks at the two pointers:

If the record on the screen is not associated with a database field, return FALSE.

If (PrintedControl !=NULL) SetPrintedControl to '1';

If (IncrementControl !=NULL)
  Get text from IncrementControl.
  Convert it to a long int, add one to it, convert back to text.
  Put the text back in the Increment Control.
Update the Database
If there is an error, return FALSE else return TRUE.

If PrePrint() returns TRUE, print the card.

In Batch Print Mode, If BatchFilter is TRUE, Simply check the PrintedControl for a 1. If it has a 1, skip the record; otherwise, call PrePrint() and print the card.

It may be desirable to have an Insert/Update on print. Also, a User defined action on print could be supported with a DLL with a function to call.

The automatic data input feature also preferably includes a function for generating revised contents of a particular cardholder information field based on data input to the particular cardholder information field through the input 48, 50, or 52. For example, a PIN number could be entered and the PIN data is sent to an external function (i.e., DLL) to encrypt the PIN. The encrypted PIN is returned to the card creation apparatus 40 and input in a cardholder information field. Similarly, human readable check digit could be generated for bar codes fields.

A printer 62 preferably is operatively coupled to the microprocessor 42 to print on a card the predetermined card design including the video picture and cardholder information within the predetermined card design substantially as can be printed in response to another user command of the plurality of user commands. In the preferred embodiment, the printer 62 includes the capability to interpret an Encapsulated PostScript file which describes the predetermined card design including the video picture and cardholder information within the predetermined card design to be printed. The advantage of this is more compatibility with various output devices and the files tend to be smaller than bitmap files. It should be noted that the printer 62 may be a color printer which prints a photographic quality images in color or grayscale. The microprocessor 42 preferably includes a mechanism for selecting between at least two printers such that cards can be printed from at least two different printers. In the preferred embodiment, this feature can be implemented with the standard Microsoft Windows printer driver protocol links.

A signature capture device (not shown) preferably is operatively coupled to the microprocessor 42 to obtain a video picture of a subject's signature from a pressure sensitive pad. This feature will be discussed in detail in the following sections.

A scanner 58 preferably is operatively coupled to the microprocessor 42 to obtain a video picture of a subject from a still photograph. The microprocessor 42 preferably includes a mechanism for rotating an orientation of the video picture from the scanner 58 such that orientation within the predetermined card design of the video picture can be modified. In addition, the scanner 58 preferably is compatible with the TWAIN scanner control standard such that the microprocessor 42 can use the industry standard TWAIN control protocols.

Finally, the microprocessor 42 preferably includes a security mechanism for restricting access to different functions within the card creation apparatus based on individual user passwords. For example, one user with one password may be able to perform productions functions, but none of the card creation or administration functions would be enabled. A function can be enabled if the menu option is selectable. Similarly, a function can be disabled if the menu option is not selectable. Another, supervisory user may have full access to all menus and functions and further may assign individual users separate access levels based on passwords.

Returning now to the signature capture optional device which uses a compact pressure sensitive pad that records handwritten data to a file. The pen-like stylus allows you to sign, draw or write notes for printing. It works with any IBM compatible PC that runs Windows and has an available RS-232 serial port.

The minimum system requirements for installing and using the Signature Capture option are as follows:
  an IBM 386 compatible system or faster
  Windows v3.1
  Card Creation Software
  8 MB of memory
  80 MB disk space
  a VGA monitor
  an available serial port To install the Signature pad, be sure to turn your PC off before you begin.
1. Locate the 9-pin RS232-C connector and insert it into a serial port on your PC.
2. Plug the power adapter into the mating socket on the RS232-C connector.
3. Plug the power adapter into a standard AC outlet. Both LEDs on the signature pad should flash. If not, check your power supply.
4. Turn on your PC and install the Signature Option software.

To install the Signature Option software
1. Place the Signature Option Kit in a disk drive.
2. From the Windows Program Manager File menu, choose Run.
3. Type a:\setup (or, b:setup depending on which drive you are using) and press Enter.
4. Follow the instructions that display on the screen.

The Signature Capture Option allows you to change the thickness of the pen stroke or the size of the Capture window through the System Setup pulldown menus.

Figure 67:
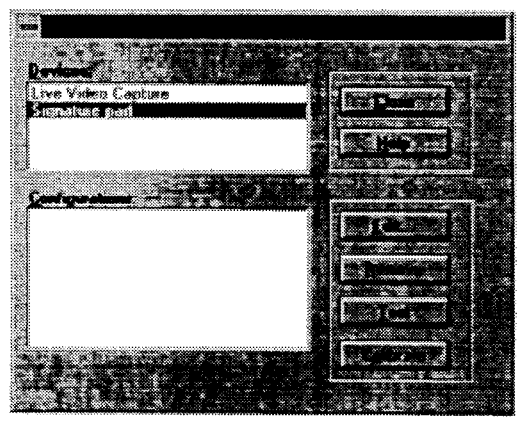
FIG. 67 is an Illustration of an Input Devices dialog box.
Figure 68:
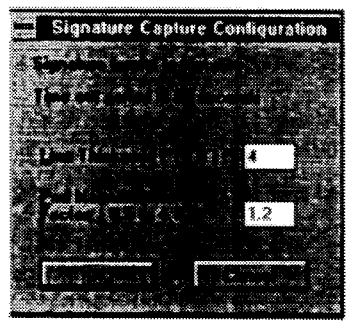
FIG. 68 is an illustration of a Signature Capture Configuration dialog box.

To change the Signature Capture Configuration
1. At the main menu, choose System. Select Setup from pulldown menu that appears. A drop down menu appears.
2. Choose Input Devices. The Input Devices dialog box appears as shown in FIG. 67.
3. Select Signature pad from the Devices list box and click on Edit. (You are editing the default configuration. The signature pad does not allow multiple configurations. When you click on the Edit button, you are editing the default configuration.) The Signature Capture Configuration dialog box appears as shown in FIG. 68.
4. To change the thickness of the pen stroke, enter a new value in the Line Thickness text box. The value must be between one and eight. The larger the number, the thicker the signature pen stroke appears.

Signatures may appear thicker when enlarged, and thinner when reduced.

5. To enter a new value in the Pad Magnification Factor text box. The value must be within a range of 0.500 and 4.000. A value of 1.000 will produce a window on a VGA display whose size is the approximate size of the pad.

The higher the magnification value the bigger the signature capture window appears. You should be careful not to make the window display too large. When the capture process reduces the signature image to field size, some distortion may occur.

6. Choose OK to save your changes. The Input Devices dialog box returns.
7. Click on Close to return to the main menu.

This section provides information about how to use the Signature Capture option. This includes:
  Adding a Signature Field to a Database
  Adding a Signature Field to a Card
  Editing a Link
  Printing a Card The procedures in this section assume that you are saving signatures to a database. However, this is an optional step. For more detailed information about databases, card design, links, and production, refer to the following sections.

Figure 69:
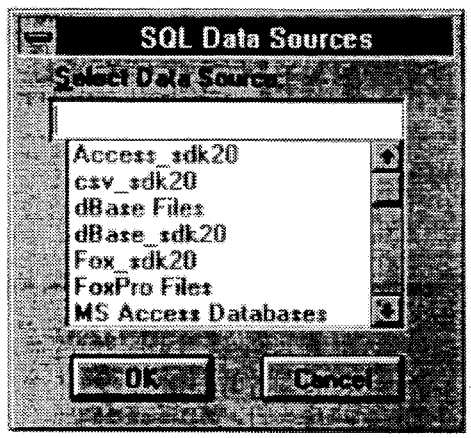
FIG. 69 is an illustration of a SQL Data Source dialog box.
Figure 70:
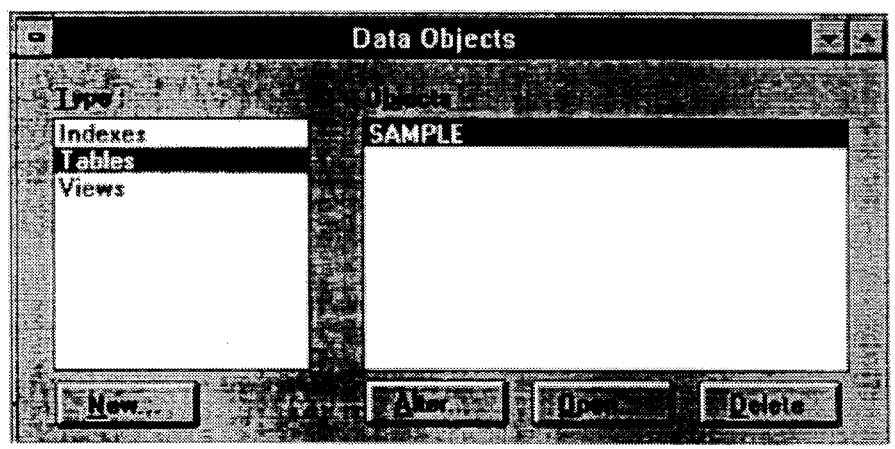
FIG. 70 is an illustration of a Data Objects dialog box.
Figure 71:
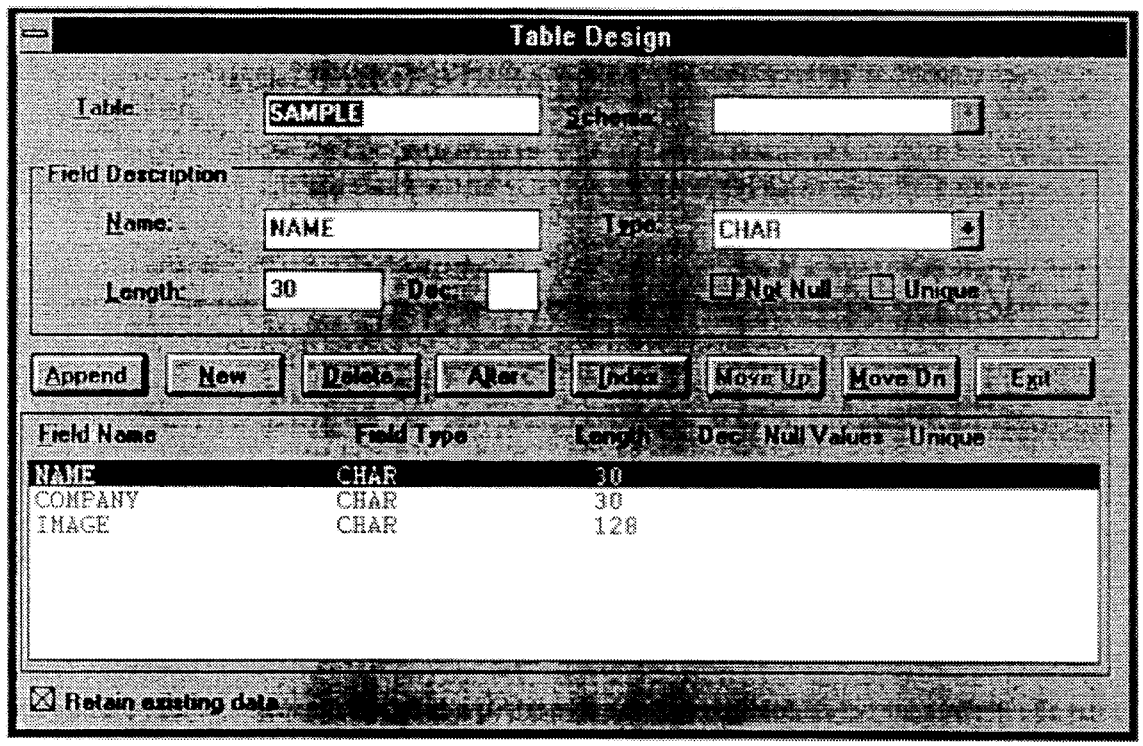
FIG. 71 is an illustration of a Table Design dialog box.

Adding a Signature Field to the Database
To add a signature field to a database:
1. At the main menu, choose Database. When the pulldown menu appears, select Edit. The Data Manager window appears.
2. Choose File from the main menu. When the pulldown menu appears, select Connect. The SQL Data Source dialog box appears, as shown in FIG. 69.
3. Type Sample in the text box and click on OK. The Data Objects dialog box appears, as shown in FIG. 70.
4. Select Tables and click on Alter. You are going to alter the database table to include a Signature field. The Table Design dialog box appears, as shown in FIG. 71.

Figure 72:
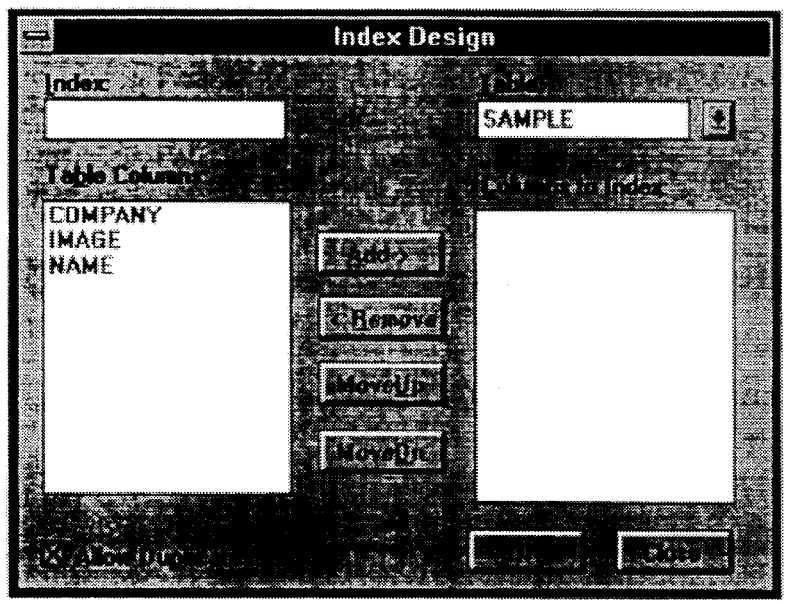
FIG. 72 is an illustration of an Index Design dialog box.

5. Click on the Name text box and replace the current entry with a name for the signature field. (Example: Signature)
6. Click on the Length field and type 128. (The signatures are saved as image fields and must be 128 characters.)
7. Click on Append to add the field to the table.
8. Click on Exit. A message box appears asking you if you want to alter the database table.
9. Click on Yes.
10. A warning message appears reminding you that all indexes are removed when you alter your database table.
11. Click on Yes. The Data Objects dialog box reappears of FIG. 70.
12. Select Indexes and click on New. The Index Design dialog box appears, as shown in FIG. 72.
13. Click on the Index text box and type the name of the Index. (Example: Name)
14. Click on the field you want to use as the index field. (Example: Name)
15. Click on the Allow Duplicates check box (database tables must have at least one unique index field.).
16. Click on OK. The Data Objects dialog box of FIG. 70 reappears.
17. From the Data Manager main menu bar, choose File. When the pulldown menu appears, select Exit. The main window returns.

Figure 73:
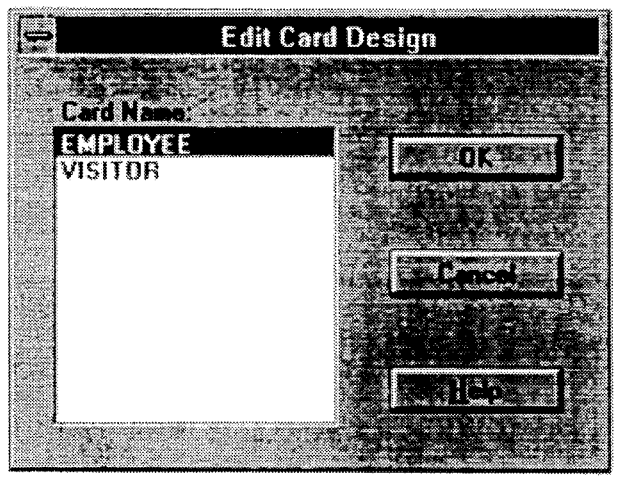
FIG. 73 is an illustration of an Edit Card Design dialog box.
Figure 74:
FIG. 74 is an illustration of a Card Designer dialog box.
Figure 75:
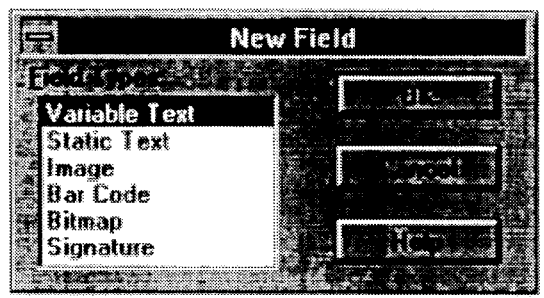
FIG. 75 is an illustration of a New Field dialog box.
Figure 76:
FIG. 76 is an illustration of the Card Designer window with a Signature field dialog box.
Figure 77:
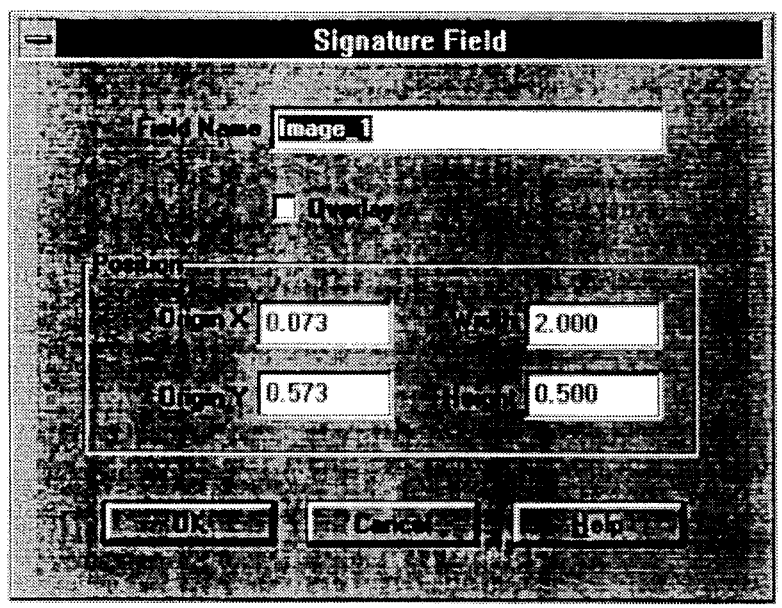
FIG. 77 is an illustration of a Signature Field dialog box.

Adding a Signature Field to a Card Design
To add a signature field to a card design
1. From the main menu, choose Card. When the pulldown menu appears, select Edit. The Edit Card Design dialog box appears, as shown in FIG. 73.
2. Select Visitor and click OK. The Card Designer window appears, as shown in FIG. 74.
3. Choose Field from the menu bar. When the pulldown menu appears, select New. The New Field dialog box appears, as shown in FIG. 75.
4. Select Signature and click OK. The Card Designer window returns with a Signature field, as shown in FIG. 76.
5. Double-click on the Signature Field. The Signature Field option dialog box appears, as shown in FIG. 77.
6. Type a new name in the Field Name text box (Example: Signature) and click OK. The Card Designer window reappears.
7. Choose File from the menu bar and Save from the pulldown menu.
8. Choose File again from the menu bar and Exit from the pulldown menu. The main window appears.

Figure 78:
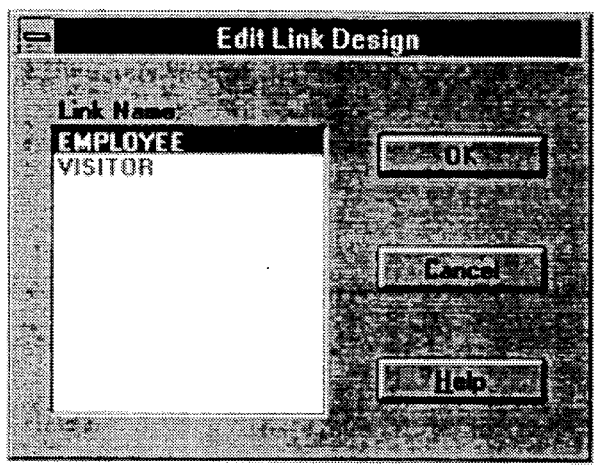
FIG. 78 is an illustration of an Edit Link Design dialog box.
Figure 79:
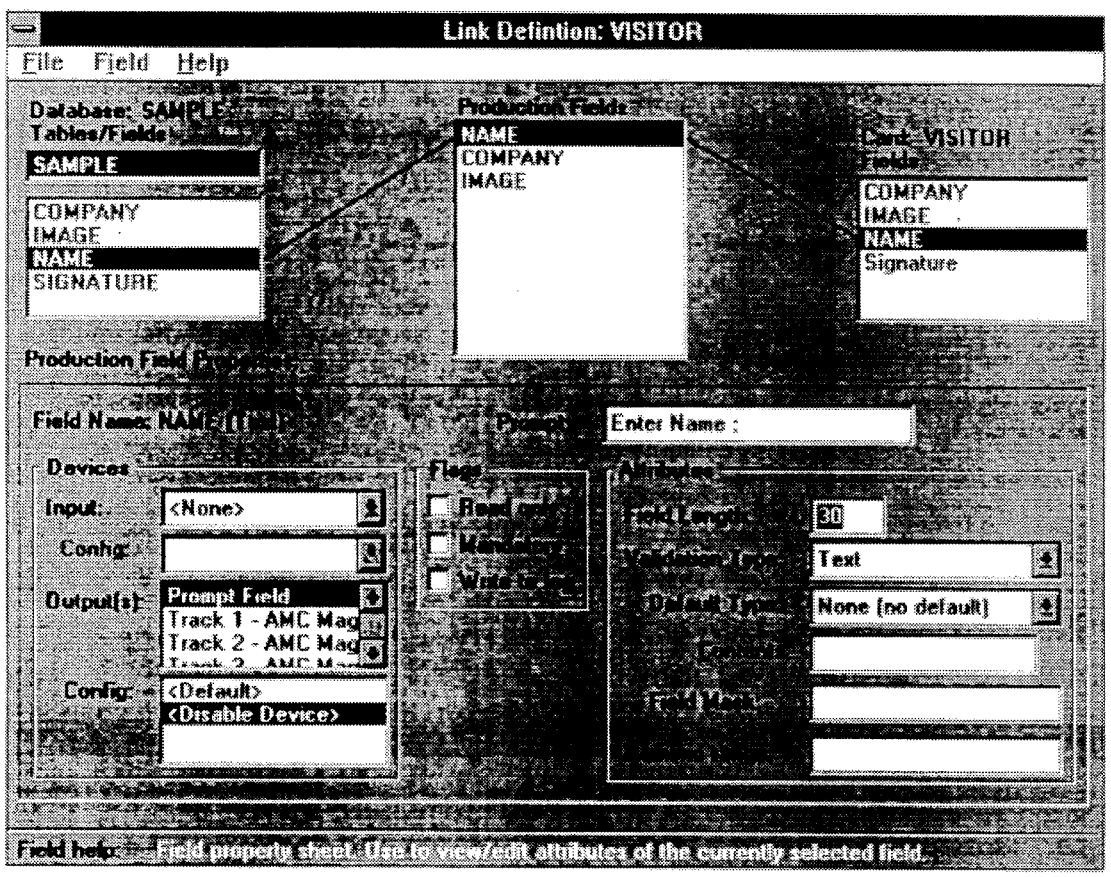
FIG. 79 is an illustration of a Link dialog box.
Figure 80:
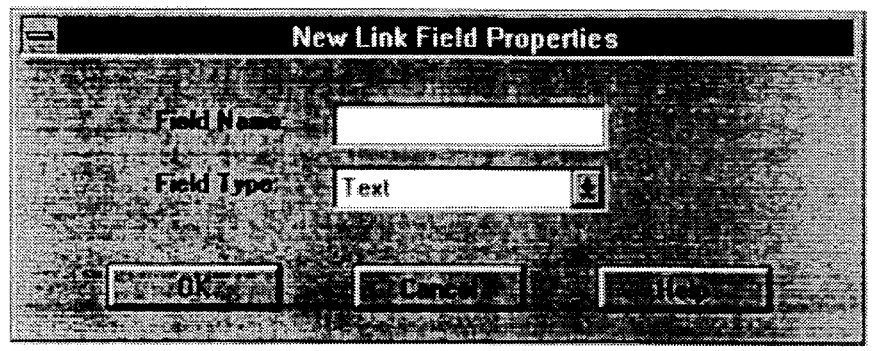
FIG. 80 is an illustration of a New Link Field Properties dialog box.

Editing the Link
To edit an existing link
1. Choose Link from the main menu and Edit from the pulldown menu. An Edit Link Design Dialog Box appears as shown in FIG. 78.
2. Select Visitor and click OK. The Link window appears, as shown in FIG. 79.
3. Choose Field from the menu bar and select New from the pulldown menu. The New Link Field Properties dialog box appears, as shown in FIG. 80.
4. Type a name for the field in the Field Name text box (Example: Signature).
5. Click on the Field Type list box and choose Image from the list. Then, click on OK. The Link window, as shown in FIG. 79, reappears with a new signature field in the Production Field list.
6. Select Signature in the Production Fields list.
7. Use the right mouse button to click on Signature in the Production Fields list. Then, still using the right mouse button, click on Signature in the Database Tables/Fields list. A line connecting the two fields appears to indicate that they are linked.
8. Use the right mouse button to click on Signature in the Production Fields list. Then, still using the right mouse button, click on Signature in the Card Fields list. A line connecting the two fields appears to indicate that they are linked.
9. In the Devices section of the window, click on the Input list box. A pull down list appears.
10. Choose Signature pad. Your configuration automatically appears in the configuration text box.
11. Choose File from the menu bar and select Save.
12. Choose File from the menu bar and select Exit.
13. A message appears asking you if you want to save changes. Click Yes if you have made further changes or No if you have not made any additional changes. The main window appears.

Figure 81:
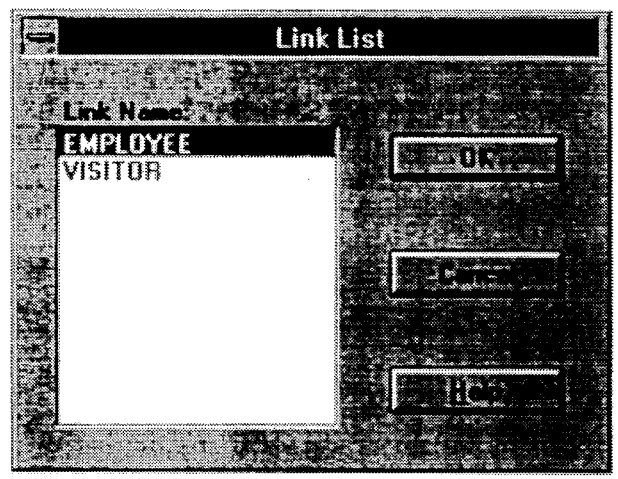
FIG. 81 is an illustration of a Link List dialog box.
Figure 82:
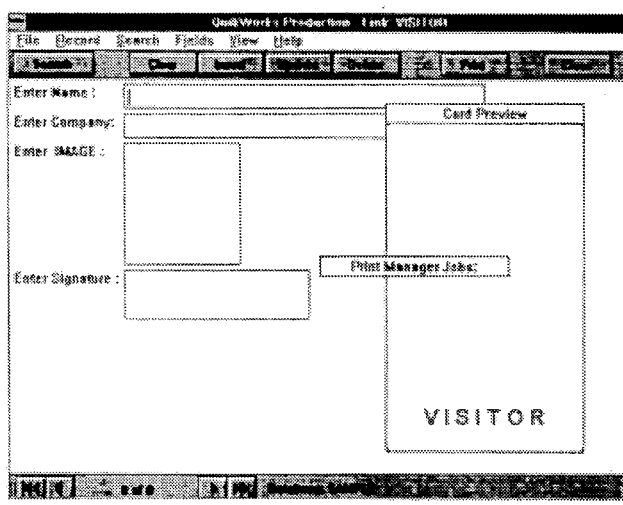
FIG. 82 is an illustration of a Production dialog box.
Figure 83:
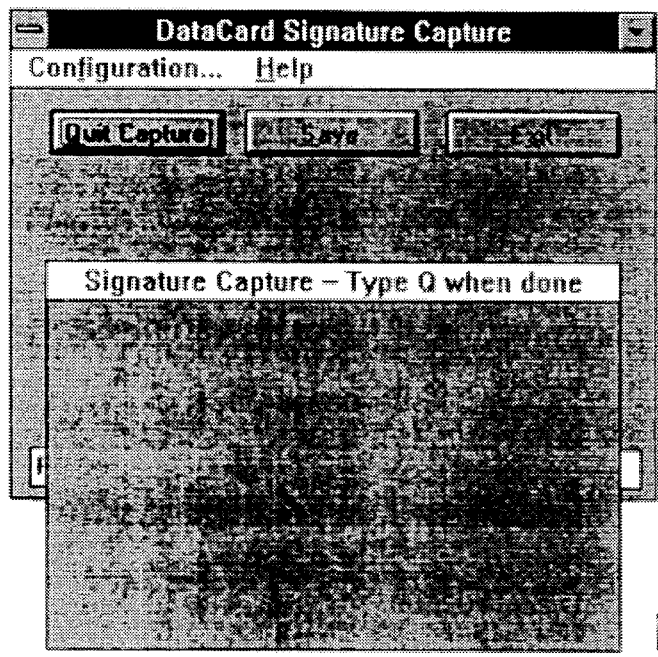
FIG. 83 is an illustration of a Signature Capture dialog box.

Printing a Card
To print a card with a signature field
1. Choose Production from the main menu and select Cards from the pulldown menu. The Link List dialog box appears, as shown in FIG. 81.
2. Select Visitor and click on OK. The Production window appears, as shown in FIG. 82.
3. Type a name in the Name text entry box (Example: John Doe) and press Tab.
4. Type a company name in the Company text entry box (Example: DataCard) and press Tab.
5. Capture an image in the Image capture field by choosing and Freeze and Save at each of the capture screens. For more information about capturing image, refer to the following sections.
6. Press Tab to move to the Signature field. The Signature Capture window appears, as shown in FIG. 83.
7. Press the middle button on the signature pad to activate the inking function. The red LED lights up.
   YOU can also use the mouse as a writing device by holding down the left mouse button and moving the mouse to simulate writing. You release the button when you finish.
8. Take a signature sheet (provided with the Signature pad) and place it over the writing area on the Signature pad. Use a regular ball-point pen to sign your name. Be sure to keep your signature within the writing area on the signature sheet. The pressure sensitive pad displays the handwritten data on the screen as you write. Your stroke should be even and firm, but not hard. Be careful to press only with the pen as you write. If the pad recognizes pressure from another source, it draws connecting lines between the two pressure points.
9. When you finish, press the Q (or Enter) on your keyboard to capture the written image and return control to your mouse. The as shown in FIG. 84 appears.
10. To begin saving your signature or note to a file, click on Save.
    You can also erase and rewrite the data by choosing Capture. This reactivates the Capture window and allows you to start again.
11. When the Production window reappears, click on Insert to save the record to the database.
12. Click on Print to print the card.

Returning now to the scanner optional device 58 which is substantially like the signature capture device in operation and setup. The process of scanning an image is also similar to taking a picture with a camera. However, instead of using a flash or relying on natural light, a light bar on the scanner exposes an image on the scanning glass. The scanning software interprets the image, digitally reconstructs it, and then displays the image on your screen. The Twain interface uses an industry standard protocol to pass the digitized data from the scanner to the microprocessor 42 of the card creation apparatus 40.

The Twain interface works with a variety of scanners. It's important that you familiarize yourself with the particular scanner you are using. Review the documentation and installation information carefully. Know the capabilities of your scanner and learn the scanning process.

The minimum system requirements for installing and using the scanner are the same as those for the signature capture option.

To capture scanned images, you need:

a database with an image field to accept and store the captured image (optional)

a card design with a field that accepts images a link definition that identifies the scanner as an input device The procedures in this section assume that the card creation software is installed and that the 'Sample' database is enabled. They explain how to add an image field to an existing database, create a card with an image field, edit a link to identify the scanner as an input device, scan an image, and print a card. Saving images to the database is an optional step. For more detailed information about databases, card design, links, and production, refer to the following sections.

Adding a Image Field to the 'Sample' Database

To add an image field the database

1. At the main menu, choose Database. When the pulldown menu appears, select Edit. The Data Manager window appears, as shown in FIG. 67.
2. Choose File from the main menu. When the pulldown menu appears, select Connect. The SQL Data Sources dialog box appears, as shown in FIG. 69.
3. Type Sample in the text box and click on OK. The Data Objects dialog box appears, as shown in FIG. 70.
4. Select Tables from the Type list box and click on Alter.

You are going to alter the database table to include a second image field—a NEWIMAGE. The Table Design dialog box appears, as shown in FIG. 71.

5. Click on the Name text box and replace the current entry with a name for the image field. (Example: NEWIMAGE)
6. Click on the Length field and type 128. (Image fields must always be 128 characters.)
7. Click on Append to add the field to the table.
8. Click on Exit. A message box appears asking you if you want to alter the database table.
9. Click on Yes. A warning message appears reminding you that all indexes are removed when you alter your database table.
10. Click on Yes. The Index Design dialog box appears, as shown in FIG. 72.
11. Click on the Index text box and type the name of the Index. (Example: Name)
12. Click on the field you want to use as the index field. (Example: Name)
13. Click on the Allow Duplicates check box (database tables must have at least one unique index field).
14. Click on OK. The Data Objects dialog box reappears of FIG. 70.
15. From the Data Manager main menu bar, choose File. When the pulldown menu appears, select Exit. The main window returns.

Creating a Card
    To create a card with an image field

1. From the main menu, choose Card. When the pulldown menu appears, select New. The Create New Card Design dialog box appears (not shown).
2. Type a name for the card in the Enter Name of Card text box (Example: New). Click on the Portrait radio button to create a portrait design. Click on OK.

The Card Designer window appears, as shown in FIG. 74.

3. Choose Field from the menu bar. When the pulldown menu appears, select New. The New Field dialog box appears, as shown in FIG. 75.
4. Select Image and click OK. The Card Designer window of FIG. 74 returns with an Image field.
6. Make the image field larger by pointing to one of the handles (the squares on each corner of the field). Hold down on the left mouse button and drag the mouse to enlarge the field. (This is an optional step.)
7. Move the Image field so it's centered in the bottom half of the screen. Move the mouse pointer inside the image field, and hold down on the left mouse button. Drag the field to a new location. (This is an optional step.)
8. Double-click on the Image Field. The Image Field dialog box appears (not shown).
9. Type a new name in the Field Name text box (Example: NewImage) and click OK. The Card Designer window reappears, as shown in FIG. 74.
10. Choose Field from the menu bar. When the pulldown menu appears, select New. The New Field dialog box appears, as shown in FIG. 75.
11. Select Variable Text and click OK. The Card Designer window returns with a text field, as shown in FIG. 74.
12. Double-click on the variable text field. The Variable Text Attributes dialog box appears (not shown).
13. Type a new name in the Field Name text box (Example: Name).
14. Click on Font. (This is an optional step.) The Font dialog box appears (not shown).
15. Change the font size to 36 and click OK. (This is an optional step.) The Card Designer window reappears, as shown in FIG. 74.
16. Choose File from the menu bar and Save from the pulldown menu.
17. Choose File again from the menu bar and Exit from the pulldown menu. The main window appears.

Creating a Link

1. Choose Link from the main menu, and Create from the pulldown menu.

The Create Link Definition dialog box appears (not shown).

2. Click on the Linked Card Design list box and select your new card design (Example: NEW). The system automatically fills the Link Name field with the same name.
3. Click on the Linked Database list box and select Sample.
4. Click on the AutoLink check box to allow the link to create production fields from the names of the card fields. The Link Definition window appears, as shown in FIG. 79.

The auto link feature also links database fields to production fields if the names match. If you select the NewImage field in the Production list, notice that both card and database Name fields are linked to it.

Use the right mouse button to click on NewImage in the Production Fields list. Then, with the right mouse button, click on Image in the Database Tables/Fields list. A line connecting the two fields appears to indicate that they are linked. In the Devices section of the window, click on the Input list box. A pull down list appears. Choose Scanner as the input device.

8. Click on the Configuration list box and choose the <default> configuration. (If you do not choose a configuration, the software uses the default settings automatically. (For more information about how to change the configuration, refer to the next section.)

The Link shows (not shown but similar to FIG. 79) the link image field definition. The NewImage field has the Scanner identified as the input device. In this link definition, the scanner uses the <Default> configuration settings. Choose File from the menu bar and select Save.

10. Choose File from the menu bar and select Exit. The main window appears.

Capturing an Image

1. Choose Production from the main menu and select Cards from the pulldown menu. The Link List dialog box appears, as shown in FIG. 81.
2. Select New and click on OK. The Production window appears, as shown in FIG. 82.
3. Type a name in the Name text entry box (Example: Jane Doe) and press Tab to move to the NewImage field. The scanning window becomes active and a preview image appears.

Figure 66:
FIG. 66 is an illustration of a Crop dialog box.

The preview window will vary between scanners. Refer to your scanner documentation for specific information about how to use the settings that become available.
4. When you are ready to begin saving the preview image, click on Final or Save. The Crop Image dialog box appears, as shown in FIG. 66.
5. Use the crop feature to move and size the cropping box. The system saves only the portion of the image that is within the border of the cropping box.

To change the size of the image, hold down the right mouse button and move the mouse pointer inside the cropping box. Notice the pointer changes its shape to a four-way arrow. Move the pointer in to make the frame smaller. Move it out to make the frame bigger.

To move the frame, hold down on the left mouse button. Move the mouse pointer inside the cropping box and drag the frame to its new location.
6. When you are ready to save the image, click on Save. The Production window returns with the image displayed in the Image field.

Changing the Scanner Configuration

The scanner configuration settings enable you to make changes that affect how the scanner works. For example, you can rotate the image, or identify a specific part of the picture to scan on the scanning glass. Some scanners may also allow you to adjust the contrast and brightness, or enhance the picture.

The new configurations you create become choices in the Link definition.

The information that follows explains how the settings on this dialog box (which is not shown) affect how your scanner works.

Scanner Settings

Show Source Dialog. This check box determines whether or not the software interface from the scanner will be available to operators as the images are being scanned. This setting toggles on and off. (X=on).

Rotation. Use this option to rotate the images being scanned. Your options are as follows:
0°. No rotation.
90°. Turns the captured image a quarter turn to the left.
180°. Turns the captured image two quarter turns to the left.
270°. Turns the captured image three quarter turns to the left.

Resolution. Refer to the documentation from your scanner for information about the setting the resolution.

Scanner to Use. Use this list box to identify an alternate scanner for the configuration you are creating. This option is only necessary if you are using more than one type of scanner and you want to define a configuration that uses a scanner other than your default scanner. Click on the list box to display the list of installed scanners.

Image Frame

Position. Use the horizontal and vertical fields in this column to identify the position of the area you want to scan. Refer to your scanner documentation for the point of origin. Depending on the type of scanner you are using, scanning may be from top to bottom and right to left, or bottom to top and left to right.

Size. Use the horizontal and vertical fields in this column to identify the size of the area you want to scan.

Unit. Use this option to choose inches or centimeters as the unit of measurement.

Configuration

Configuration list box. Click on this list box to list all the configurations currently available. Select the configuration you want to view or change.

Default check box. Click on this check box to use the current configuration as the default.

Default Scanner. If you have more than one scanner installed on your system, use this button to identify which one you want to use as your default.

Scanner Dialog. Use this button to test the scanner interface.

To create a new scanning configuration
1. At the main menu, choose System. Select Setup from pulldown menu that appears. A drop down menu appears.
2. Choose Input Devices. The Input Devices dialog box appears, as shown in FIG. 67.
3. Select SCANNER from the Devices list box. The list of scanner configurations appears in the Configurations list.
4. Select a configuration and click on Edit. (You must select a configuration in order to access the Scanner Configuration dialog box.) The Scanner Configuration dialog box appears (not shown).
5. Alter the settings you want to change and click on New. The entry in the list box changes to indicates that there is no name.
6. Enter a name for the configuration and click on Save.
7. Check the Default check box if you want to use this configuration as the default.
8. Click on Close to return to the Input Devices dialog box, as shown in FIG. 67.

To edit a scanning configuration
1. At the main menu, choose System. Select Setup from pulldown menu that appears. A drop down menu appears.
2. Choose Input Devices. The Input Devices dialog box appears, as shown in FIG. 67.
3. Select the configuration you want to change and click on Edit. The Scanner Configuration dialog box appears (not shown).
4. Alter the settings you want to change and click on Save.
5. Check the Default check box if you want to use this configuration as the default.
6. Click on Close to return to the Input Devices dialog box, as shown in FIG. 67.

To delete a configuration
1. At the main menu, choose System. Select Setup from pulldown menu that appears. A drop down menu appears.
2. Choose Input Devices. The Input Devices dialog box appears, as shown in FIG. 67.
3. Select the configuration you want to delete and click on Remove.

Figure 2:
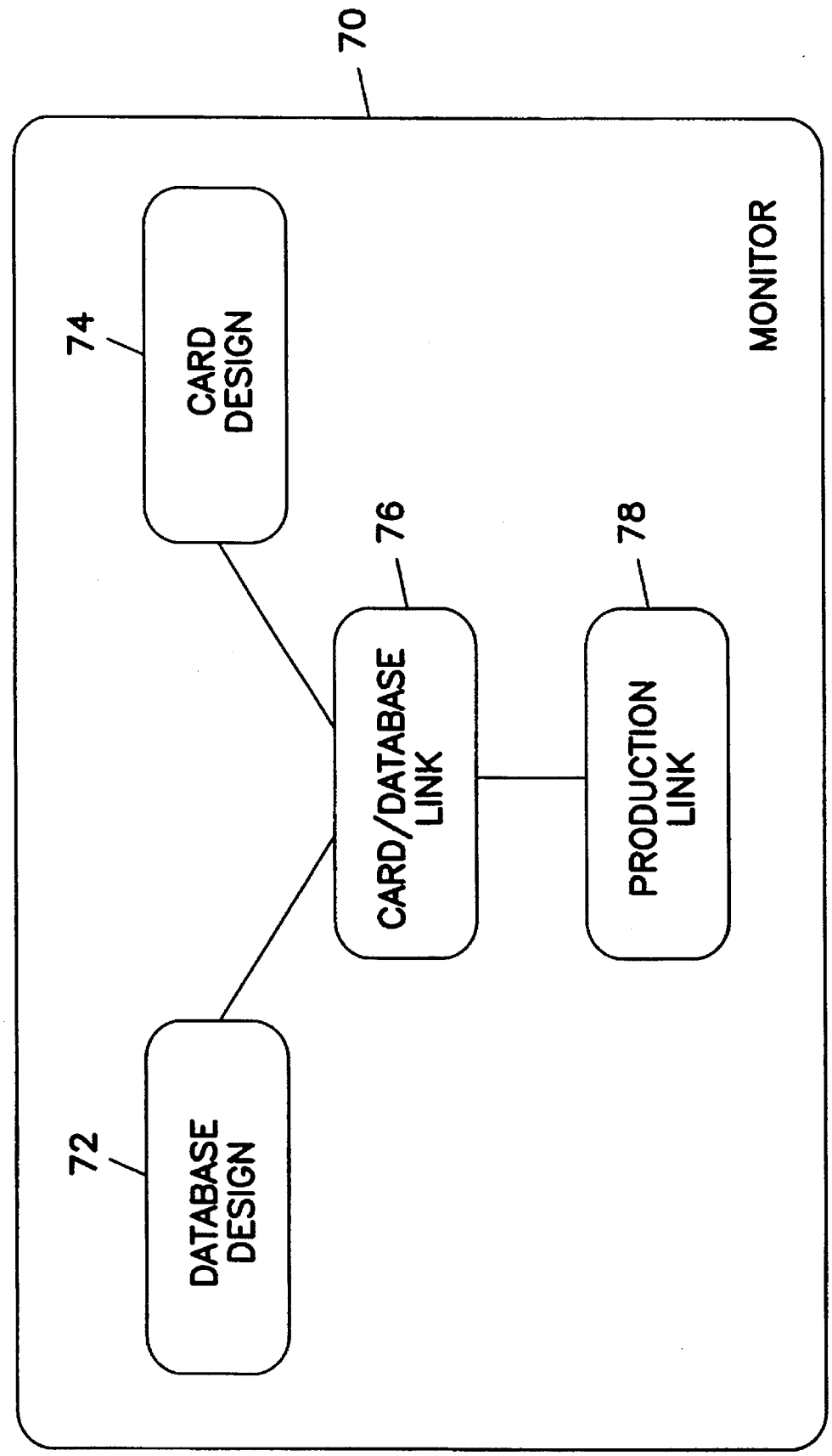
FIG. 2 is a block diagram of functional modules present in a preferred embodiment of a card creation apparatus and method in accordance with the principles of the present invention.

As illustrated in FIG. 2, a preferred embodiment of the present invention includes five basic functions or modules:

Monitor 70

Database Design 72

Card Design 74

Card/Database Link 76

Production 78

The monitor function oversees the entire system and provides access to the other four functions. In addition to monitoring activity among the system functions, the monitor function provides the following functions to the system:

Security

User accounts can be added to or deleted from the system. When a user is added to the system, a login name and password is specified to provide system security. On a user-to-user basis, specific system functions to which a user has access rights can also be specified. A user's access rights can be changed at any time.

Version Control and System Update/Upgrade When the system is upgraded, the monitor checks the versions of the drivers and DDLs, verifying compatibility.

System Configuration

The configuration manager allows installation and configuration of the system for a variety of capture and output devices. It also provides the capability to view a listing of the current configuration and version strings of the other functions.

System Logs

The monitor function also logs both system and production activity. The production log provides valuable production statistics from which operator productivity can be measured while the system log provides a listing of all system activity, which may assist in troubleshooting system problems. Both logs contain a maximum of 1000 entries, which are time-stamped and listed serially.

The database design module allows a user to define a database to which cardholder records are stored. Through open database connectivity (ODBC), an existing database format can be defined, provided it complies with ODBC. Local, networked, external, or distributed databases can be defined. Multiple users address a single database server. Standard database functions include:

Report generation

Import/Export of records containing images

Searches and queries

Database activity statistics

Output to laser printers

Storage/retrieval

Record managements (e.g. insert, delete, or update a record)

The Card Design module offers the capability of designing cards in a WYSIWYG (What You See Is What You Get) environment. The card is designed in a work space, which represents the actual card. The type, color, size, and location for each field on the card are defined. As these fields are defined, the user can immediately see what those fields will look like. The Card Design module supports bar codes.

The Card Design module contains the following functions:

Create a Card Design

A card can be designed from scratch or by using a template. If a card is created from scratch, all the fields on the card must be added and defined. If a template is used, an existing card design is selected, modified, and saved under a new name.

Whether a card is created from scratch or a template is used, the Card Design module offers the following features:

Horizontal and vertical rulers

Card background patterns

Drag and drop

Grow/shrink fields

Click to mark, release to size

Dynamic and static text fields

Item colors for background (256 colors plus transparent) and foreground (20 colors)

Fifteen bar codes with checksums

Text rotation

Display of the card design during data entry

Edit a Card Design

Once a card design has been created, it can be modified. When a card design is modified, a design is selected from a list of existing card designs. After being selected, the selected card design is displayed in the WYSIWYG Card Design window.

When editing a card design, the system monitors for errors and notifies the operator if an error exists, such as an overlapping field. The operator is prompted to either fix or ignore the problem.

Save a Card Design

When the operator saves a card design, the card design's attributes are saved to an internal database. A name must be assigned to the card design when it is saved.

Delete a Card Design

Before the operator can delete a card design, the system examines the system data to determine whether or not any of the card's fields are linked to a database field. If a card design field is linked, the card design can't be deleted until the link is removed.

Import a Card Design

Badge forms, logos, and card background patterns can be imported into the card design. From a dialog box, the operator can select the source file to import. A predetermined list of graphic patterns are preferably provided.

Export a Card Design

Once a card design is created, it can be exported to a destination file of any assigned name.

The Link module fulfills two purposes:

Capture data

The link module is used to create the data capture screen into which the operator will type textual data for a cardholder into fields and captures the cardholder's picture into an image field. The card design itself can be used in generating the data capture window, or the data capture window can be created from scratch. The data capture window fields have a range of field attributes available to build a robust capture facility for producing cards, as well as populating the database. Each data capture window assumes the name of the link to which it is associated; when the operator accesses data capture they must specify the name of the link to use.

Dynamically links fields on the card to fields in the database

The link module can also be used to establish the link that ties database fields to card design fields, allowing the system to populate the correct database fields and print the captured data on the card. Each link is assigned a name by which it can be retrieved for modification; the operator must also specify the link to use for each data capture session.

Only those database fields that are actually going to be used on the card need be linked. In addition, each data capture field to appear on the card need not be linked. However, each field appearing on the card must be linked to a database field.

The Production module includes the data capture, card printing, and database update functions. The modules' functionality, however, is dependent on the production mode selected. Two production modes are available:

Single Mode

As the name implies, the single production mode involves data capture, card printing, and optional database update for a single cardholder. When the operator accesses the single production mode, the operator is asked to select a link. The link determines the data capture window that will be displayed, as well as the database fields that will be updated and card design that will be printed. Upon selecting a link definition the associated data capture window is displayed.

The operator types the textual data into the appropriate text fields of the data capture window, captures the cardholder's video image into the image field of the data capture window, and prints the card. The system validates all fields before printing the card. If desired, the operator can update the database with the cardholder's data by entry of the Update button on the Data Capture Window.

When capturing data, the operator has the option of using a feature which displays a representation of the card design with the captured information shown as the operator enters it.

Batch Mode

Batch mode is intended for printing cards for multiple cardholder records. The operator retrieves the records, for which cards are to be printed, by issuing a database query. The system provides an easy-to-use graphic user interface for developing the query statement.

After issuing the query, the system returns a list of records that met the conditions specified in the query. From the list, the operator can select specific records to print.

Before printing, the system builds a metafile from the captured data. After printing the card, the system logs the production information to the Audit Log.

Figure 3:
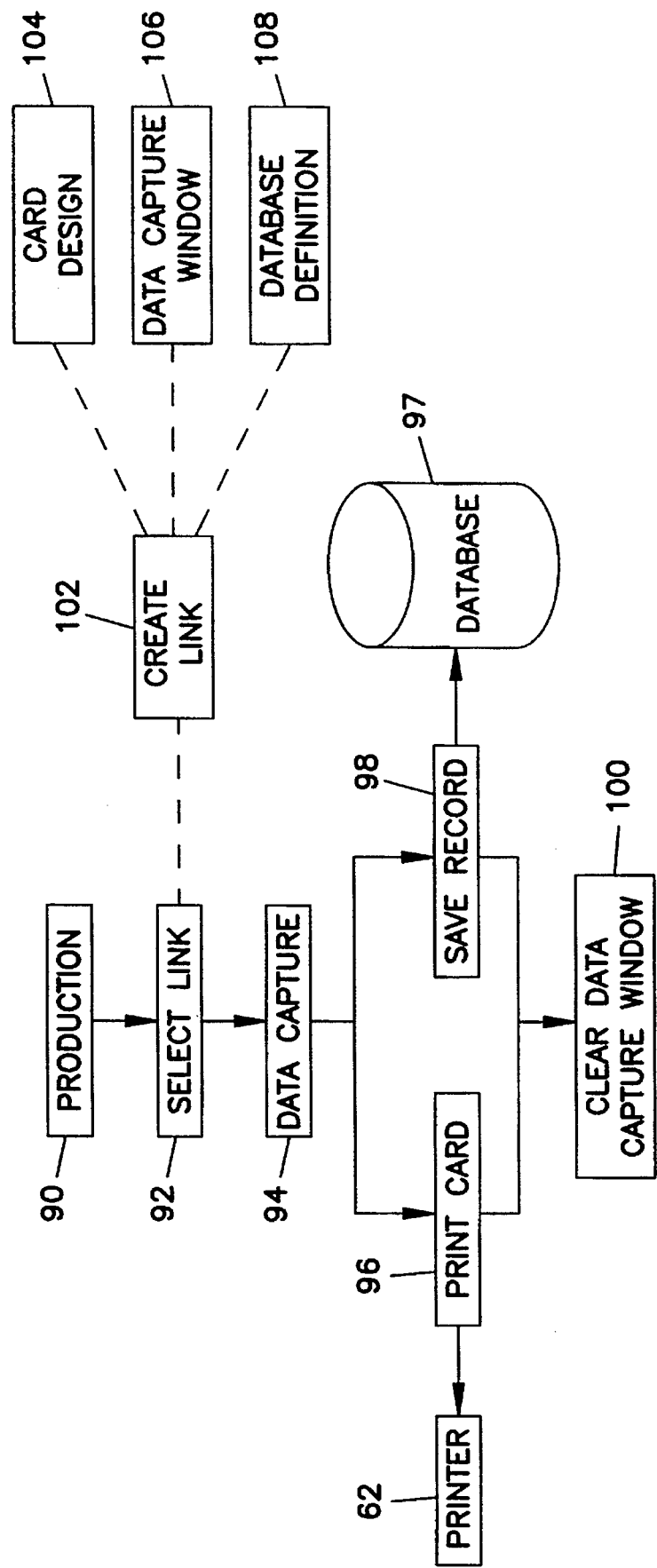
FIG. 3 is a block diagram illustrating basic operational steps present in a preferred embodiment of a card creation apparatus and method in accordance with the principles of the present invention.

Referring to FIG. 3, there are shown the operational steps of one embodiment of a card creation apparatus and method in accordance with the principles of the present invention. At a production step 90, the user of the card creation apparatus and method selects either single mode or query batch production. In single mode, the user can capture data, print a card, and/or save a record to a database for a single cardholder. In query batch production, the user can retrieve records from a database and print cards for more than one cardholder.

At a select link step 92, the user selects a predefined link definition by link name. The link definition is predefined by someone such as a system administrator. When the link is selected a data capture window is displayed. The link definition also provides the card design on which the cardholder's data and image will be printed. If the cardholder data is saved, the link definition also ensures that the cardholder data is saved to the correct database fields.

At a data capture step 94, the user enters information about the cardholder into labeled text boxes on the data capture window. The data capture window will preferably include an image box into which the user captures a cardholder's image.

As the last steps in a card production run; the user will at 96 elect to print the card at the printer 62 or other suitable hard copy device, at 98 elect to save cardholder data to a database 97, and/or at 100 clear the data capture window.

As noted above, before the user can select a link definition by name, the definition must have been previously created and designated by a particular name. The process of creating a link definition is illustrated at 102. In creating a link definition with the card creation apparatus and method of the present invention, one defines at 104 the card design, at 106 defines a data capture window, and at 108 defines the fields of the database 97 where the cardholder information is to be saved.

Referring now to the FIGS. 1–65, the card creation apparatus and method of the present invention will now be described in more detail. The present invention is a PC-based software system that enables capture of a cardholder's live video image and textual data and printing of selected cardholder data on plastic cards using a suitable printer such as the DataCard ImageCard II Printer (ImageCard II is a trademark of DataCard Corporation). In addition, the present invention enables cardholder image and data to be saved to a database for future retrieval, whether or not a card is printed.

The following additional features are available with the present invention:

Create original card designs

Designs are created in a WYSIWYG environment

Include graphics, images, and textual cardholder data on cards

Use different designs for different cardholders

Display the card design on the screen during data entry allowing the operator to view the cardholder data as it is being entered Store cardholder information in a database Define an existing cardholder database, through Microsoft®'s Open Database Connectivity (ODBC), or define or as defined by the user Optional updating of the database on a cardholder-by-cardholder basis Query the database, using standard Structured Query Language (SQL), for cardholder records to print in batch mode Build customized data capture screens Create data capture screens unique to a particular situation Include both test data and image data fields Provide a degree of user-friendliness required Establish dynamic data links Connect the database fields, card design fields, and data capture fields on a field-to-field basis One embodiment of the present invention utilizes the familiar, easy-to-use graphic user interface typical of other applications running in the Windows environment.

The tasks used in the operation of the present invention can be grouped into two categories, including card production and system management.

Card Production

Card production tasks are typically performed on a regular basis, if not daily. Card production tasks are performed by the operator and include:

Entering cardholder data

Taking the cardholder's picture

Printing the card

Saving the cardholder's record to the database

Querying the data base for records from which to print multiple cards

Card production tasks require data entry and camera operation skills. Multiple cards can be printed in batch mode, however, a database query statement can be utilized to select specific database records. But this task is simplified through the use of standard SQL and a graphic user interface.

System Management

System management tasks are performed initially to configure the system. Once the system is up and running, these tasks only as needed. System management tasks are performed by a system manager and include:

Specifying the system users; maintaining system security

Defining and maintaining the database table and records

Designing the card layouts

Developing the data capture windows for capturing both text and image cardholder data Creating the links that connect the database, data entry window, and card design fields The internal data structures of the present invention consist of both system and data components. The system structures include the Windows-specific configuration files, e.g., .INI files and resource files, and the internal data structures of the present invention. The data structures of the present invention include:

User management tables
Security table
Configuration files
Component DLLs
Device drivers Listed below are the data component structures:

| Data Component | Storage Type |
| --- | --- |
| Card Design Records | Internal Database |
| Database Tables | Dependent on location of external database |
| Linker Design Records | Internal Database |
| Card Backgrounds | Windows Bitmaps |
| Cards | EPS (Encapsulated Postscript) |

The present invention supports the following operating environments:

Standalone
Distributed (token ring network with databases on different platforms)
Client/Server
Database servers
Network servers
Remote database population
Local database population
Local and remote database population (local database is populated with images and the remote database with text data)

A preferred embodiment of the present invention utilizes Microsoft's Windows Open Services Architecture (WOSA). WOSA provides a single system-level interface for connecting front-end applications with back-end services. Applications do not have to worry about communicating with numerous services, each with their own protocols and APIs. Making these connections is the responsibility of the operating system, not the individual applications.

Each service recognized by WOSA has a set of interfaces that are used by the service providers to take advantage of WOSAs seamless interoperability. These service provider interfaces allow applications, written to the WOSA set of APIs, to have access to their services. In order to provide transparent access for applications, each implementation of a particular WOSA service simply needs to support the functions defined by its service provider interface.

WOSA employs Windows Dynamic Link Library (DLL) to allow software components to be run-time linked. In this way, applications are able to connect to services dynamically. An application needs to know only the definition of the interface, not its implementation.

WOSA defines a system-level DLL to provide common procedures that service providers would otherwise have to implement. In addition, the system DLL can support functions that operate across multiple service implementations.

Applications call system APIs to access services that have been standardized in the system. The code that supports the system APIs routes those calls to the appropriate service providers. That code also provides procedures and functions that are used in common by all providers.

The network operating systems that comply with WOSA standards include:

Net BIOS
TCP/IP
NetWare
VINES
LANtastic
Lan Manager
3Com

The present invention utilizes the Multi-Media extension provided for by Windows to allow for the separation from various boards and capture devices. The present invention supports the following image file formats:

BMP (Windows bitmap)
DCX (Sun Rater Format)
DIB (Device Independent Bitmap)
EPS (Encapsulated Postscript)
GIFF
JPEG (joint Photographic Experts Group)
MSP (Microsoft PCX)
PCX
PICT (Macintosh Picture Format)
TARGA (up to 24 bits)
TIFF (Tagged Image File Format)
WMF (Windows Metafile)
WPG (WordPerfect Graphics)

Image files can be stored in any of these formats, many of which are independent of specific operating systems or applications. All images are stored in JPEG compression format. Industry standard utilities are available if image compression/decompression is required.

The present invention supports the following bar codes shown in Table 6.

TABLE 6

| Bar Code Type | Input Length | Character Encoded* | Elements Adjust. Ratio | per Char |
| --- | --- | --- | --- | --- |
| UPC-A | 11, 13, or 16 | N | No | 7 |
| UPC-E | 11, 13, or 16 | N | No | 4 |
| EAN/JAN-13 | 12, 14, or 17 | N | No | 7 |
| EAN/JAN-8 | 7, 9, or 12 | N | No | 7 |
| Code 39 | 1 to 30 | N-U-P | Yes | 15 |
| Extended 39 | 1 to 30 | N-U-L-P-C | Yes | 15 |
| Int. 2 or 5 | 2 to 30 | N | Yes | 9 |
| Code 128 | 1 to 30 | N-U-L-P-C | No | 11 |
| Codabar | 1 to 30 | N | No | 11 |
| Zip + 4 Postnet | 5, 9, or 11 | N | No | 5 |
| MSI Plessy | 1 to 30 | N | No | 9 |
| Code 93 | 1 to 30 | N-U-P | No | 18 |
| Extended 93 | 1 to 30 | N-U-L-P | No | 6 |
| UCC-128 | 19 | N | No | 6 |
| HIBC | 1 to 30 | N | No | 6 |

TABLE 6-continued

| Bar Code Type | Input Length | Character Encoded* | Elements Adjust. Ratio | per Char |
|---|---|---|---|---|

*Characters Encoded:
N — Numbers (0–9)
U — Uppercase (A–Z)
L — Lowercase (a–z)
P — Punctuation
C — Control Characters (below space character)

Before one can print cards on the printer, the printer must be installed. Installing a printer also requires that a printer driver be installed. The printer driver, which is actually a file, provides present invention with important information about the printer including printer features, printer interface, font descriptions, character translations, and control sequences. The present invention utilizes a customized version of the Window's postscript printer driver.

A preferred embodiment of the present invention utilizes Open Database Connectivity (ODBC), Microsoft's strategic interface used to access data in an environment of multiple, different relational and non-relational database management systems. Based on Call Level Interface (CLI) specification of the SQL Access Group, ODBC provides an open method of accessing data stored in a variety of proprietary database systems operating on personal computers, minicomputers, workstations, and mainframes.

ODBC diminishes the need for software applications to utilize multiple application programming interfaces (API). ODBC provides a universal data access interface, allowing applications to simultaneously access, view, and update data from multiple, diverse databases. ODBC is a major component of Microsoft Windows Open Services Architecture (WOSA).

A few of the database management systems that are compatible with the present invention through ODBC include:
  Access
  $DB^2$
  dBASEIll and dBASE IV
  Informix
  Integra VDM
  Foxpro
  MS SQL
  Natural Adabase (SQL simulation for IBM host)
  Oracle
  Paradox
  Quadbase
  RDB
  SYBASE
  Watcom

User Interface

Figure 4:
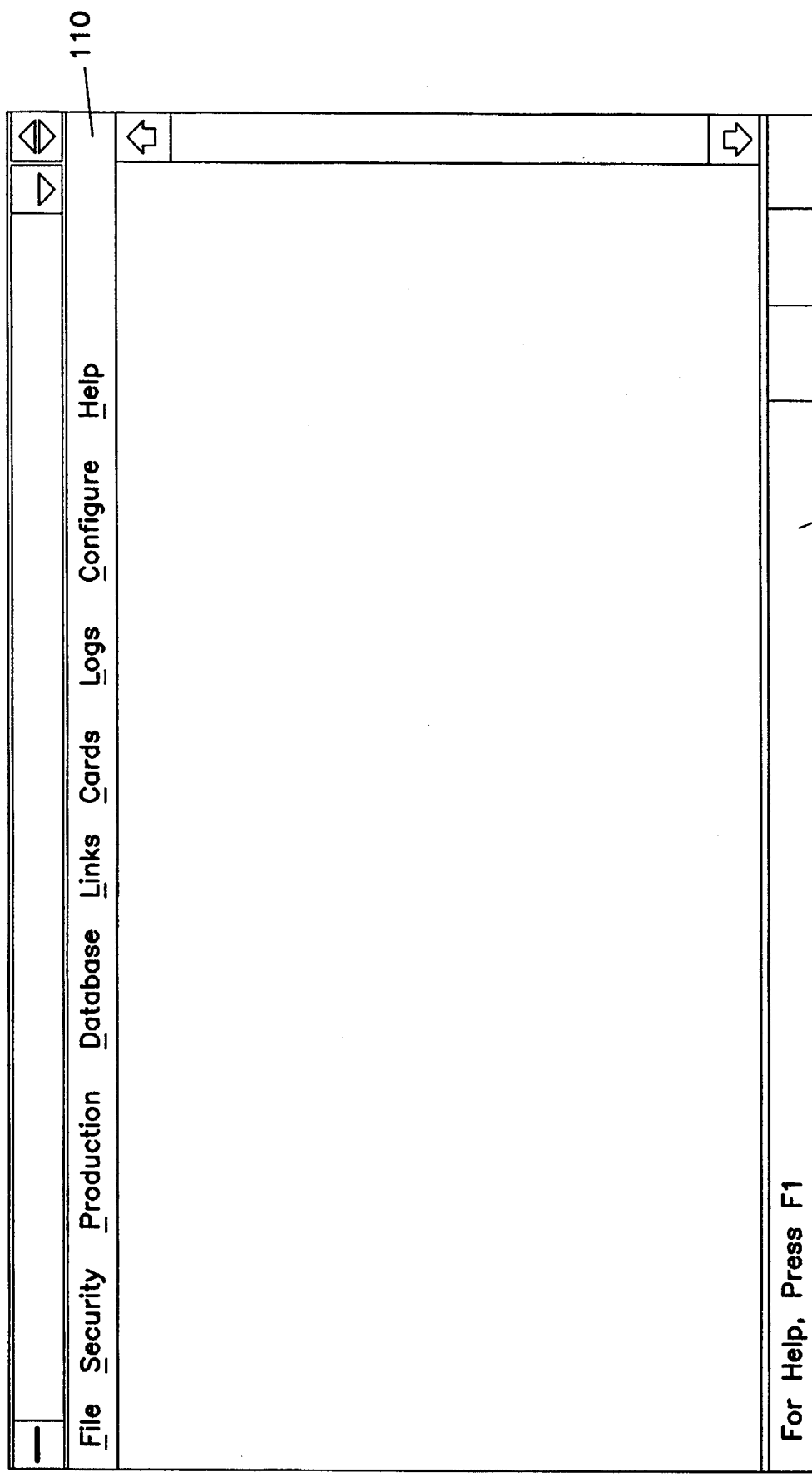
FIG. 4 is an illustration of a Main Window present in a preferred embodiment of the present invention.

All functions are accessed by the operator from the Main Window, see FIG. 4, which is the first window the operator sees upon accessing the system. The operator accesses all functions from this window. This section describes the parts of that window.

Menu Bar

The menu bar 110 displays the Main Menu. You access all functions from the pull-down menus (also referred to as sub-menus) displayed on the menu bar. Each menu and its menu commands is explained in the following sections.

File Menu

Choose the File menu commands to log into and out of the system, exit the system, and close the main window.

Log In
  Choose the Log In command to log into the system as a different user.
Log Out
  Choose the Log Out command to log out of the system.
Exit
  Choose the Exit command to exit the system and return to the Windows' Program Manager window.
Close
  Choose the Close command to minimize the window to an icon. This command has the same effect as clicking on the minimize button.

Security Menu

Choose the Security menu commands to add, modify, and delete authorized system users, as well as regulate the system functions to which each has access. To access the system, you must be defined as a system user. This feature is designed to maintain system security for the entire system, as well as specific system functions.

The system manager should be the only user who has access to this menu option.

Add User
  Choose the Add User command to add a new user to the system. You assign a password to user using this command.
Edit User
  Choose the Edit User command to modify the user's access rights to the system, including their password and rights to specific system functions.
Delete User
  Choose the Delete User command to remove a user from the system. Once removed, a user is unable to access the system.

Production Menu

Choose the Production menu commands to choose the mode of production.

Single Mode
  Choose the Single Mode command to capture the cardholder's image and the data, save the record, and print a card.
Query Batch Mode
  Choose the Query Batch Mode command to query the database for records meeting specified criteria and to print multiple cards for those records returned by the query.
Print
  Choose the Print command to print a card.
Print Preview
  Choose the Print Preview command to view a representation of the printed card on the screen.
Print Setup
  Choose the Print Setup command to configure the printer for the system.

Database Menu

Choose the Database menu commands to define or query a database table.

Define Table
  Choose the Define Table command to define a table for a new or existing database to which cardholder data is stored. If you are not currently using a database to which the system's ODBC is compatible, you can use this command to define a new database. When you choose the Define Table command, a dialog box appears in which you enter the name of the new database table. The Database Definition dialog box appears in which you define the fields of the database table.
Query Table
  Choose the Query Table command to build a database query statement. When you choose the Query Database command, a dialog box appears from which you select the database you want to query. You build a query statement using a graphic interface. When you execute the database query, the system returns the cardholder records that meet the criteria established by the query statement in the Database Query Results dialog box.

Link Menu

Choose the Link menu commands to tie one or more database fields to a field on the card design. You also access the Design Capture Screen function from this menu. The link routes the captured image and text data to the correct database fields when saved and the card design when printed.
  New Link
    Choose the New Link command to create a new link definition between a database and card design. Choosing this menu command displays the Link Definition dialog box. When you create a new link, you assign it a name, by which you retrieve it for modification or specify it for data capture.
  Update Link
    Choose the Update Link command to modify changes in defined links between database fields and card fields. When you update a link from the system, the Select Link dialog box appears. You choose the link to modify and the Link Definition dialog box, for the selected link, appears.
  Delete Link
    Choose the Delete Link command to delete a link from the system. When you delete a link from the system, the Select Link dialog box appears. You select the link to delete; the system asks for a confirmation.
  Design Capture Screen
    Choose the Design Capture Screen command to design the screen on which the operator enters cardholder data and captures the cardholder's image.

Card Menu

Choose the Card menu commands to create, modify, and delete card designs. You can create multiple card designs. You assign each card design a unique name, by which you retrieve it to modify or delete. You can import and export card designs.
  Card Design
    Choose the Card Design command to create a card design. You can create a new card design from scratch, by choosing this command, or you can retrieve an existing card design, using the Edit Card command, modify it, and save it under a different name. When you choose this command, the Card Name dialog box appears. You type the name of the new card design. The Card Design dialog box appears. The client area of this dialog box represents an actual card in which you graphically create the card fields.
  Delete Card
    Choose the Delete Card command to delete an existing card design. When you choose this command, the Cards Available dialog box appears. You select the card design to delete; the system asks for a confirmation.
  Edit Card
    Choose the Edit Card command to modify an existing card design. When you choose this command, the Cards Available dialog box appears. You choose the card design to modify and the Card Design dialog box appears with the requested design appearing in the client area. You can modify the design and save it to a different name to create a new card design.

Log Menu

Choose the Log menu commands to print an audit log or system log.
  Audit
    Choose the Audit command to print the audit log. This report contains up to 1000 entries about the users, modules used, date/time, and operation. When you choose this command, the Audit Log Listing window appears. This window lists each log entry and displays the Log Actions pull-down menu with the commands Query, Print, Clear and Close.
  System
    Choose the System command to print a log of all system activities. This report serves as a good trouble-shooting report because it lists all system activities as they occurred.

Configuration Menu

Use the Configuration menu commands to setup and manage the system configuration.
  System Setup
    Choose the System Setup command to establish the configuration for the system. Only authorized users can choose this command.
  Alter Default
    Choose the Alter Default command to set and change the default settings for system functions.
  Configuration Report
    Choose the Configuration Report command to print a copy of the system configuration.

Held Menu

Choose the Help menu commands to access the system help function and to display version information about system.
  Index
    Choose the Index command to access the system help function index. The index lists the help topics available, from which you can choose one.

Using Help
    Choose the Using Help command to display instructions for using system help.
About System
    Choose the About System command to display version information about the system.

Status Bar

A Status Bar 112 is located along the bottom of the main window. The information displayed depends on where you are and what you are doing in the system. When only the main window is displayed, the status bar displays a description of each menu and menu command chosen by the operator. The three small boxes at the right end of the bar, however, always tell you whether Caps Lock, Num Lock, and Scroll Lock are on. To toggle the Status Bar on and off, choose Status Bar from the View menu. A check mark indicates that the feature is turned on.

System Configuration

When you install the system, the system sets up a default configuration. Before you begin using system, however, you may need to change the default configuration. As you make changes to your system, you may need to reconfigure the system to reflect those changes. Configuring the system involves three functions:

System Setup

Figure 5:
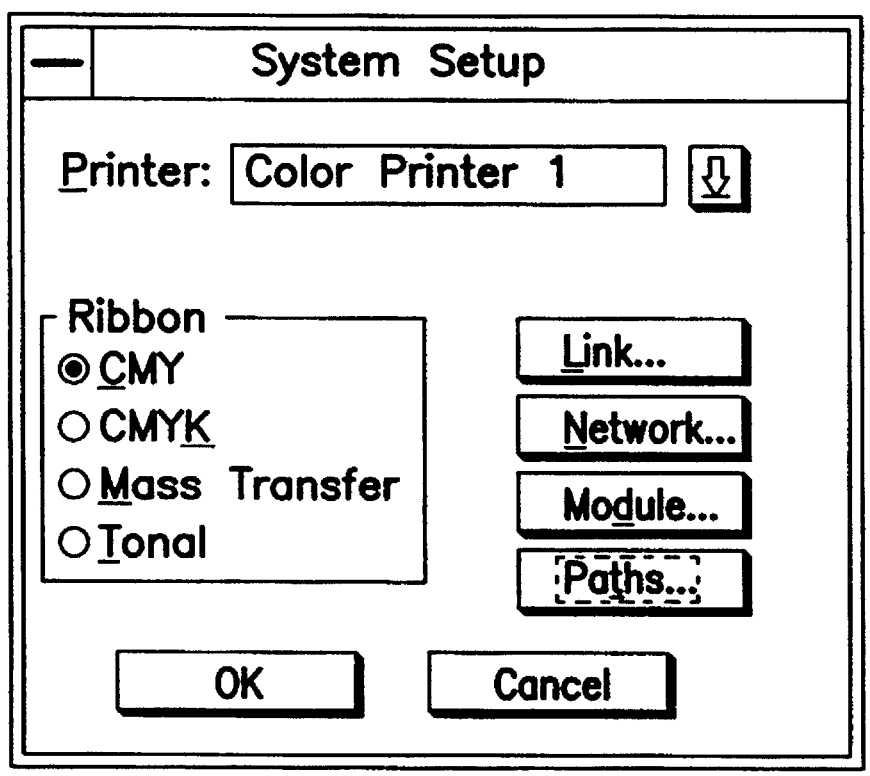
FIG. 5 is an illustration of a System Setup dialog box.

The system provides a system setup dialog box, see FIG. 5, in which you specify the capture and output devices connected to your system, as well as provide information to "customize" the system to your particular site. You should at least check the default configuration, which is displayed in this dialog box, before using the system.

System Setup allows you to define your system site by providing the system with information about the capture and output devices you are using, as well as other pertinent information. You should use this function: after installing the system; whenever you make additions or changes to capture and output devices; and if you reinstall the system.

Figure 6:
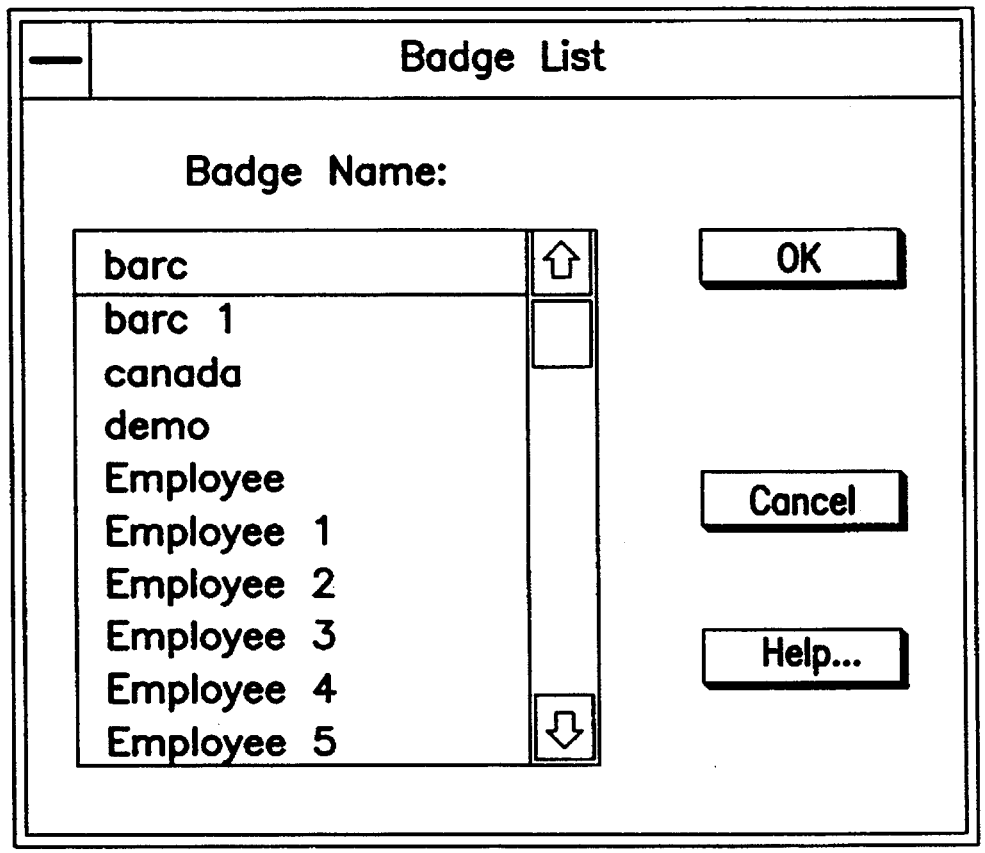
FIG. 6 is an illustration of a Badge List dialog box.
Figure 7:
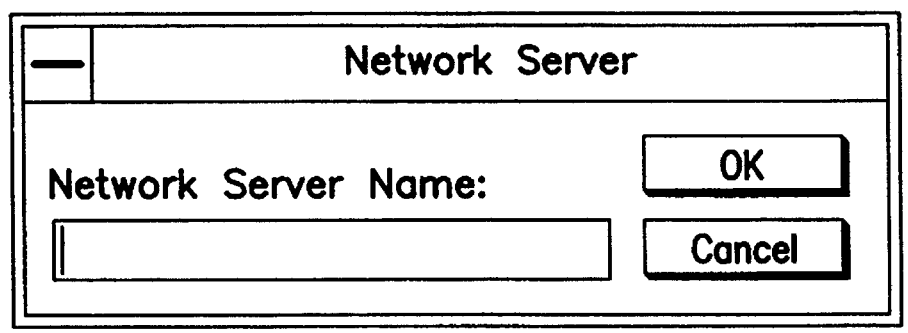
FIG. 7 is an illustration of a Network Server dialog box.
Figure 8:
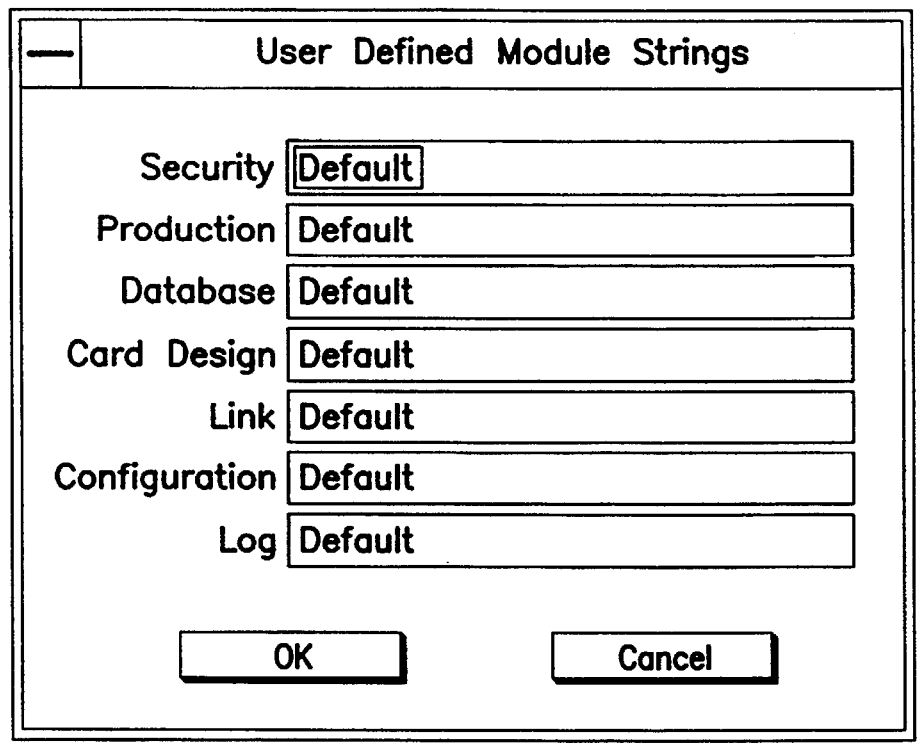
FIG. 8 is an illustration of a User Defined Module Strings dialog box.
Figure 9:
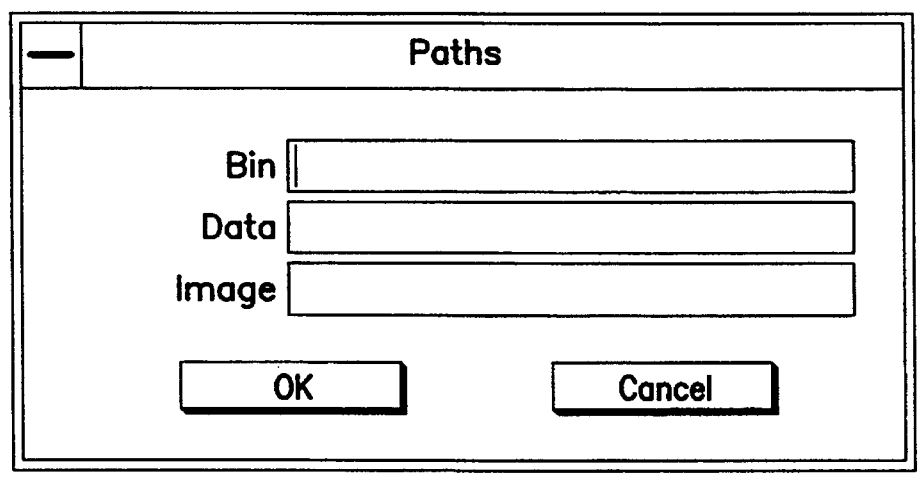
FIG. 9 is an illustration of a Paths dialog box.

When you access many of the system dialog boxes, you will find list box, check box, and option button selections have already been made. These selections are the default selections that the system make initially, based on your system configuration. You may, however, want to change these default selections to reflect your particular use of the system. This function allows you to specify new default selections at any time. The link button is depressed to display the badge list dialog box, see FIG. 6. From the list a particular badge format is selected. The network button is depressed to display the network server dialog box, see FIG. 7. In the network server name box, the path to the desired server is entered. The module button is depressed to display the user-defined module strings dialog box, see FIG. 8. The various module strings are defined by electing the default settings or entering specific user defined strings. The paths button is depressed to display the paths dialog box, see FIG. 9. The bin, data, and image paths are then entered.

Set Default

Many of the system dialog boxes contain list boxes, check boxes, and option buttons from which default selections have already been made. The default selections are designed to save you time. You can use this function, however, to change these default selections to more accurately reflect your site.

Configuration Report

Figure 10:
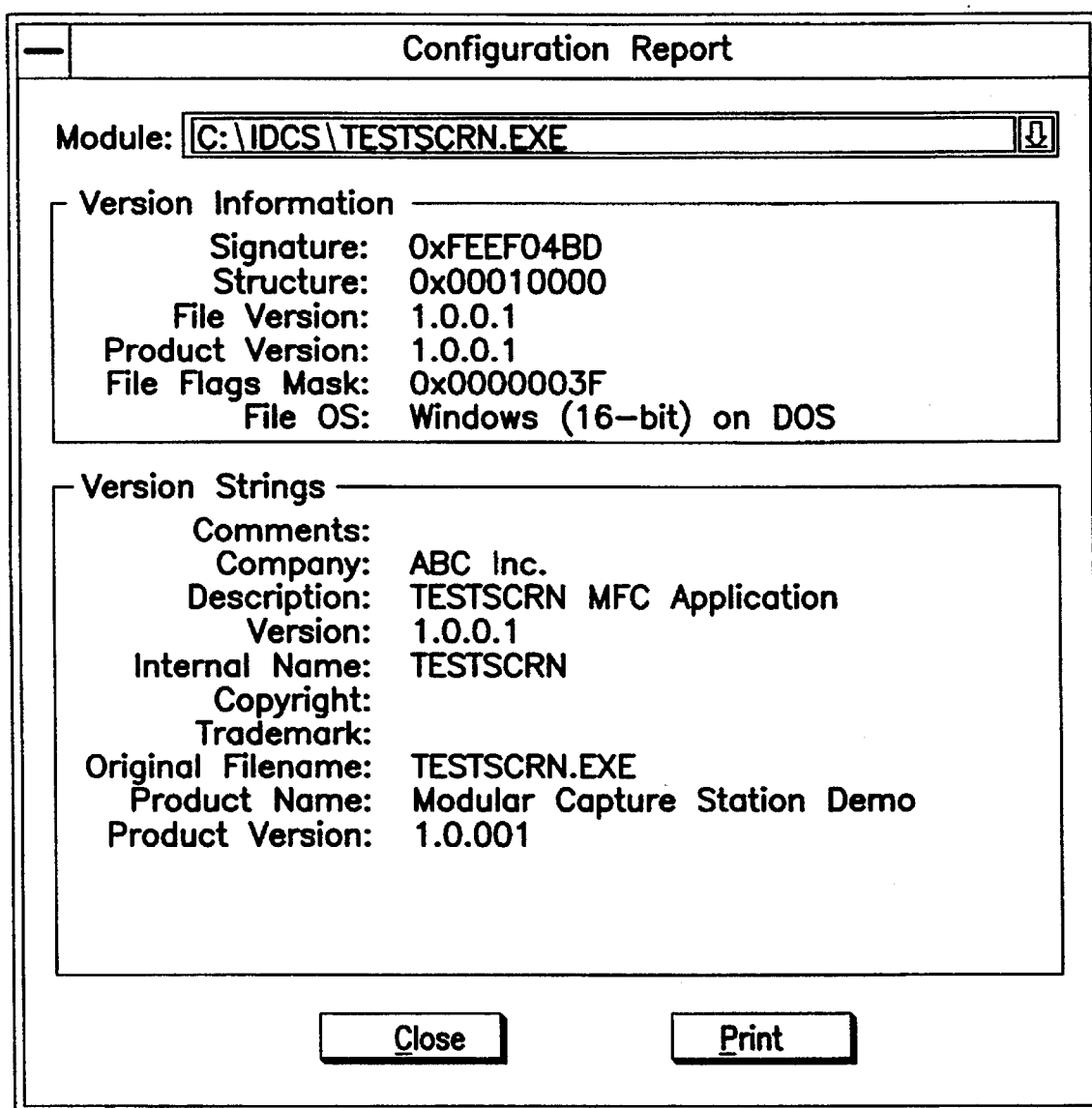
FIG. 10 is an illustration of a Configuration Report dialog box.

After configuring the system, you should use this function to print the current configuration. Upon selecting the configuration menu the configuration window appears, see FIG. 10. A copy of the current Configuration Report may be printed at the local printer. To display the configuration of a particular module, the module name is entered in the module name box.

Print Manager

The Print Manager serves as an important link between the system software and the printer. You use the Print Manager to install and configure the printer, connect to the printer through the network, and to control the printing of cards on the printer.

The system of the present invention uses a customized version of the Microsoft Windows Print Manager. When you print a card, the system creates a PostScript print file and sends it to the Print Manager. The Print Manager then sends the file, in the background, to the printer. You can use the Print Manager to check the status of a print file waiting in the print queue. You can change the status of the file until it starts printing.

The system outputs its card files to the printer in PostScript file format. When you send a card to the printer, the system is actually writing a PostScript program. All text and images are converted to PostScript commands by means of the PostScript driver. This driver interacts directly with the printer. The PostScript commands adhere to a strict structure; if this structure is altered or contains errors, the cards will be printed incorrectly or not at all.

The system handles much of the font management automatically. Because the system utilizes the Windows Print Manager, all TrueType fonts are already installed. If, however, you want to add fonts, you must perform some font management tasks, particularly if the fonts are Adobe® PostScript fonts. If the fonts you add are Adobe fonts, you must designate a TrueType font substitute in the Font Substitute Table. If a TrueType font substitute is not available, you must specify that the font will be downloaded.

Use the following procedures to setup the print options for the printer:

1. Access the system.
2. Choose Print Setup from the Production menu.

The standard Microsoft Windows Print Setup dialog box appears.

3. Select the Landscape option button in the Orientation box.
4. Select User Defined Size from the Paper Size drop-down list box.

The User-Defined Paper Source dialog box appears.

5. Choose the 0.01 cm option in the Unit box.
6. Enter the card width and length in the appropriate text boxes.
7. Choose OK.

You return to the Print Setup dialog box.

8. Choose the Options button on the Print Setup dialog box.

The Options dialog box appears.

There are no printer options to set in this dialog box. However, if you plan to leave the printer on for a long time or plan to print a large number of cards, you can speed up the printing process by telling Windows to send the Post- Script file header once, instead of with each card file. You must repeat this process for each session though.

If you want to send the PostScript file header, proceed with the following steps.

1. Choose the Send Header button on the Options dialog box.

The Send Header dialog box appears.

2. Select the File option.

3. Type the complete path name of the PostScript printer driver.

4. Choose the Send Now button.

You return to the Options dialog box.

5. Clear the Send Header With Each Job check box.

6. Choose OK.

Choosing the right font family, style, and size can help you create whatever look you want for your cards. The right font can also make your card easier to read, as well as more appealing. The font size and type can determine how much text can fit into a single line - - - an important consideration when dealing with a card.

Windows and the system utilize two types of fonts:

TrueType fonts

Screen Fonts

Printers also utilize built-in fonts for printing. These are referred to as printer fonts. You can use also soft fonts with your printer. Soft fonts reside on your PC, but are downloaded to your printer as they are needed. You must install soft fonts using the installation program that came with your fonts package. If an installation program was not included with your fonts package, you can use the Font Installer program provided by Windows.

If matching screen fonts are not available with any soft font packages you purchase then a TrueType font, supplied by Windows is used. Though the font you see on the screen does not look exactly like the font you see in the printed document, the substitute TrueType font does create line lengths on the screen that are similar to those that will print on the printer.

If you select a TrueType font for a text field on a card, the font will look exactly the same on the screen as on the printed card. You do not need to install screen fonts. Because the TrueType fonts are automatically available through Windows, they are available to system and the printer, and you can use them in your card designs. When you use TrueType fonts, the printer driver automatically downloads them to the printer as they are needed; this may require more printing time than if you were to use the printer fonts. TrueType fonts also appear in the Fonts list in the Fonts dialog box. They are preceded with a "TT."

The present invention utilizes the Windows Print Manager. Using the Print Manager provides several capabilities when printing cards on the printer:

Viewing the Print Queue

Changing the Print Queue Order

Pausing and Resuming Printing

Deleting a Card from the Print Queue

Displaying Printer Driver Messages

You can connect to a network printer either when you initially install the printer or afterward. If you have already installed the printer, you must access the Network Connections window via the Network Connections command on the Print Manager's Option menu. If you are in the process of installing the printer, you can access the Network Connections window via the Connect button in the printers dialog box.

User Management

Managing the system users consists of the following tasks: adding a user; modifying a user definition; and deleting a user.

Before anyone can use the system, you must define them as a system user. In defining a system user, you assign the user the following:

Login Name

Password

Functions to which the user will have access

Use the following procedure to add a user. Choose Add User from the Security menu. The User Privileges dialog box appears (see FIG. 11). In the Full Name box, type the user's full name. In the Login Name box, type the name the user will enter when they try to access the system. In the Password box, type the password assigned to this user. In the Confirm Password box, type the same characters you typed in the Password box. Select the functions to which the user is to have access. There are eight functions listed in the User Privileges Dialog Box, any of which can be selected. The functions are: Card Design, Link Design, Database Design, Production, Security, Log Files, and Configuration. Choose OK.

Figure 12:
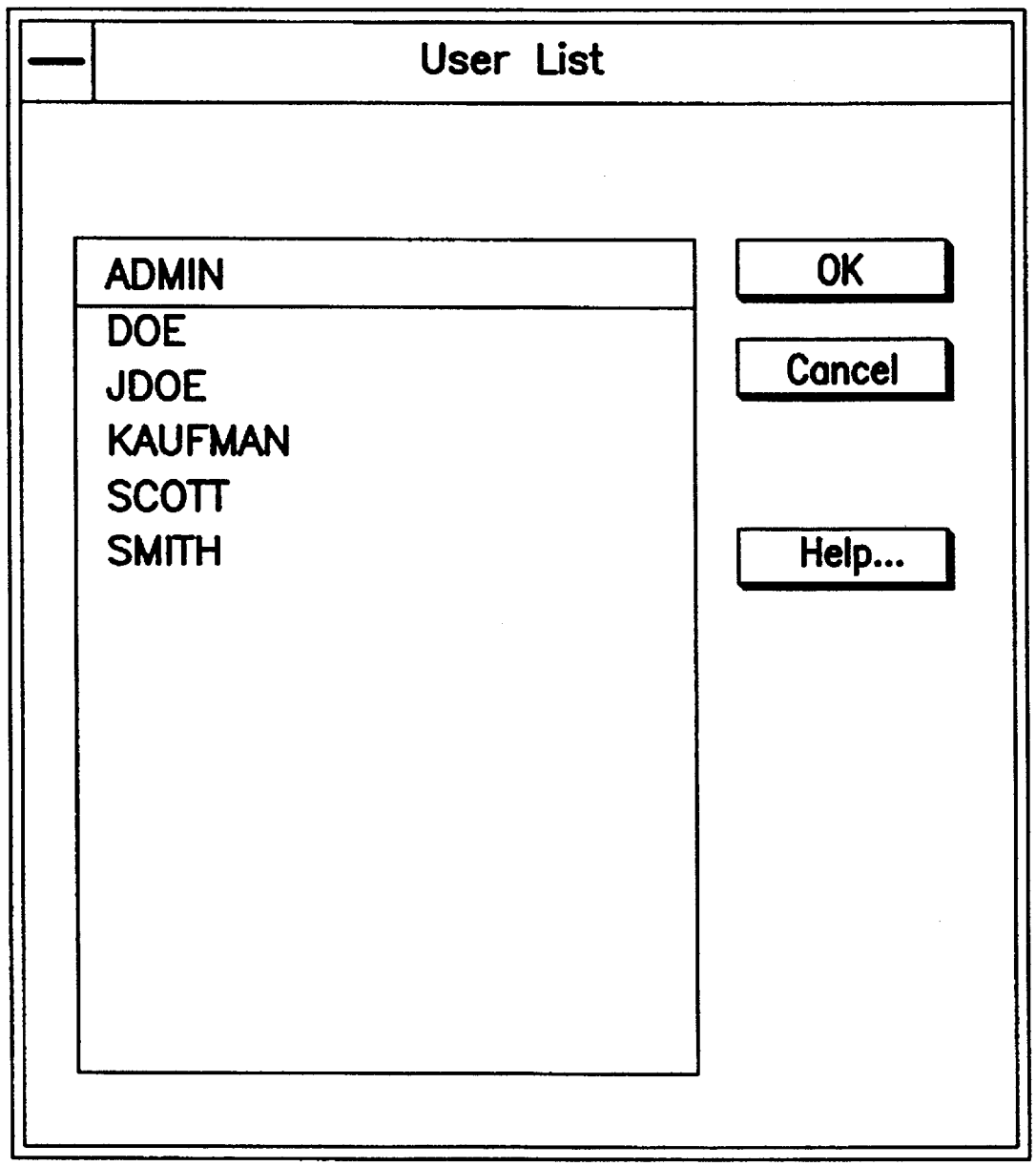
FIG. 12 is an illustration of a User List dialog box.

You can change a user's definition at any time. You can assign the user a new login name, password, password confirmation, and access rights. Choose Edit User from the Security menu. A User List appears on the screen, see FIG. 12. Select the login name of the user whose user definition you want to change. Choose OK. The User Privilege dialog box for the selected user appears with the full name, login name, and functions identified. The password and confirm password are crossed out so as to not be visible. Make any changes to the user definition you want. Choose OK.

You can delete a user at any time. Once deleted, the user cannot access the system using their previously assigned login name and password. Choose Delete User from the Security menu. The User List dialog box appears listing all defined users. Select the user whose definition you want to delete Choose OK. The User Privileges dialog box to delete the selected user appears, see FIG. 13. The Delete button replaces the OK button. Choose the Delete button. The system removes the user definition from the system.

Database Management

The system provides a complete database management system for your cardholder data. You can save cardholder data, as entered by the operator on a Data Capture window to a database, if you wish. The database may be local, networked, external, or distributed. If you currently store your cardholder data in an existing database system, and you want to continue using it with the system, the database must be Open Database Connectivity (ODBC) compatible. Otherwise, the system enables you to create your own database to which you can save cardholder data.

The system offers the following database management functions:

New Database File—You must define your database table, whether your database is internal or not, and define its fields in the system, whether the database is local, networked, external, or distributed. Defining the database table consists of defining each of the fields contained in the database. For each field, you define its name, length, number of decimal places, type, null, and uniqueness. Once defined, you can view and modify your database configuration, fields, and keys at any time. The system allows you to create and use multiple database tables.

Delete Database File—You can delete any existing database file.

Alter Database—You can add, modify, and delete fields from the database table, as well as change any of a field's attributes.

Query Database—Using standard SQL and an easy-to-use graphic user interface, you can issue database queries to query any existing database to retrieve cardholder records. You build the query statement using standard Structure Query Language (SQL) syntax in a graphic user interface. This feature is most useful in retrieving records for printing cards in batch mode. You can also, however, use the query function to query records for reports and deletion.

If you intend to use the system in conjunction with an existing cardholder database and that database management system is ODBC compatible, you must create a database table defining that database. If you intend to create a database for cardholder data from scratch, using system database management tools, you must define a table for that database. The database table is a listing of the fields contained in the database in the order in which they occur. For each field, you must specify the field's characteristics, such as its type, length, and whether or not it is a key field. Before you begin, it is important, especially if you are using the system database management tools to create the database from scratch, to plan the database before hand. The database table definition function allows you to make changes to the database table, planning the table beforehand will save you time in the long run. When planning the database, consider the various fields you are going to require, the type of data each will contain, the length of each field, and which fields will be keys.

Figure 14:
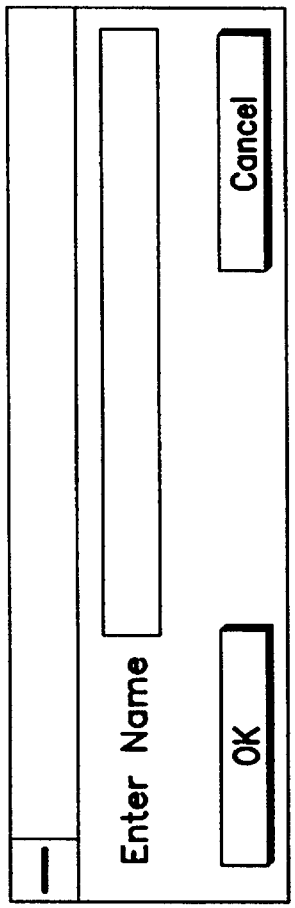
FIG. 14 is an illustration of a Database Table Name dialog box.
Figure 15:
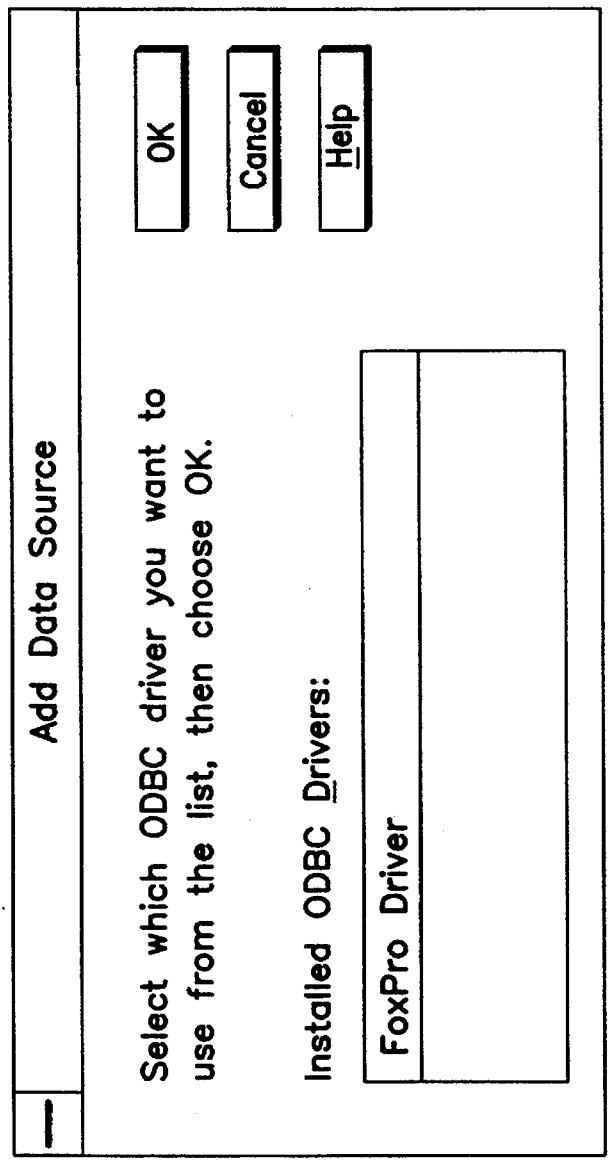
FIG. 15 is an illustration of an Add Data Source dialog box.

Use the following procedure to define a database table. Choose Define Table from the Database menu on the main screen. A Database Table Name dialog box appears, see FIG. 14 including a name box for entry of the table name. In the Name box, type the name of the database table you want to define. Choose OK. The Add Databox Source Box dialog box appears, see FIG. 15.

Figure 16:
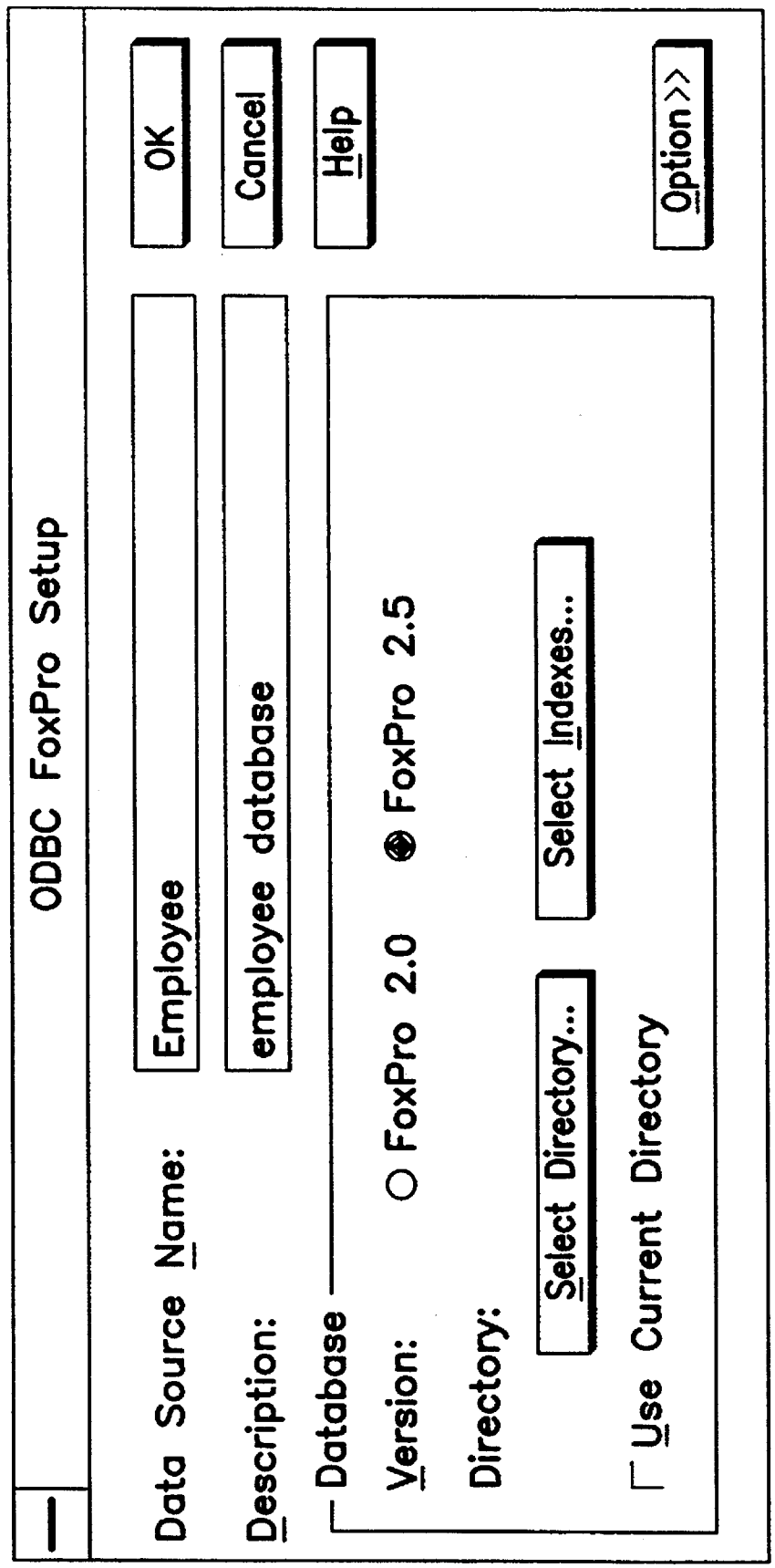
FIG. 16 is an illustration of an open database connectivity (ODBC) database setup dialog box.
Figure 17:
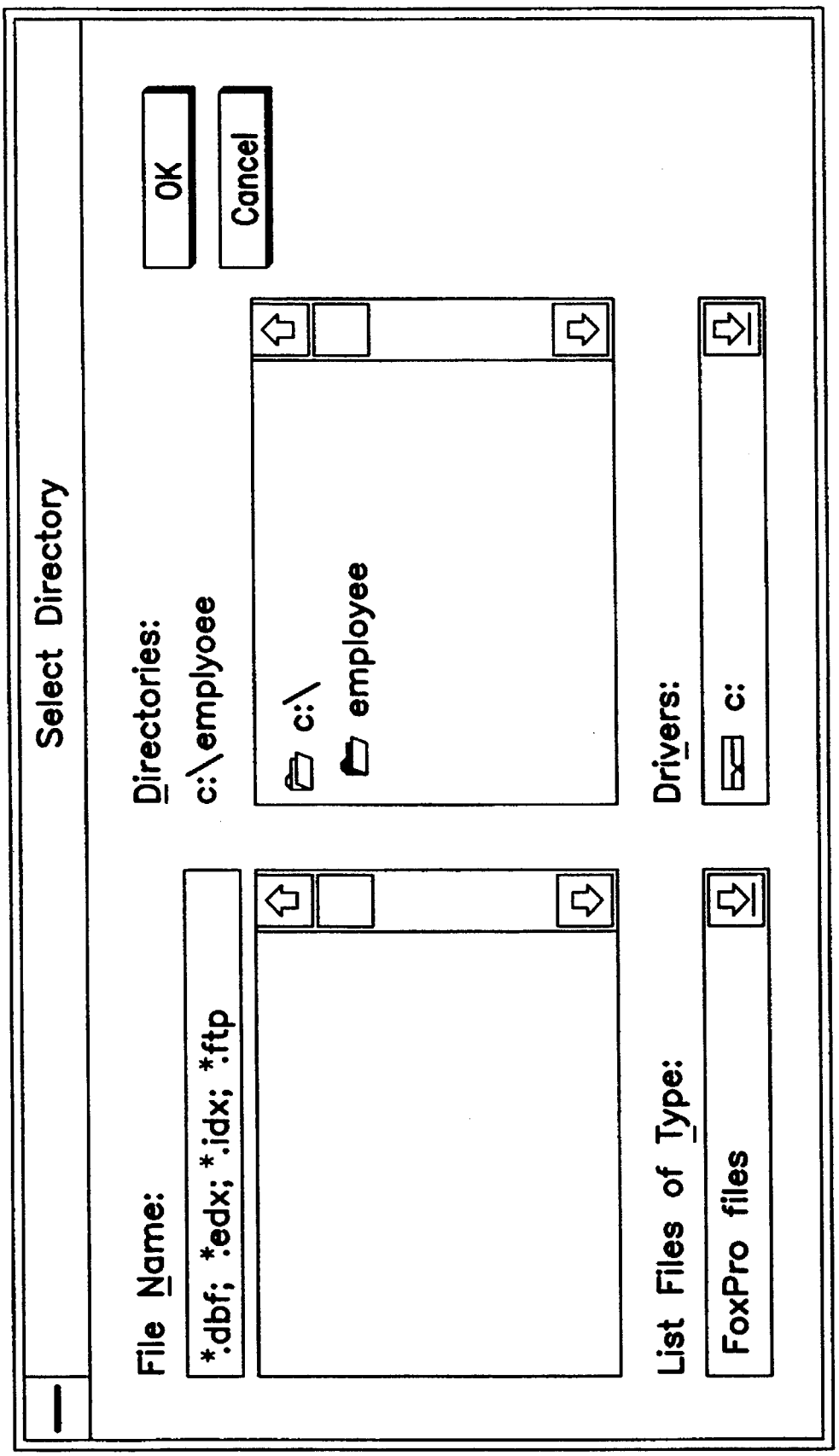
FIG. 17 is an illustration of a Select Directory dialog box.

Any ODBC compatible database can be used with the present invention. Each ODBC database comes with its own driver, or one can be purchased from a commercial vendor; e.g., Microsoft. A preferred embodiment of the present invention uses the FoxPro database driver. The driver must be installed and once installed the name of the driver will appear in the Add Data Source dialog box. More than one driver might appear if there are multiple databases. In the Installed ODBC Drivers box select the database driver you want to use. Choose OK. The ODBC database Setup box appears, see FIG. 16 where the ODBC FoxPro Setup is illustrated. The ODBC database Setup box may vary slightly from one database to the next. Type a short description of the database in the Description box. Select a database version. Choose the Select Directory box. The-Select Directory box appears, see FIG. 17. The database driver setup creates a default sub directory in the root directory and assigns it the same name as your database. It is important to select a separate sub directory for each database file you want to create. If you place multiple database tables in the same sub directory, the system may attempt to join all the databases within the sub directory when you perform a database query. You do not have to create the sub directories for the database files. Setup automatically creates these for the operator. The File Name box lists the various types of file extensions created by the database driver. They include the extension .DBF, which is the database itself, and .CDX which is the database's index. Either choose OK to store the database in the default sub directory or select the sub directory in which you want to place your database file. Choose OK. The Database Design box appears, see FIG. 18.

The Database Design dialog box consists of two parts: the field definition area 114 and the database table 116. You define each database field in the field definition area, which includes the top half of the Database Design dialog box. The entire database table, including all defined fields, is displayed in the database table area. As you define and add fields, in the field definition area, they appear in the table below. You can use the database table area to not only view the fields as they are created, but to select fields to modify or delete.

Use the following procedure to add a field. In the Field Name box, type the name of the field. In the Length box, type the maximum length of the field, in characters. In the Decimal box, type the number of decimal places used in this field or leave the value at zero for no decimal places. From the Field Type box, choose the type of data this field contains. Listed below, in Table 7, are the field type and the kind of data the field would contain.

TABLE 7

| Type | Description of Contents |
| --- | --- |
| | Database Field Types |
| Character | Alphanumeric data; e.g. name, address, city state, phone number, 9-digit zip codes, etc. |
| String | A sequence of positive (nonnegative) integers. |
| Integer | Numeric data only; e.g. 5-digit zip codes, height, weight. |
| Long | Text that is variable in length but too long to be stored in a character field. Can contain alphanumeric characters, as well as line breaks, tabs, and other print control characters. |
| Auto Increment | A numeric value that increments with each record in the database. |
| Logical | Date; e.g. initiation date, |
| Date | expiration date |
| Currency | Monetary amounts. Formatted to contain up to 6 decimal places and a monetary symbol; e.g. balance due, monthly payment |
| Image | Live video image of cardholder as captured by the system. |

Select the Not Null check box if you want the field to be a required field. Select the Unique check box if the field's contents will always be unique with every record. Unique fields serve as key fields. Choose the Add a Field button. The field appears in the Database Table. Do one of the following:

To add another field, return to Step 1.

To modify a field, go to "Modifying a Field."

To delete a field, go to "Deleting a Field."

To exit the Database Design dialog box, choose the Done button.

Once you create a field, you can modify its description. In the database table, select the field whose definition you want to modify (see FIG. 19 for a sample listing of fields). You select a field by choosing it from a list of defined fields in the database table. You can choose the next field by choosing the Next button. You can choose the previous field by choosing the Previous button. The field becomes highlighted. The field's definition attributes appear in their appropriate boxes in the field definition portion of the dialog box. Make any changes to the field's definition that you like. Choose the Add Field button. The changes now appear in the database table for the selected field. To modify another field, return to Step 1, to add a field, go to "Adding a Field", to delete a field, go to "Deleting a Field", or to exit the Database Design dialog box, choose the Done button.

You can delete any field from the database table. Any data associated with the field will also be deleted. In the database table, select the field you want to delete. You select a field by clicking on it. You can choose the next field by choosing the Next button. You can choose the previous field by choosing the Previous button. The field becomes highlighted. The field's definition attributes appear in their appropriate boxes in the field definition portion of the dialog box. Choose the Delete Field button. The system removes the field from the database table. Do one of the following: to delete another field, return to Step 1, to add a field, go to "Adding a Field", to modify a field, go to "Modifying a Field", or to exit the Database Design dialog box, choose the Done button.

Figure 20:
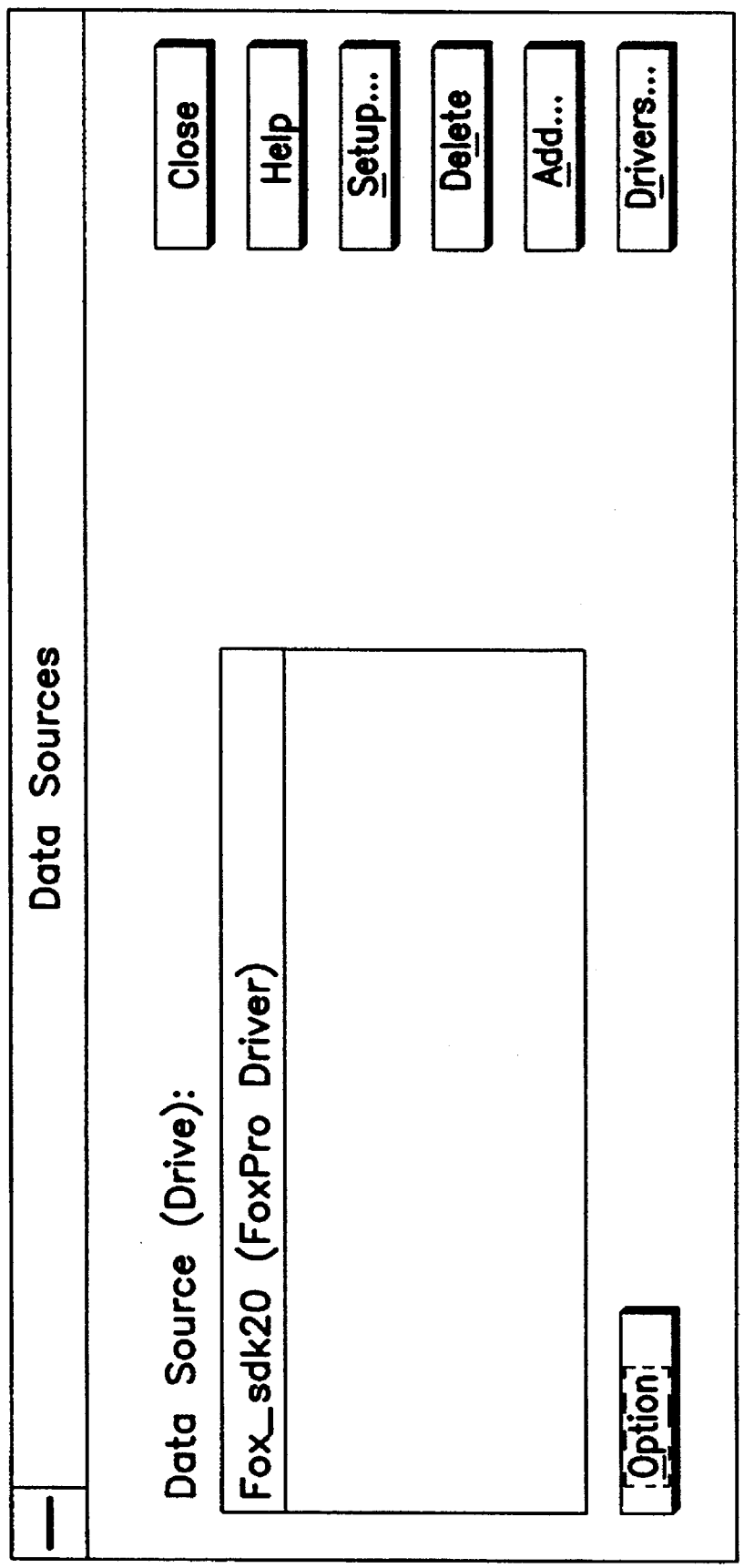
FIG. 20 is an illustration of a Data Sources dialog box.

You can delete any unused database file from the system. Choose from the Database menu, choose Delete Database File. The Data Sources dialog box appears, see FIG. 20. Select the database file you want to delete and choose the Delete button.

Figure 21:
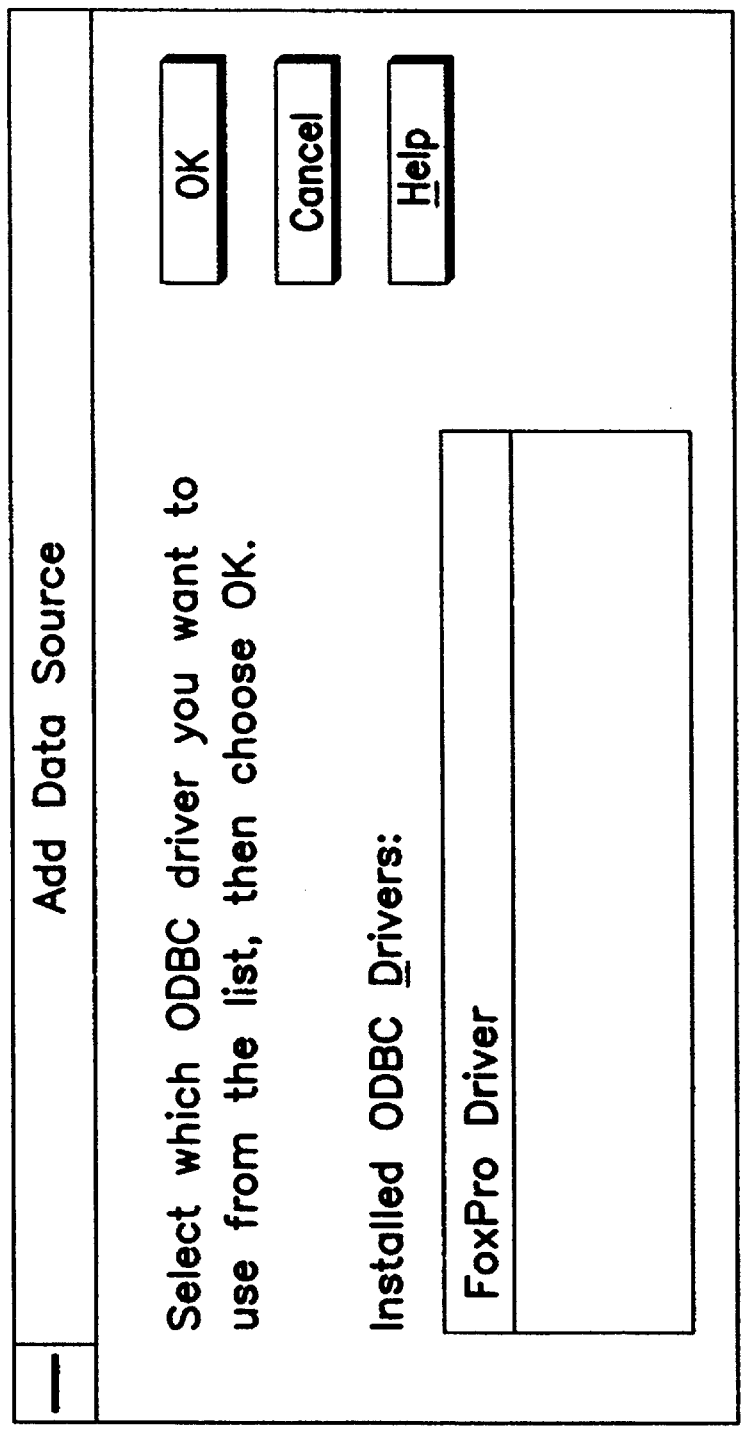
FIG. 21 is an illustration of an Add Data Source dialog box.

Once you have created a database file, you may find it necessary to change its structure. You can alter the structure of any existing database file. You can add fields, modify fields, and remove fields. Altering the database consists of choosing the ODBC Data Source, adding a field, modifying a field's attributes, and deleting a field. Before a database can be altered you must specify the database source to be altered. From the Database menu choose Alter Database. The alter Data Source dialog box appears, see FIG. 21. From the ODBC Driver box select the database you want to alter. Choose OK. The Database Design Dialog box appears, see FIG. 22. You can add, modify, or delete a field by selecting the desired field (blank field if adding a field), making the appropriate changes if any, and then pressing the appropriate Add Field, Update Field, or Delete Field button.

If you save the cardholder data to the database each time you capture cardholder data, you can query the database for selected cardholder records. Once the system retrieves the records, you can print the records onto cards, print cardholder reports, and/or delete the records from the database.

To query the database, you access the database Query dialog box. You use the Query dialog box to build a query statement. The query statement states the conditions by which the system selects the records to print. For example, you could build a query statement requesting the records of all card holders whose last name begins with "T" or whose expiration date fell between Aug. 1, 1993 and Aug. 31, 1993. When you query the database, the system searches all of the records for those meeting the conditions you specified in the query statement. The system returns a list of all of the records that it found meeting your conditions. You can then select the specific records for which you want to print a card. To query a database you can build many kinds of query statements; however, to query the database for records to print, you need only build a SELECT statement. The SELECT statement selects records meeting the search conditions you specify as part of the statement. The Query dialog box is designed to simplify the process of building a SELECT statement. You must build your own SELECT statements to meet your needs. Some examples of some SELECT statements are provided. Because your database and printing needs are unique to your site, your SELECT statements will be unique.

A Production Query Dialog Box, see FIG. 23, is used to query the database. The Production Query Dialog Box can be accessed from several locations in the system. For example, from the Production Menu Query Batch Production can be chosen or from the Data Capture Window, the Query button can be selected.

Using the Query Tools

The first step in building a SELECT statement is to become familiar with the tools you will use to build it. All of the tools are located in the Query Dialog Box. The Query Dialog Box contains the text box, labeled Query Statement, in which you build the actual SELECT statement. You create the SELECT statement by selecting the items in the Database Fields, Query Builders, and Attributes sections of the screen and by typing directly in the Query Statement box. When building a SELECT statement, you must use a certain format, or syntax. The format specifies the parts of the statement and the order in which you must place them. This format is shown below:

SELECT*FROM<table name>WHERE<search condition>

Below, in Table 8, is described each of the SELECT statement components.

TABLE 8

| SELECT Statement Components | |
|---|---|
| Component | Description |
| SELECT | Retrieves data from one or more database tables. It uses the database as its input and outputs a list of records (rows) that satisfy the search conditions specified in the WHERE clause. |
| * | Specifies that all records (rows) meeting the search condition specified in the WHERE clause will be retrieved. You can replace the asterisk with the name(s) of a database field (column). The name specified must exist in the database table specified in the FROM clause. If you specify more than one, you must separate them by commas. |
| FROM | Specified the database table for the query. |
| <table name> | The name of the database table, included in the FROM clause. |
| WHERE | Introduces the search conditions that determine which records (rows), from the database specified in the FROM clause, are retrieved. |
| <search condition> | Specifies the search conditions by which the system searches the database and retrieves records. When creating the search condition, the following rules apply:<br>• You can include any database fields listed in the Database Fields box of the Query window.<br>• You also use the operators represented by buttons under "Attributes" in the Query window. They include:<br>= Equal to<br>> Greater than |

TABLE 8-continued

SELECT Statement Components

| Component | Description |
|---|---|
| < | Less than |
| >= | Greater than or equal to |
| <= | Less than or equal to |
| ! | Not equal to |
| % | |
| _ | |
| • | You must type any values associated with the operators directly into the Query Statement box. |

Use the following procedure to build the SELECT statement by which you can query the database for records from which you can print cards in batch mode:

1. Choose the SELECT button.

The word "SELECT" appears in the Query Statement box.

2. Do one of the following:
   Choose the ALL button from the Query Builders section.
   Type the names of specific database fields that you want retrieved with each record that meets the search conditions, e.g. first name, last name, membership number, address1, address2.

3. Choose the FROM button.

The word "FROM" appears in the Query Statement box.

4. Type the name of the database from which you want to retrieve records, e.g. members, clients, cardholders.

5. Choose the WHERE button.

The word "WHERE" appears in the Query Statement box.

6. Enter the search condition in the Query Statement box by choosing the name of the database field to which the search conditions are to be applied, choosing operators from the attributes area of the window, and by typing values directly into the box.

Examples of SELECT query statements follow. These examples are for fictitious databases and do not necessarily reflect your own database.

Retrieve all member records from the MEMBERS database:
SELECT * FROM MEMBERS

Retrieve all member records from the MEMBERS database whose last name begins with "G" SELECT * FROM MEMBERS WHERE lastname=G Retrieve the first name, last name, and account number for all client records from the client database whose initiation date was during 1993
SELECT firstname, lastname, accnt# FROM CLIENT WHERE initdate>010193

Figure 24:
FIG. 24 is an illustration of a Data Capture window with cardholder data.

In addition to the basic SELECT statement, you can add functionality to the statement through the use of clauses. A clause is a statement, which performs a specific function in the retrieval process, consisting of a command and its parameters. You can add clauses to your SELECT statement to perform the following functions:

Add a subquery: EXISTS
Specify a range of values for the search criteria: BETWEEN
Specify a character string as the search criteria: MATCH
Sort the retrieved records by field: GROUP BY/HAVING
Sort in sequence: ORDER BY
Eliminate duplicate records: DISTINCT After you have built your SELECT statement, you can query the database for the records meeting the search criteria you specified in the SELECT statement. Choose OK. After a few moments, the system returns the database records meeting your criteria and displays them in the Data Capture window, see FIG. 24 which illustrates a Data Capture window labeled Testscrn, displaying a retrieved card record. You can view, modify, delete and print cards from the individual cardholder records. Retrieved cardholder records are displayed one at a time. The records are arranged in ascending numeric or alphabetic order, depending on the records' key field, or the field you selected for the ORDER BY statement. The Data Capture window contains command buttons that allows you to scroll through the retrieved records, one at a time.

The FIRST button displays the 1st of the retrieved records. NEXT displays the following record of those retrieved. LAST displays the last of the retrieved records. PREV displays the previous record of those retrieved. Each of the cardholder records retrieved can be printed by selecting the PRINT button while the cardholder record is displayed. CLEAR is used to remove a record from the Data Capture window. Press CANCEL to return to the main application window. Press UPDATE to update a cardholder record. Press DELETE to delete a cardholder record. Press INSERT to insert a cardholder record. Press QUERY to query cardholder records.

Card Design Management

The system offers you the ability to create your own card designs. In addition, the system includes some card design templates that you can use as is, or as a basis for your own designs. The Card Design module offers the following functions:

Creating a Card Design

You design cards in a WYSIWYG environment, allowing you to see what the card will look like when printed on the ImageCard II as you develop it. You can create card designs from scratch or use, as is or modified, any of the template designs provided with the system. You can create multiple card designs and tie each design to a particular data capture screen and database, using the Link module.

Saving a Card Design

You save each card design under a unique name, enabling you to retrieve it for modification. The system saves the card design, and all its attributes, to an internal database. You can also retrieve a card design, modify it, and save it under a different name.

Modifying a Card Design

Once you create a card design, you can modify it at any time. You simply select the card design name from a list of existing card designs and it appears in the Card Design window. You can modify an existing card design and save it to a different name to create a new card design.

Importing a Card Design

You can use the import function to import badge forms, logos, and card background patterns. The Import dialog box displays a list of files, from which you select the one to import. You cannot overwrite existing card designs using the import function.

Exporting a Card Design

You can use the export function to save the card design to a destination file.

Deleting a Card Design

You can delete a card design provided it, or any of the fields on it, are not linked to a database field. You can remove links using the Link module, however, before you delete a card design.

You can create card designs from scratch or modify one of the templates provided with the system. Card Design contains the following basic functions:

Select Card Background

You can select a card background of a specific bitmap, pattern, or color. When you select a card background, the selected background appears in the card design window.

Define Selected Field

You design cards using the field as the basis. You can define data text field, static text fields, bar code fields, image fields, bitmap fields, and solid fields. For each field, depending on its type, you can define such attributes as size, location, font, and color.

Delete Selected Field

Once you create and define a field, you can delete it from the card, provided it is not linked to a database field. If it is linked to a database field, you must remove the link before deleting it.

Test Print Card Design

You can print the card design to the printer as you design it, to get an idea of what it will really look like.

Save Card Design

Once you create the card design you save it to an assigned name. You use the assigned name to retrieve the card design for modification, as well as creating a link to the corresponding database fields.

The following procedure is used to access the Card Design module:

Choose New Card from the Cards menu.

Figure 25:
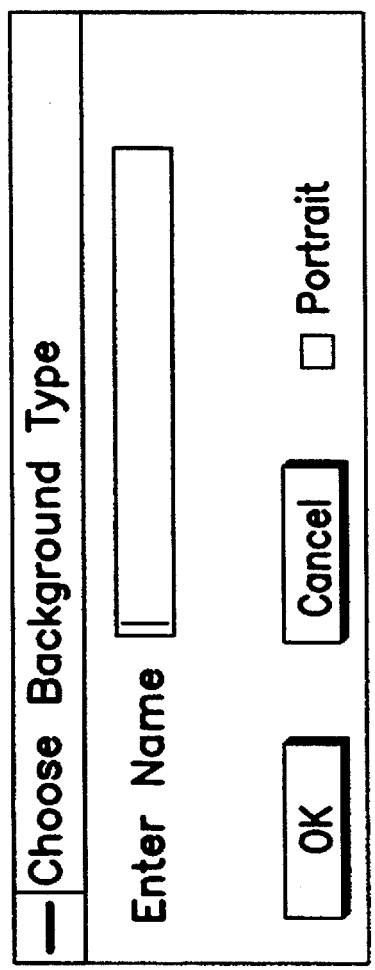
FIG. 25 is an illustration of a Choose Background dialog box.

The Card Name dialog box appears, see FIG. 25. Enter the name of the new card and check the portrait box if the card is to be portrait orientation. Choose OK. The Card Design window appears, see FIG. 26. The Card Design window represents an actual plastic card. It is in this WYSIWYG environment that you create the design for your card. The Card Design window contains rulers to assist you in aligning the card components, or card fields. The Card Design window utilizes its own menu.

1. Position the cursor inside the Card Design window.
2. Press the right mouse button.

The Card Design menu appears:
  Select Card Background
  Define Selected Field
  Delete Selected Field
  Move to Front
  Move to Back
  Test Print Card
  Save Card Design
  Save As
  Exit Card Design The first step in creating a card design is to select the card background, if you wish to use one. You can choose from three different kinds of card backgrounds:

Background Bitmap

You can import a bitmap file (.BMP, .DIB) to serve as the card background. When you select bitmap, an Open dialog box, from which you select the desired bitmap file, appears.

Background Pattern

You can select from a collection of patterns to serve as the card background. When you select Background Color, . . .

Background Solid Color

You can select a solid color as the card's background. When you select Background Solid Color, a color palette window, from which you can choose an existing color or create a customized color, opens.

Figure 27:
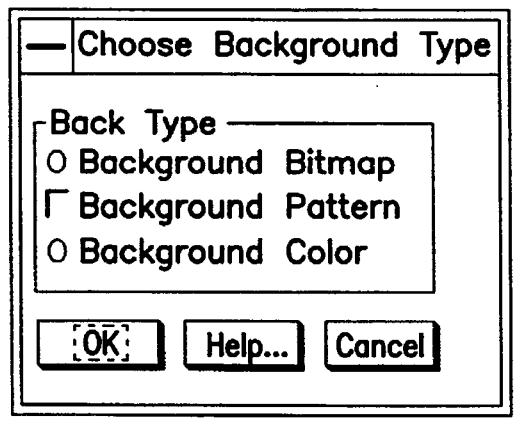
FIG. 27 is an illustration of a Card Background Dialog Box present in a preferred embodiment of the present invention.

To add a background to your card design choose Select Card Background for the Card Design menu. The Card Background dialog box appears, see FIG. 27.

Figure 28:
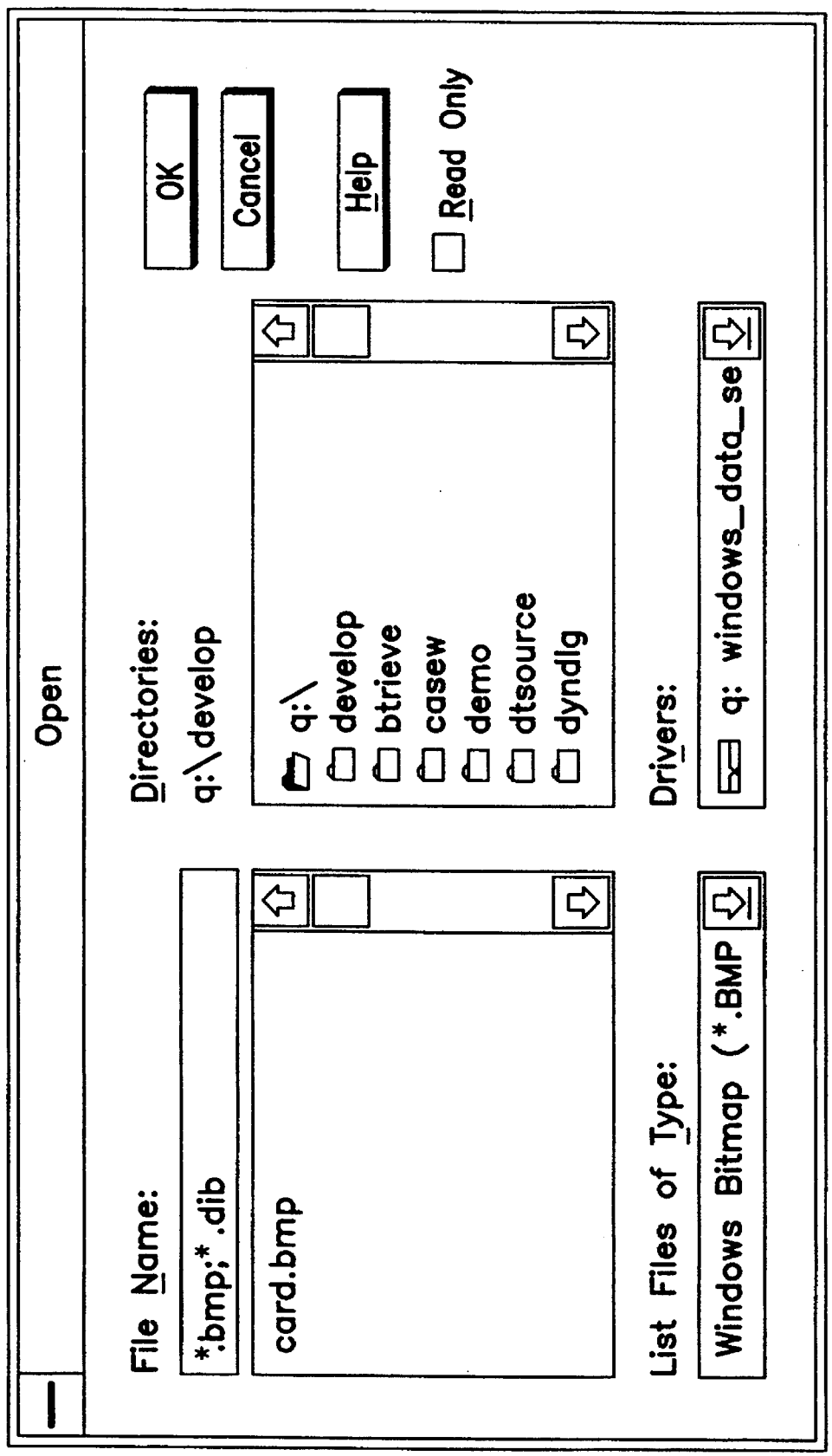
FIG. 28 is an illustration of an Open Dialog Box present in a preferred embodiment of the present invention.

To select a background bitmap, from the Card Background dialog box, select the Background Bitmap check box. If you want the bitmap to appear in a tiled pattern, select the Background Pattern option. Choose OK. The Open dialog box appears, see FIG. 28. Select the bitmap file to use as the card background. Choose OK. The Card Design window appears with the selected bitmap file as the card background.

To Select a background solid color perform the following steps: From the Card Background dialog box, select the Background Color check box. Choose OK. The Color dialog box appears, see FIG. 29. You can either select a basic color to use as the background or you can create a custom color.

To select a basic color background: From the Basic Colors group, select the color you would like to use as the card background. Choose OK.

Figure 30:
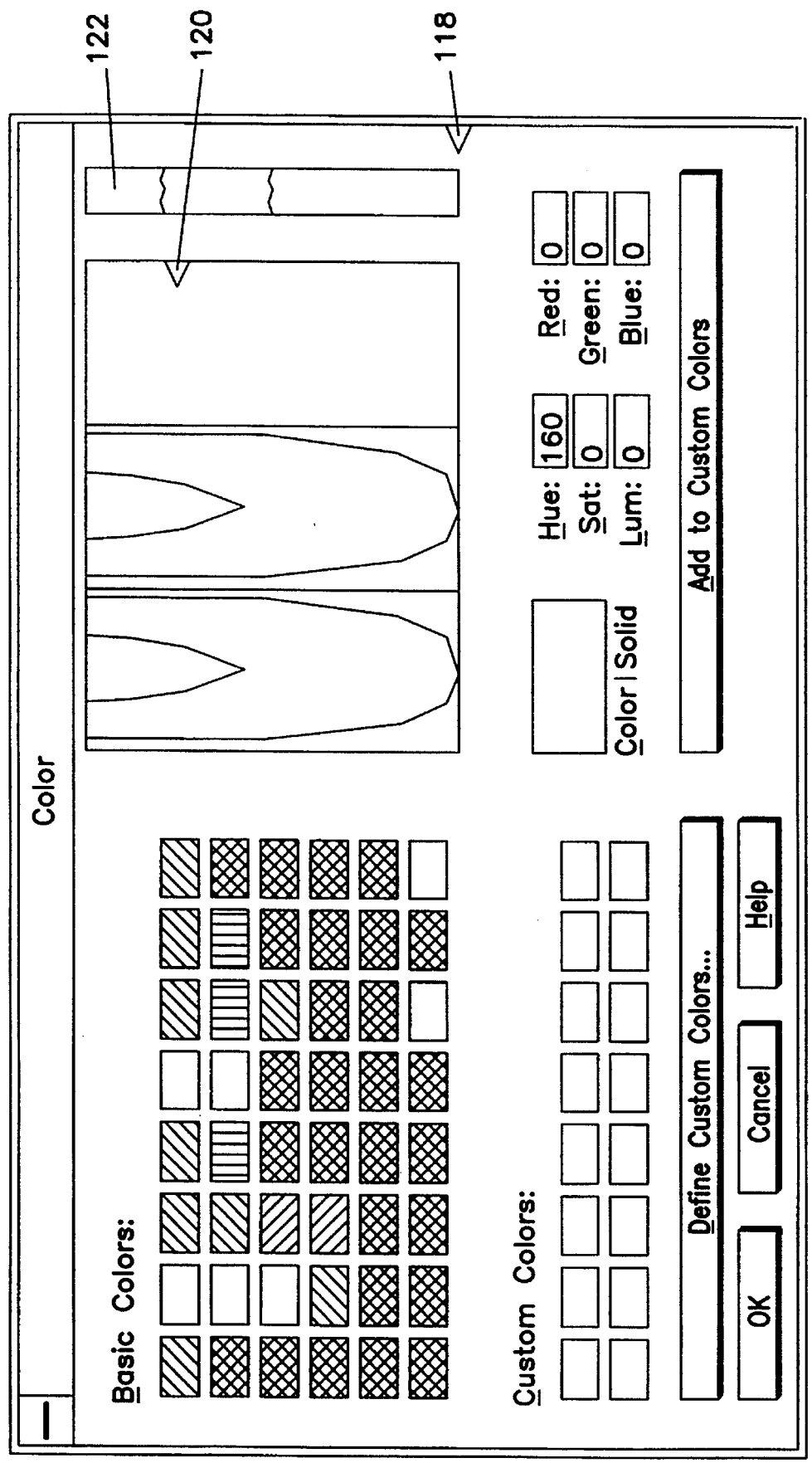
FIG. 30 is an illustration of the Color Dialog Box expanded to include a customized color portion.

The color palette contains 48 different colors from which you can choose. If those colors are not satisfactory, you have the capability of customizing your own color by performing the following steps: From the Color dialog box, choose Define Custom Color. The Color dialog box expands to include the customize color portion of the Color dialog box, see FIG. 30.

The Color/Solid box, located in the lower left corner of the dialog box, displays the "current" and "pure" colors. The current color appears on the Color side of the Color/Solid box, while the pure color that is closest to the current color (as determined by your device driver) appears in the Solid side of the box. When the current color and pure color do not match exactly, the current color is dithered, or displayed as a patterned mixture of two colors. Dithering is simply the way Windows displays colors. The true color will appear on your card's background. The current color's Hue or pure color, Saturation or difference from gray, and Luminosity or closeness to black or white is displayed in the appropriately marked boxes. A pointer 118 marks shade currently in use or luminosity. A pointer 120 marks current color which is represented by Hue and Saturation values. A shade bar 122 displays shades of current pigment.

To display a customized color in the Color/Solid box, do any of the following:

Point to the Solid side of the box and click the left mouse button to display the same color in the Color side.

Point to a color in the Color Table and click the left mouse button, or drag the pointer through the table to display the colors over which it passes.

Point to a shade in the Shade Bar and click the left mouse button, or drag the pointer up and down on the bar to display the color's shading.

Change the values in the Hue, Saturation, and/or Luminosity boxes.

Change the values in the Red, Green, and/or Blue boxes.

Choose Add to Custom Colors to transfer the customized color to a box in the Custom Colors portion of the Color dialog box. Select the customized color you want to use as the card's background. Choose OK.

Card fields form the basis of all card designs. You can create and place a card field anywhere on the card and size it to any dimension. You define each card field by type, which determines the field's contents. You can create the following types of card fields:

Data Text

Data text field contain cardholder data. The data can originate from the cardholder database or directly from the data capture screen. You define a data text field's size, location, justification, font, and color. For each data text field you create in the card design, you must define a corresponding field in the database definition, if you plan to save the data to a database. You specify the source of this data when you create a link definition.

Static Text

Static text fields contain the same text for each card using this card design. When you designate a field as a static text field, the system asks you to enter the text to appear on each card. You can then define the static text field's size, location, justification, font, and color.

Bar code

You create bar code fields to place bar codes on your cards. When you designate a field as a bar code field, the system asks you to specify the type, or brand, of bar code to use, as well as whether or not to use a checksum. You must provide sample bar code data. If you create a bar code field in the card design, you must define a corresponding bar code field in the database definition, if you plan to save the bar code data to a database, and the Link Definition.

Image

Image fields contain the cardholder's captured image. For each image field you create in the card design, you must define a corresponding image field in the database definition, if you plan to save the image data to a database, and the Link Definition.

Bitmap

You define bitmap fields to import bitmap files of graphics, such as your organization's logo. When you designate a field as a bitmap field, the system asks you to specify the bitmap file to import. You can define a bitmap field's size and location. You can also specify that the bitmap be tiled or repeated.

Each type of card field requires a slightly different procedure. The procedures that are common to all field types, such as creating, sizing, and moving the field, will be discussed first.

The Card Design module of the system offers considerable flexibility in designing cards. Through the use of card fields, you can position data, static text, bar codes, images, and graphics anywhere on a card and size the card fields to any dimensions.

Figure 26:
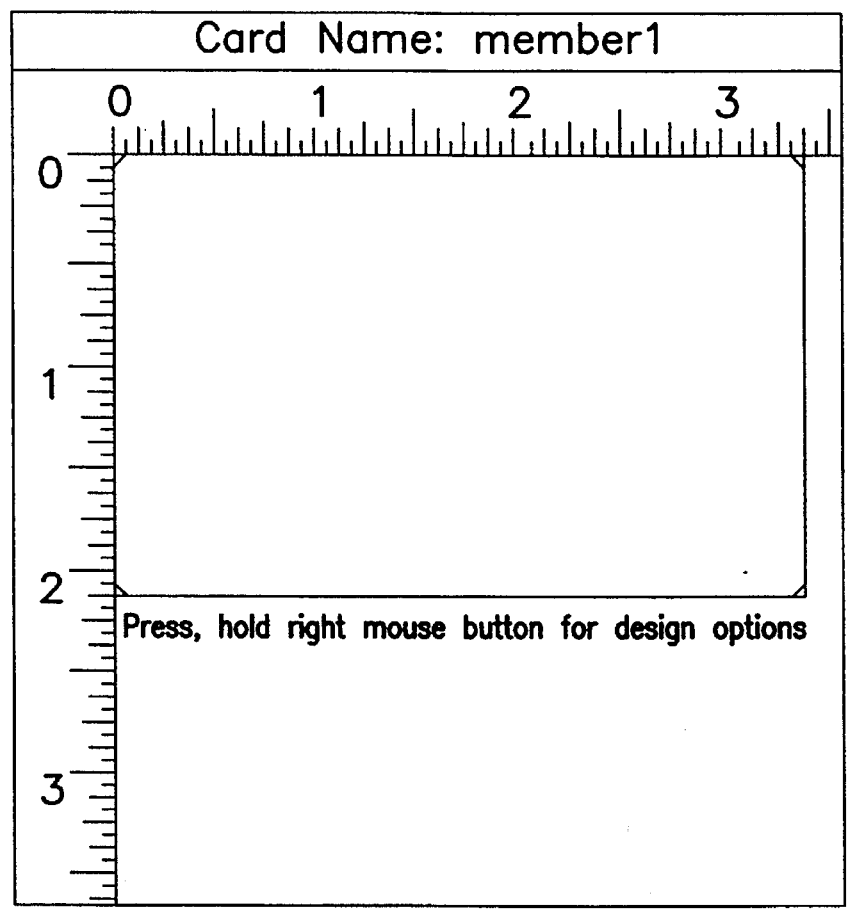
FIG. 26 is an illustration of a Card Design Window present in a preferred embodiment of the present invention.

The card is designed in the Card Design window, see FIG. 26. Rulers are displayed at the left and top of the Card Design window to help you place the card fields. The title bar of the Card Design window displays the coordinates of the origin point and the size of the field. All card fields are linked to a database and/or data capture field. The link provides the connection that allows data to pass between the card design and database or data capture screen. You can link the card design fields with the database fields after you have established the card design and defined the database.

The system of the present invention provides an alternative method of creating a card design. Instead of creating the card design and defining the database first, you can define the database and create the link first. Then, in Card Design, you select an option that allows you to display a list of the link fields. By "dropping and dragging" the link fields from the list to the Card Design window, you automatically create the card fields and their link in a single step. Once you place the linked fields on the card, you can define their appearance.

This section provides both sets of procedures for placing the card fields:

Placing an Unlinked Field

Use this method to place card fields in a card design if you do not have any links established. Once you place the card fields on the card, and save the card design, you can establish the links to the card fields in the Link module.

Placing a Linked Field

Use this method to place card fields in the card design if you have already established the links to the database fields.

The procedures to place unlinked card fields on the card will now be discussed. Once defined, you must link the card fields with the database fields using the Link module.

1. Position the pointer, within the Card Design window, at the point at which you want the top left corner of the card field to be located. This is the origin point.

2. Hold down the left mouse button.

3. Drag the pointer diagonally away from the origin point. A rubber banding box appears. The diagonal corners of the box extend from the origin point to the cursor.

4. Release the left mouse button when the field is the size you want it.

Figure 31:
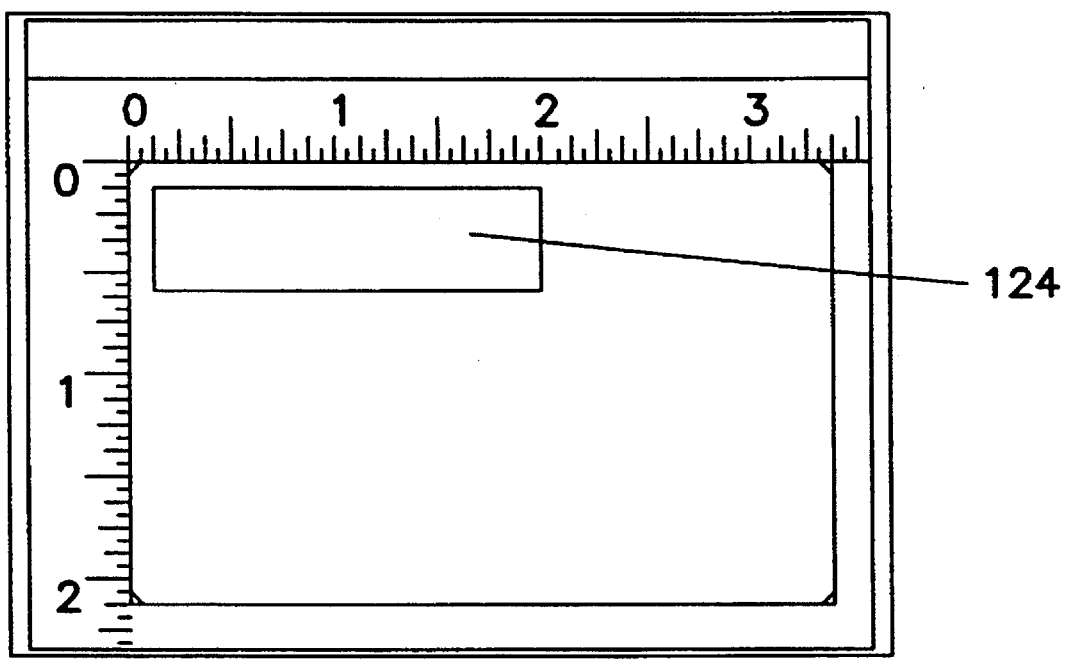
FIG. 31 is an illustration of the Card Design Window with a card field present.

You can resize the card field later if you are not satisfied with its size, or if you need to change the size based on the field's attributes. The field appears as a box 124 in the Card Design Window, as shown in FIG. 31.

Figure 32:
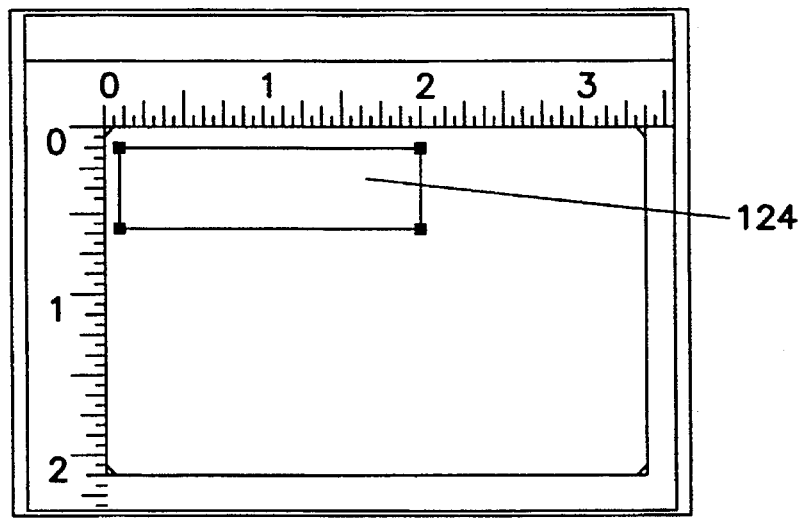
FIG. 32 is an illustration of the Card Design Window with the card field selected.

Before you can move, size, define, or delete a field, you must select it. Move the pointer to within the card field's boundaries. Click the left mouse button. Small black boxes, or handles, appear at the corners of the card field 124, as shown in FIG. 32.

You can change a card field's size, once you've placed it on the card.

1. Select the card field you want to resize.

2. Position the pointer on one of the card field's handles.

3. Hold down the left mouse button.

4. Drag the handle toward or away from the anchor point.

5. Release the mouse button when the card field is the size you want.

You can change a card field's position on the card after you've placed it.

1. Select the card field you want to move.

2. Move the pointer to within the boundaries of the selected card field.

3. Hold down the left mouse button.

4. Drag the card field to its new position.

5. Release the mouse button.

If your card has overlapping fields, you can move the fields "vertically" from the front to the back and vice versa. To move a field to the back, choose the Move to Front command from the Card Design menu. To move a field to the front, choose the Move to Back command from the Card Design menu.

Once you have placed a card field, you must define it. You can move and size any card field, even after you've defined it. In fact, you may find it necessary to resize or move a card field after you've defined its field type and/or font. You can define a card field to be one of five types:

Data Text
Static Text
Bar code
Image
Bitmap

Before you define a card field you must complete the following steps:

1. Create the card field using the procedures described earlier in this section.
2. Select the card field using the procedures described earlier in this section.
3. Press the right mouse button.

Figure 33:
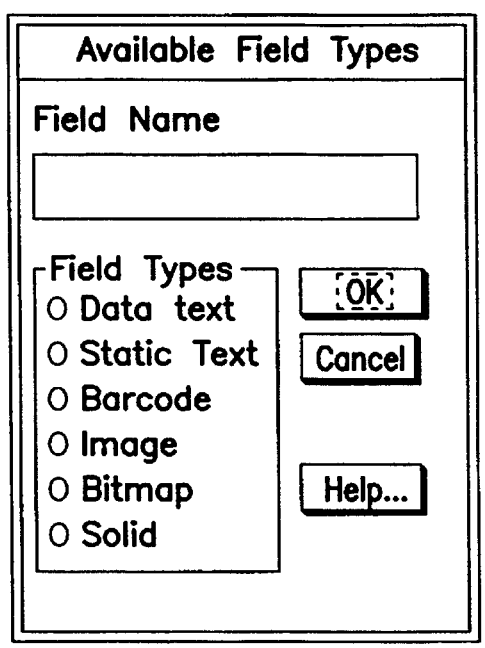
FIG. 33 is an illustration of a Field Definition Menu present in a preferred embodiment of the present invention.

The Card Design menu appears:
 Select Card Background
 Define Selected Field
 Delete Selected Field
 Move to Front
 Move to Back
 Test Print Card
 Save Card Design
 Save As
 Exit Card Design 4. From the Card Design menu, choose Define Selected Field. The Available Field Types dialog box appears, see FIG. 33.
5. In the Field Name box, type the name of the card field.
6. From the Field Type box, select the type of field you want to define. Then finish defining the field as discussed below.
7. Choose OK.

Defining Data text card fields will now be discussed. Data text card fields contain cardholder data. This data originates from the cardholder data stored in your database or may come directly from the data capture screen as entered by the operator. Either way, you do not need to specify the source until you create the links to the card fields using the Link module. When you define a data text field in card design, you merely specify the font and color of the data text as it will be printed on the card.

Figure 34:
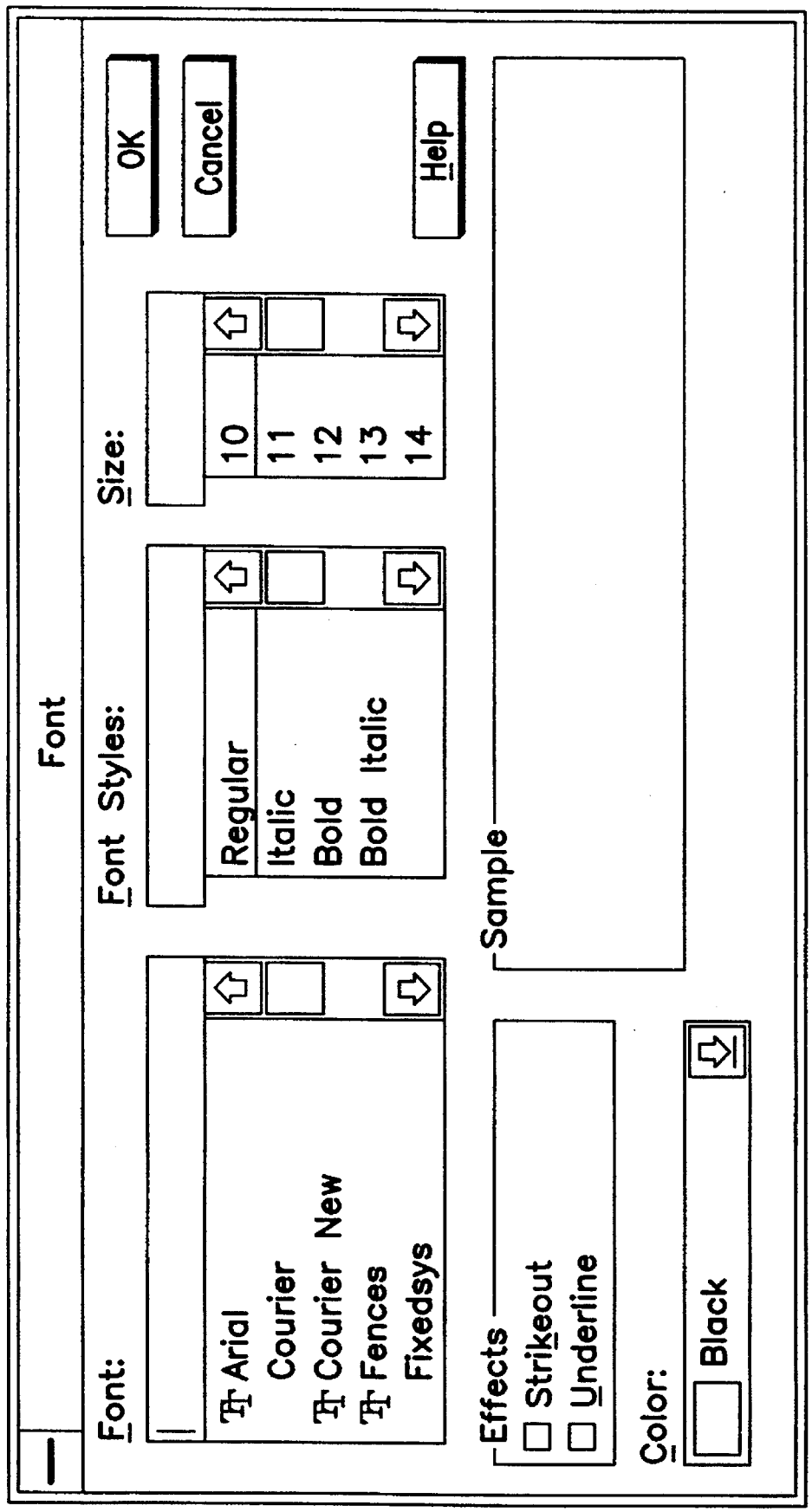
FIG. 34 is an illustration of a Font Dialog Box present in a preferred embodiment of the present invention.

1. Designate the field type as Data Text using the procedures described earlier. When you choose OK on the Field Type dialog box, the Font dialog box appears, see FIG. 34.
2. From the Font box, select the typeface in which you want the data text to appear on the card.
3. From the Font Style box, select the style of type in which you want the data text to appear on the card.
4. From the Font Size box, select the point size in which you want the data text to appear on the card.
5. From the Effects box, select the special effect(s) in which you want the data text to appear on the card.
6. From the Color list, select the color in which you want the data text to appear on the card.
7. Choose OK.

Figure 29:
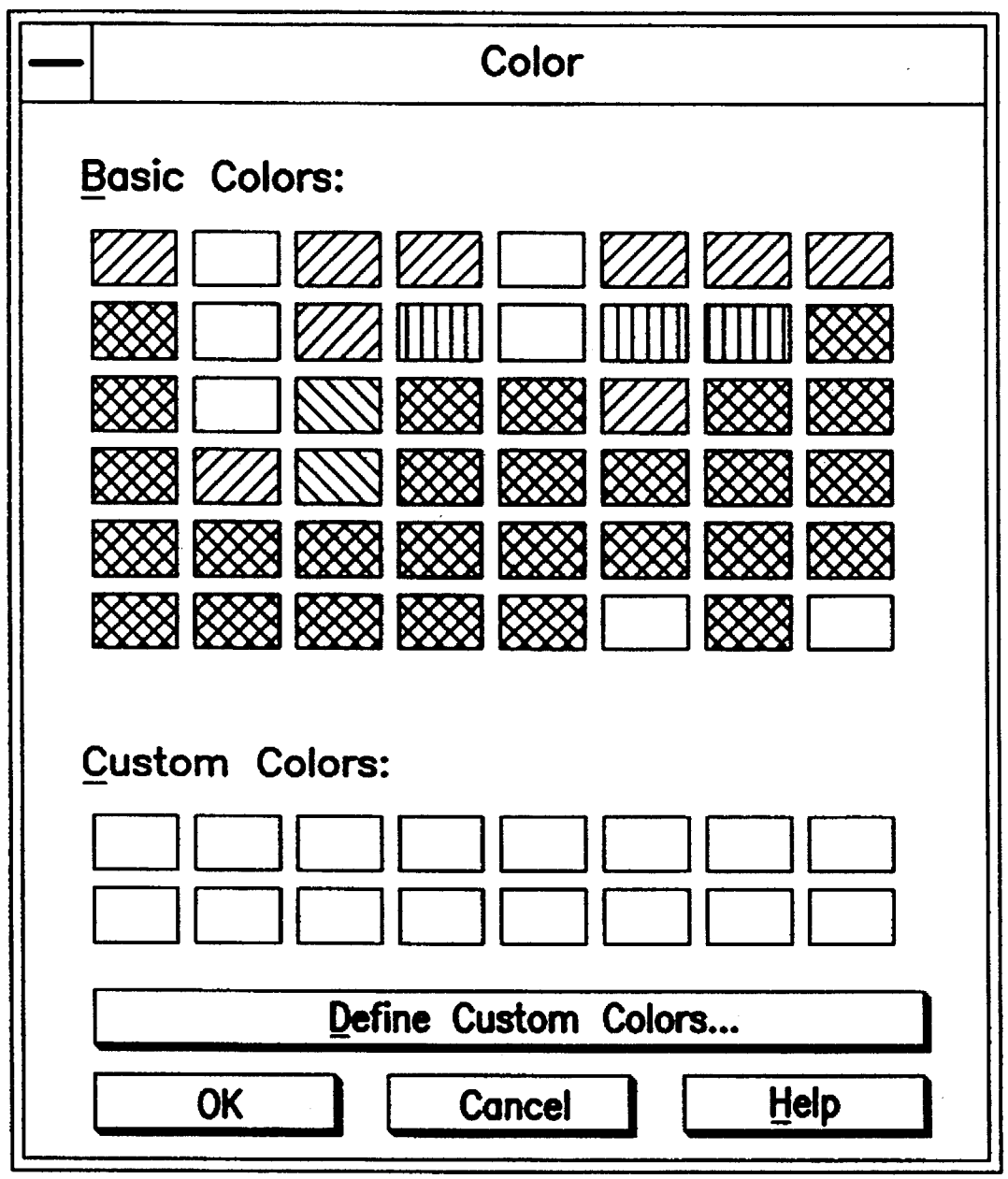
FIG. 29 is an illustration of a Color Dialog Box present in a preferred embodiment of the present invention.

The Color dialog box appears, see FIG. 29. You can either select a basic color to use as the card field background or you can create a custom color.

Selecting a Basic Color Card Field Background

1. From the Basic Colors group, select the color you would like to use as the card field background.
2. Choose OK.

Creating a Custom Color Card Field Background The color palette contains 48 different colors from which you can choose. If those colors are not satisfactory, you have the capability of customizing your own color.

1. From the Color dialog box, choose Define Custom Color. The Color dialog box expands to include the customize color portion of the Color dialog box. The Color/Solid box, located in the lower left corner of the dialog box, displays the "current" and "pure" colors. The current color appears on the Color side of the Color/Solid box, while the pure color that is closest to the current color (as determined by your device driver) appears in the Solid side of the box. When the current color and pure color do not match exactly, the current color is dithered, or displayed as a patterned mixture of two colors. Dithering is simply the way Windows displays colors. The true color will appear on your card's background.
2. To display a customized color in the Color/Solid box, do any of the following:
 Point to the Solid side of the box and click the left mouse button to display the same color in the Color side.
 Point to a color in the Color Table and click the left mouse button, or drag the pointer through the table to display the colors over which it passes.
 Point to a shade in the Shade Bar and click the left mouse button, or drag the pointer up and down on the bar to display the color's shading.
 Change the values in the Hue, Saturation, and/or Luminosity boxes.
 Change the values in the Red, Green, and/or Blue boxes.
3. Choose Add to Custom Colors to transfer the customized color to a box in the Custom Colors portion of the Color dialog box.
4. Select the customized color you want to use as the card's background.
5. Choose OK.
 The card field appears with the selected card field background color and the field name in the specified font attributes.

Static text is any text, up to 40 characters, that you specify to appear on every card using this card design. When you define a field as a static text field, the system asks you to enter the text that will appear on every card. Once you have defined the static text, you can specify the font and color in which the text will appear on the card.

Figure 35:
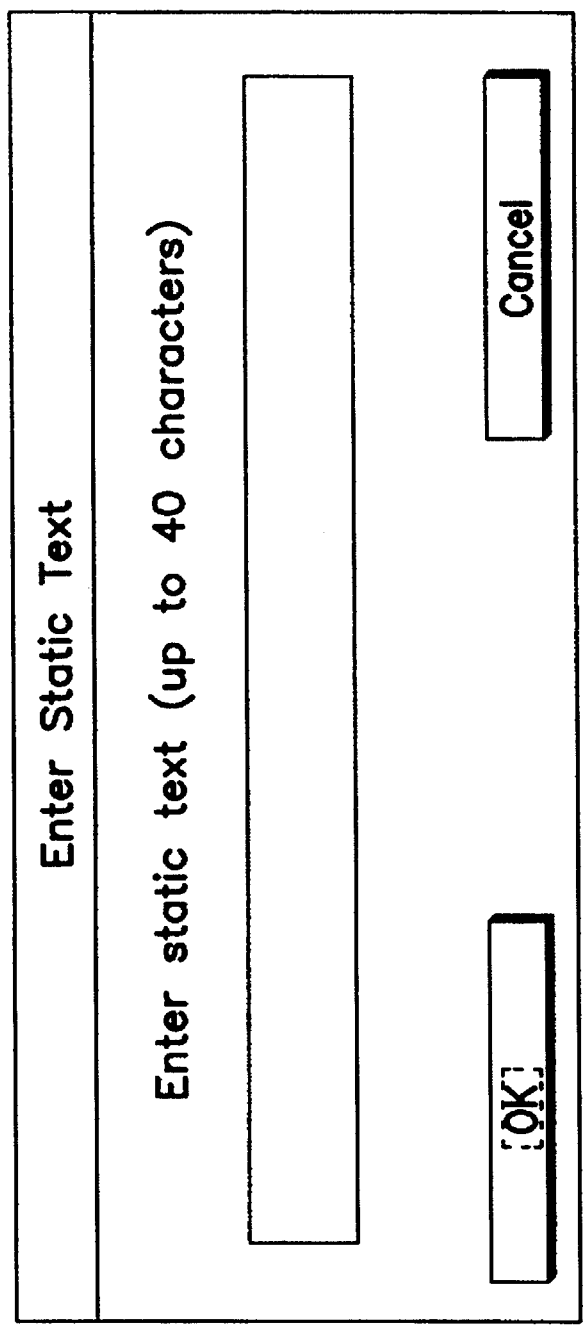
FIG. 35 is an illustration of a Static Text Dialog Box present in a preferred embodiment of the present invention.

1. Designate the field type as Static Text using the procedures described earlier. When you choose OK on the Field Type dialog box, the Static Text dialog box appears, see FIG. 35.
2. Type the static text to appear on every card using this card design.
3. Choose OK. The Font dialog box appears.
4. Use the same procedure used to choose the font, and all of its attributes, for the static text field that you use for data text field (see the preceding section). The Color dialog box appears.
5. Use the same procedure used to choose the card field's background color for the static text field that you use for data text field (see the preceding section). When you choose OK on the Color dialog box, the static text field appears in the Card Design window as you defined it.

You define a bar code field to contain bar codes. When you define a bar code card field, the system asks you to specify the type of bar code to use. The system supports 15 types of bar codes. You can also specify that the bar code field utilizes a checksum. After selecting the type of bar code to use, the system asks you to enter bar code sample data.

1. Designate the field type as Bar Code using the procedures described earlier. When you choose OK on the Field Type dialog box, the Bar Code dialog box appears, see FIG. 36.
2. In the Bar Codes Available box, select the type of bar code this field will contain.
3. If the bar code field utilizes a checksum, select the Has a CheckSum check box.
4. Choose OK.
   The Bar Code Data Sample dialog box appears, see FIG. 37.
5. Type the bar code sample data in the box.
6. Choose OK.
   You return to the Card Design window.

Defining an Image Card Field

You define an image field to contain the captured cardholder image. If you define an image field for the card you must also define an image field in the Link Definition. Doing this will place an image field on the Data Capture window. If you plan to save the image, along with cardholder data, to the database, you must also define a corresponding image field in the database definition. You designate a card field as an image field. When you choose OK on the Field Type dialog box, the Card Design window reappears with a sample image displayed within the image field.

Defining a Bitmap Card Field

You can define a bitmap card field in which you can import a bitmap graphic file, such as your organization's logo. The bitmap must be in either a .BMP or .DIP format. When you specify a card field as a bitmap field, the Open dialog box, from which you select the bitmap file, appears.

1. Designate the field type as a Bitmap card field using the procedures described earlier. When you choose OK on the Field Type dialog box, the Open dialog box appears (see FIG. 28).
2. From the List Files of Type box, select either BMP or DIP.
3. From the Drives box, select the drive on which the bitmap file resides.
4. From the Directories box, select the directory in which the bitmap file resides.
5. From the File Name box, select the name of the bitmap file.
6. Choose OK. The bitmap field appears with the bitmap in it.

You can delete any card field that you have created. If you attempt, however, to delete a card field that has been linked to a database field, you must first remove the link in the link module.

1. Select the card field to be deleted using the procedures discussed earlier in this section.
2. From the Card Design menu, choose Delete Selected Field. The Delete Field dialog box appears, asking that you verify deleting the card field.
3. Do one of the following:
   To delete the card field, choose Yes.
   To keep the card field, choose No.

You can test print the card design to the printer at the time while creating it. This feature is very useful, because colors, such as card background color, field foreground and background colors may look differently when printed on a card than what appears on your monitor. In addition, you can get a much better feel for what the card looks like when you actually see it.

From the Card Design menu, choose Test Print Card.

The system prints the card, in its current state of development, on the printer.

You should always save your card design periodically as you're creating it, in the event of a power outage or computer malfunction. The system saves the card design under the name you assigned it when you choose the Card Design command from the Card's menu. In addition to saving a card design to its assigned name, you can also save a card design to a different name. This feature is useful if you want to create a new card design based on an existing card design, such as one of the system-supplied card templates. You can save the card design at any time while you're creating it.

1. From the Card Design menu, choose Save Card Design. The Save Card Design dialog box appears.
2. Do one of the following:
   To save the card design, choose Yes.
   To not save the card design, choose No.

Figure 38:
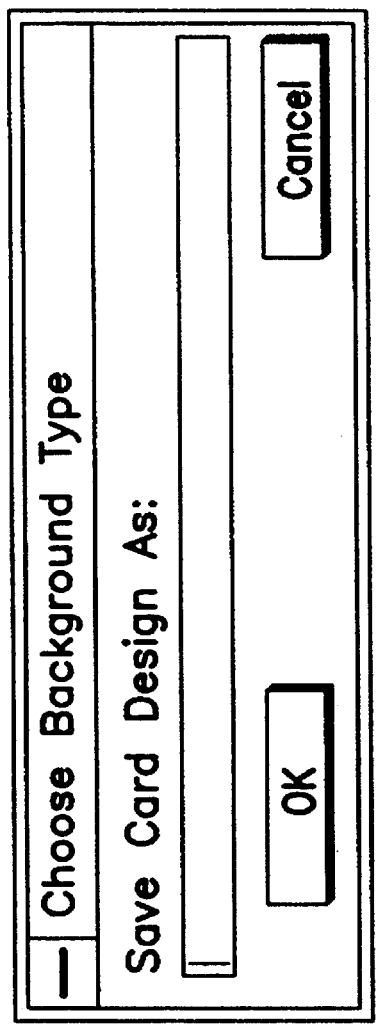
FIG. 38 is an illustration of a Choose Background dialog box.

You can save any card design that you are working on to a different name. This feature is useful if you want to use a card design as the basis for a new design. You can open the original card design, make any desired changes, and save the new design to another name, leaving the original design intact. You can save the card design to a different name by choosing the Save As entry. A Save As dialog appears, see FIG. 38. Enter the new name in the Save Card Design As box.

Once you create and save a card design, you can edit it at any time. You use the edit feature to make changes to one of your existing designs. You can also create new card designs by retrieving an existing design, including the system card design templates; make any changes you want; and save the design to a new name. Before you can edit a card design, you must retrieve the card design.

Figure 39:
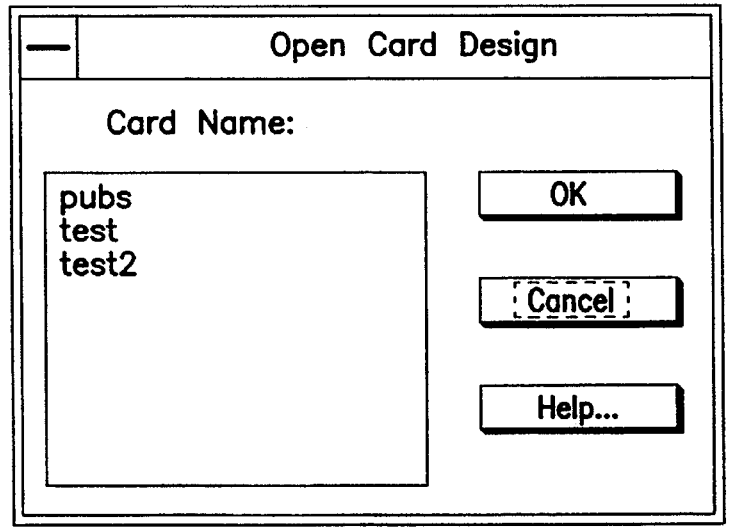
FIG. 39 is an illustration of an Open Card Dialog Box present in a preferred embodiment of the present invention.

1. From the Cards menu, choose Edit Card. The Open Card Design dialog box appears, see FIG. 39.
2. From the Card Name box, select the card design you want to edit.
3. Choose OK. The Card Design window, displaying the selected card design, appears.

You can add, modify, or delete any card fields on the card design. Use the procedures from the previous section, Creating a Card Design, to modify the current card design.

You can delete any card design you are not using. Deleting unused card designs will save disk space. Before you delete a card design, you must remove all links associated with the card fields on the design. The system will not let you delete a card design containing fields that are linked to database fields. Before you can edit a card design, you must retrieve the card design.

Figure 40:
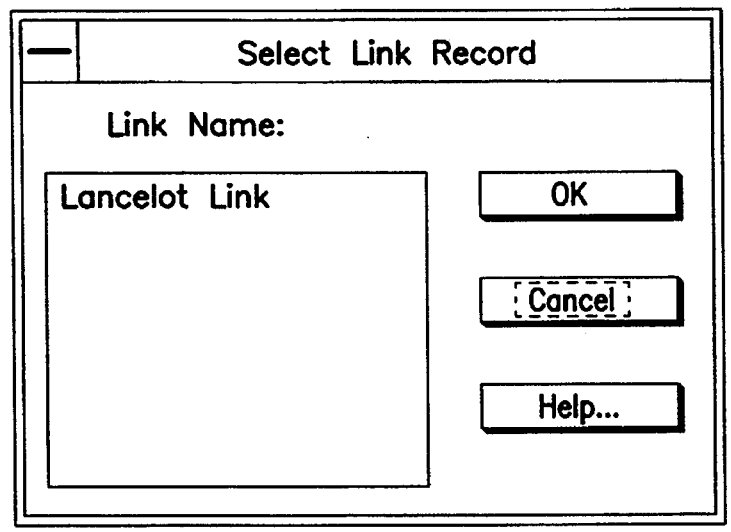
FIG. 40 is an illustration of a Link Record Dialog Box present in a preferred embodiment of the present invention.

1. From the Cards menu, choose Edit Card. The Delete Card Design dialog box appears, see FIG. 40.
2. From the Card Name box, select the card design you want to delete.
3. Choose OK. A Verify Delete dialog box appears. Do one of the following:
   To delete the card design, choose Yes. The system deletes the card design from the system.
   To not delete the card design, choose No.

Figure 41:
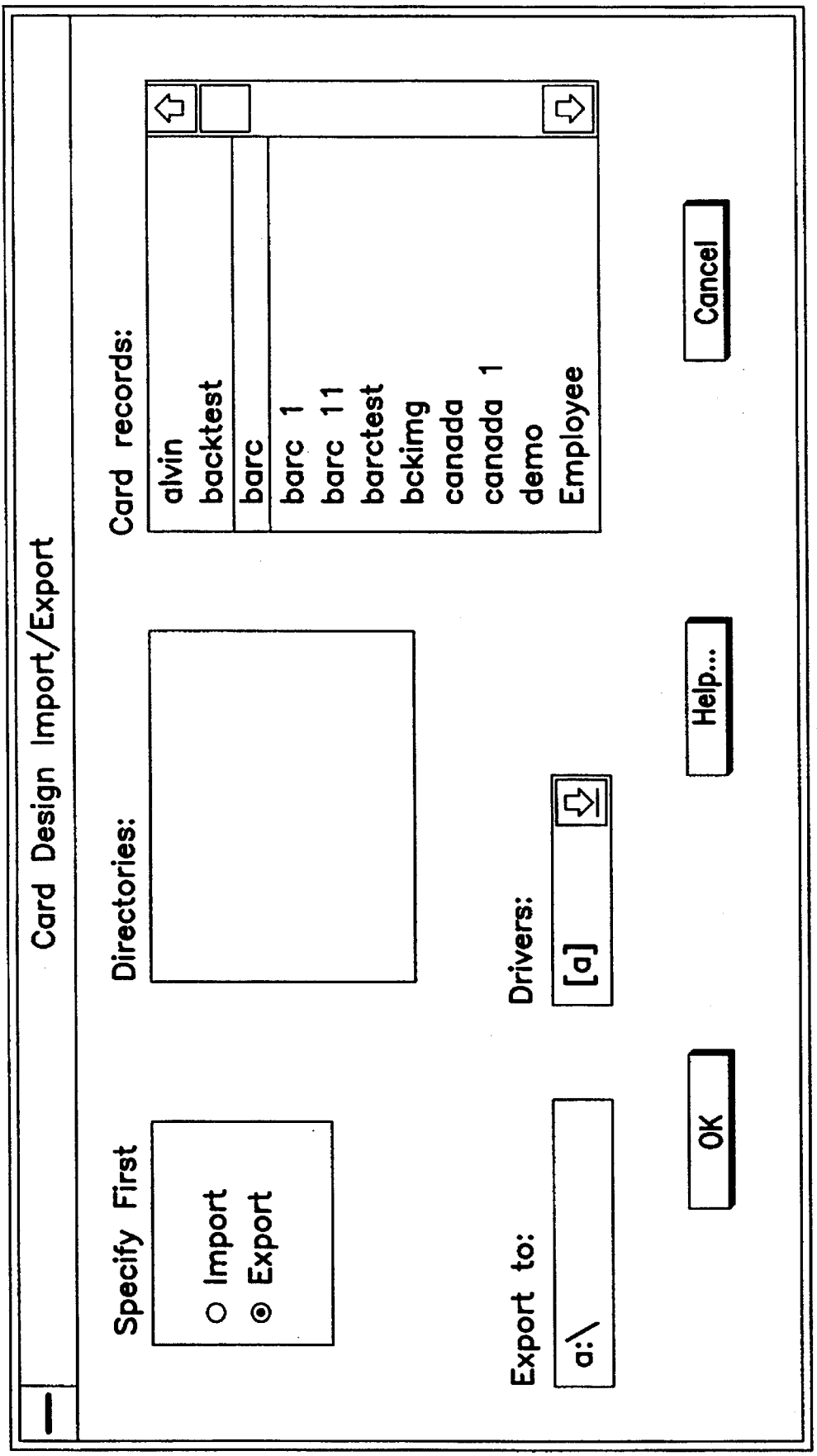
FIG. 41 is an illustration of a Card Design Import/Export dialog box.

The system saves card designs as a record within an internal database. It is not a file within itself. Therefore, you cannot transport card designs among stand alone image capture stations by copying a file to diskette. You can transport card designs by diskette, however, using the Import/Export Card Design function. When you choose this function, you select a card design to import or export. If exporting, the system removes the card design from the internal database and saves it to the specified destination. Likewise, if importing a card design, the system reads the exported card design from the file into the internal database structure. From the Cards menu choose Import/Export. The Card Design Import/Export dialog box appears, see FIG. 41. From the Specify First box, choose the function you want to perform. A message box asking you to specify the card design to import or export appears. Choose OK. From the Drives box, select the drive on which the card design file to import or export resides. From the Directories box, select the directory in which the card design file resides. From the Card Records box, select the card designs to import or export. Choose OK. The system imports or exports the card design as specified.

Data Capture Management

The link module is used to create the data capture screen into which the operator will type textual data for a cardholder into fields and captures the cardholder's picture. The card design itself can be used in generating the data capture window, or the data capture window can be created from scratch. The data capture window fields have a range of field attributes available to build a robust capture facility for producing cards, as well as populating the database. Each data capture window assumes the name of the link to which it is associated; when the operator accesses data capture they must specify the name of the link to use.

Figure 43:
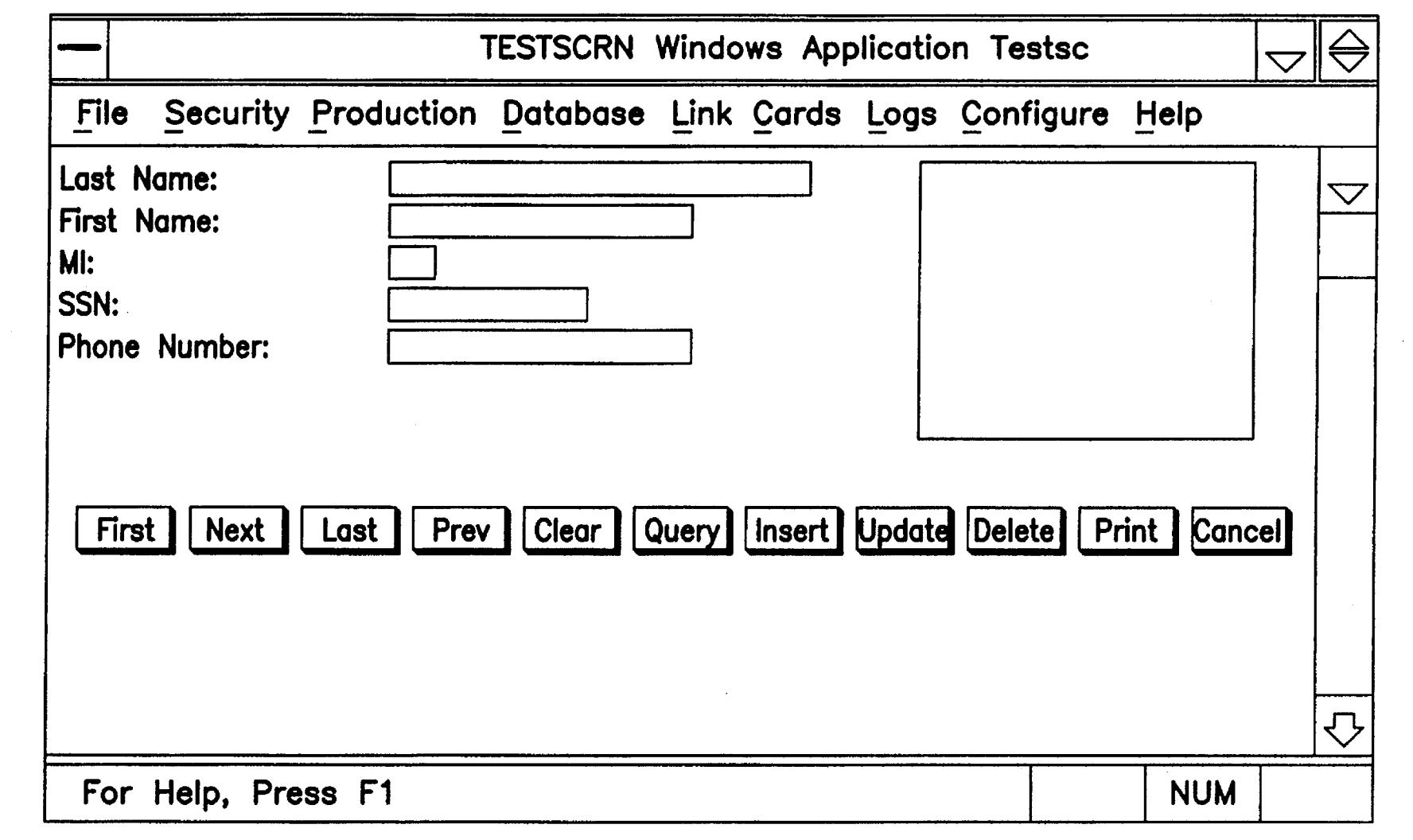

The operator selects the SELECT LINK menu item from the LINK menu of the main screen. A Select Link Record Dialog box appears (see FIG. 20). The operator selects the name of the link to be used in the Link Name Box and the associated Data Capture Window appears. The Data Capture Window assumes the same name as the link. Shown in FIGS. 42 and 43 are sample Data Capture Windows. FIG. 42 is a sample Data Capture Screen where cardholder data is not saved to a database. Three command buttons are present: Print, Clear, and Cancel. FIG. 43 is a sample of a Data Capture Screen where cardholder data is saved to a database. Command buttons are present to retrieve and display cardholder records as follows:

First First record of those retrieved

Next Next record in order

Last Last record of those retrieved

Prev Previous record in order

The Data Capture Window contains predefined boxes or areas into which cardholder data is entered. The Data Capture Window uses two types of boxes, text and image. In the examples shown there are a plurality of text boxes and one image box. Cardholder text data is entered in the text boxes and image data is entered in the image box, typically this will be the cardholder's image or picture. Labels precede the boxes where data is to be entered. The labels for the text boxes indicate the specific cardholder data to be entered in each box. The label for the image box indicates that it is the image box.

Data capture includes user input from a keyboard and a capture device(s) for both card production and/or populating the database, selecting a specific record from the database, displaying the information to the user for modification and/or card production, and capturing from other sources. A split screen displays the data entry in one section and its actual representation on a card layout in another section. Both sections are dynamically updated whenever the user enters a keystroke.

Figure 45:
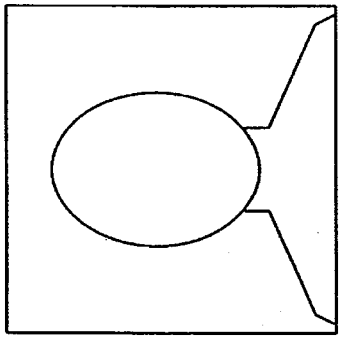
FIG. 45 is an illustration of the Data Capture Window with an image present in the image box.

An image capture screen (see FIG. 44) is displayed when the cursor is moved (use of pointer device such as a mouse or by tabbing to the image field) to the image field. A live video image can be displayed. The image can be frozen by the operator; e.g., pressing the left mouse button or unfrozen by pressing the left mouse button again. The Image Capture Window includes a focus box which represents the area of the live image which will be captured. The camera should be adjusted until the image appears clearly inside the focus box. To capture the frozen image, the operator chooses the OK dialog box. The captured image then appears with the text data on the Data Capture Window (see FIG. 45).

Figure 46:
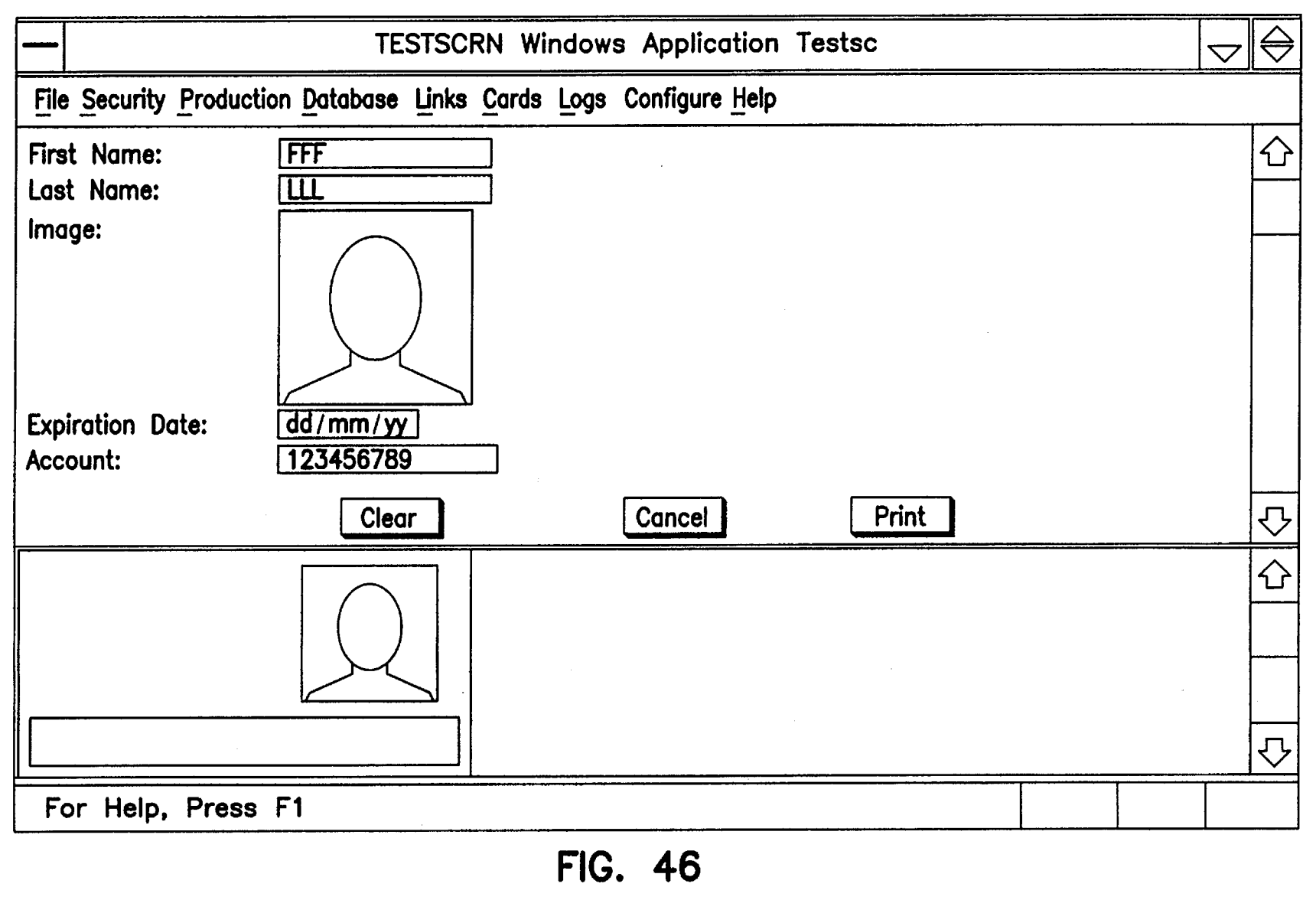

The operator can view the cardholder's card on the display screen before printing. An actual image of the card as it will be printed appears only after the operator chooses the print button. To make the card visible, the operator moves the cursor (pointer) to the bottom of the Data Capture Window at which time the single arrow pointer turns into a double arrow pointer. Holding down the left mouse button the operator then drags the bottom border of the Data Capture Window up revealing at the bottom of the screen an image of the card as it will be printed (see FIG. 46).

To save cardholder data captured on the Data Capture Window to a database, the Insert button is pressed (if the site does not save data to a database, the Insert button will not be displayed). The Data Capture Window is cleared by pressing the Clear button. To cancel the data captured and return to the main window, the Cancel button is pressed. To print the cardholder's card, the Print button is pressed. The operator will then be asked if they wish to print the card and if the operator answers yes, the card will be printed.

Data capture can proceed in either the single mode or batch mode. The appropriate mode is selected by use of the Production sub-menu on the main screen. In the single mode the user will type cardholder information into the text boxes. Some text boxes require that data be entered. If the user does not enter data, the system will not let the user proceed. Some of the text data entered may not be printed on a card but saved to an associated database and vice versa. If the user selected query batch mode from the production sub-menu, the Query Dialog box appears. A query for the selected database file can be generated by selecting the appropriate icons and entering variable information as requested by the Query Dialog box. For example to select all records from a database named CLIENTS, the operator would select the SELECT, *, and FROM icons and then enter the file name, CLIENTS.

Link Management

Link definitions form an integral part of the system. You must create a link definition for each card design you use, even if you do not save cardholder data to the database. The link definition also provides the mechanism by which the operator captures cardholder data and images—the Data Capture window. In addition, the link definition ensures that the data input by the operator prints in the proper card fields. It also ensures that the system saves the same data to the corresponding database fields. You assign a badge name to each link definition you create. Before accessing Single Mode production, the system operator must choose a badge name to use. When the operator chooses a badge name, the system displays the Data Capture window created by the link definition associated with the selected badge name. When you create a new link definition, you use the AutoLink feature to create a new link definition. When you choose the card design for which you want to create a link definition, the system offers the option to use AutoLink. AutoLink automatically creates a link definition for the card design. It adds a field to the link definition for each data text, bar code, and image field on your card design. For each card field it adds to the link definition, it places defaults in the link definition. You only need to change the defaults for each card field it adds and manually link each field to its corresponding database field.

The Link module utilizes four functions:

New Badge
   Use this function to establish a new link definition for a card design. You use the AutoLink feature to create the new link definition initially. You must then modify the default values AutoLink places in the link definition for each card field it adds.

Update Badge
   Once you create a link definition, you can update, or edit, it to reflect changes to the card design. For example, if you want to remove a field from a card design, you must first use this function to remove the field from the link definition. If you add a new field to the card design, you must use this function to add that field to the link definition.

Delete Badge
   Use this function to remove a link definition from the system. You would delete an entire link definition only when you want to remove a card design from the system entirely.

Import/Export Badge
   You use the Import/Export Badge function to transport a link definition from one system to another. Because a link definition consists of several files, you cannot use the standard DOS or Windows copy functions. The Import function places the Link Definition's files in their correct residence in the system. Likewise, the Export function retrieves the various files associated with the link definition from their respective residences.

New Badge

For each new card design that you create and use in the system, you must establish a new link definition, even if you do not save cardholder data. The first step in creating a new link definition is to choose the card design. When you choose the card design, you have the option to use AutoLink. AutoLink automatically establishes a link for each data text, bar code, and image field on the card design. AutoLink enters default values in the Link Definition dialog box text boxes for each of these field types. Depending on the complexity of your link, you may need only modify the default values in order to complete the link definition. You assign a badge name to the link definition. When the operator wants to produce a card, they must first choose the name of a badge to use. By choosing a badge, the operator, through the link definition, also selects the Data Capture window to use, the card design on which to print the data and image, and the database to which the system saves the cardholder's data and image. If your site saves cardholder data, and you have already established your database tables, you must also specify the database schema and database to which the system saves the cardholder data for this link.

Later, as you modify the default values input by AutoLink, you must specify the database field to which the system saves the values, as input by the operator, for each Data Capture window text and image box. You create a link in the Link Definition dialog box. The Link Definition dialog box contains fields for defining data text, image, and composite field links. Creating a link definition involves some or all of the following steps, each of which is discussed in the following sections:

AutoLinking the Card Design
   The first step in creating a link definition is to autolink the card design. The AutoLink feature automatically establishes links for each data text, bar code, and image field in the card design.

Linking the Database
   If your site saves cardholder data, you must specify the database schema and specific database to which you want to link the card design fields.

Listing the Link Definition Fields
   You create the link definition by fields. The Link Definition dialog box displays link information on a field-by-field basis. You can list the fields that have been added to the link definition to check to see which fields have been added to the link definition, as well as choose the field for which you want to display the link information.

Changing the Current Field
   The Link Definition dialog box displays the link definition on a field-by-field basis. The field for which the Link Definition dialog box displays link information is the current field. There are several methods by which you can change the current field.

Defining a Field
   You define links in the Link Definition dialog box by field type. You can define links for text fields, image fields, and composite fields. You define links for each differently. This section includes procedures for defining links for each of these types of fields.

Figure 48:
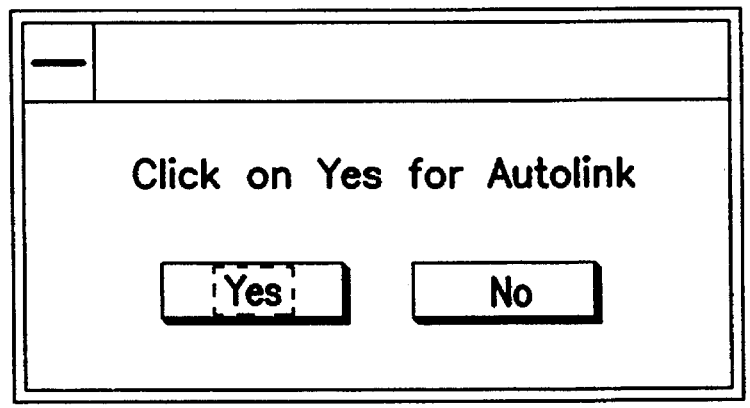
FIG. 48 is an illustration of an Automatic Linking dialog box.

AutoLinking the Card Design
Use the following procedures to create a new link definition:

1. From the Links menu, choose New Badge. The Link Definition dialog box appears:

2. From the Linked Card Design list, choose the name of the card design for which you want to establish a link. The Autolink window appears, see FIG. 48:

3. Choose Yes.
   The system creates the link definition for the selected card design. It places the name of the card design in the Badge Name box. It adds the data text and image fields from the card design to the Card Design Field Links box. For each card field listed in the box, it places default values in the Field Type, Field Name, Field Prompt String, Field Width, and Field Capture Order boxes. After AutoLink creates the initial links to card design fields, the Link Definition dialog box is filled with certain information.

Linking the Database
If your site saves cardholder data and you want the system to update the database with the cardholder data, you must create a link definition that links the Data Capture window fields with the database fields.

1. Choose the Connect button under Linked Schema. You must define your database tables before establishing links. Refer to Section 6, Database Management.
   A list of database drivers appears.

2. Choose the database driver you want to use.

3. From the Linked Database list, select the specific database to which you want to save the cardholder data associated with the card design.

Listing the Link Definition Fields

You can easily verify that card fields have been added to the link definition by listing them. The list only displays those card design fields that have been added to the link definition. In addition, you can use the Field Name list to select the current link definition field of those linked fields that were created manually, as well as card design fields. They do not show up in Card Design Field Links box.

1. Choose the List button.

Figure 49:
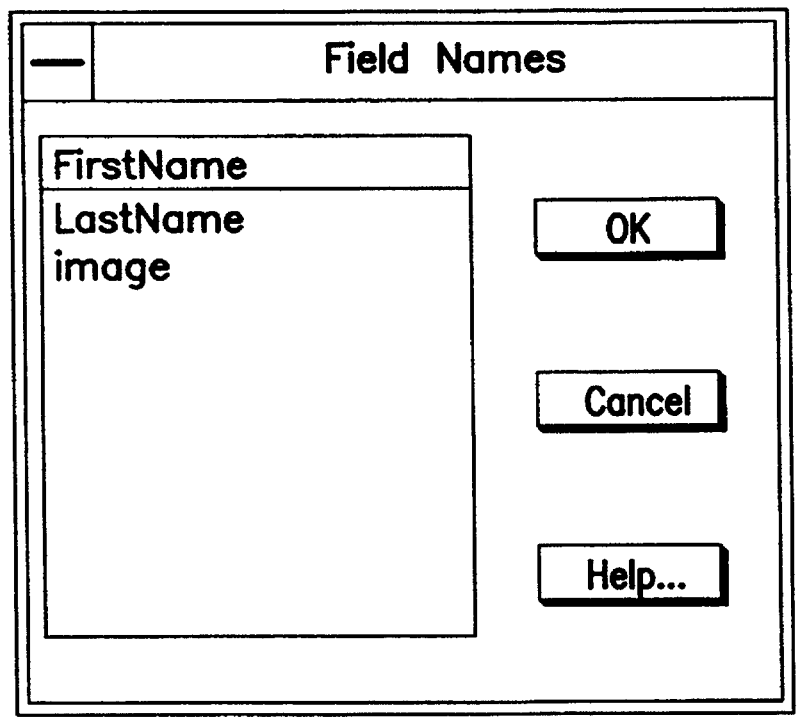
FIG. 49 is an illustration of a Field Names dialog box.

The list of card fields that have been added, either manually or through AutoLink, to the link definition appears, see FIG. 49.

2. Do any of the following:

To return to the Link Definition dialog box without changing the current link definition field, choose Cancel.

To display the link information for a particular field, double-click on the field or select the desired field and choose OK.

Changing the Current Field

The Link Definition dialog box displays the link values for one card field at a time. If the field originates in the card design, the "current" field, or the field for which the Link Definition dialog box displays the link values, it is highlighted in the Card Design Field Links box. The name of the current field also appears in the Field Name box. If you create a field manually, however, it is easier to select the current field by selecting from the Field Names box.

To change the current field of fields that originate in the card design, do either of the following:

To change the current field to the previous field, choose the Previous button.

To change the current field to the next field, choose the Next button.

To change the current field of fields that were created manually, as well as AutoLinked fields:

1. Choose the List button.

The Field Names dialog box appears

2. Select the field for which you want to display link information.

3. Choose the OK button.

Defining a Field

You create a link definition on a field-by-field basis. Using AutoLink, the system establishes a link to each data text, bar code, and image field originating on the card design. It places default information in some of the text boxes found on the Link Definition window. You must edit the default entries, as well as specify other information about the link field.

You define links for fields in the link definition by field type. In fact, if defining a link for a field manually, you must specify the type of field, for which you are defining the link, first. You can define links for three types of fields:

Data Text Field

A data text field is any field that contains alphanumeric data that the operator enters by typing it into a text box on the Data Capture window. Bar code fields are considered text fields in the link definition.

Image Field

An image field is a field into which the operator captures a live video image.

Composite Field

You can create a composite field for the card design within the link definition. A composite field is a field consisting of two or more database fields that prints as a single field on the card design. A typical use of a composite field might be to print a cardholder's first and last name, which is stored in the database, as a single field on the card. Because the procedures for linking each of these three field types is different, the following sections describe the procedures for each.

Defining a Text Field Link

AutoLink placed default values in some of the Link Definition boxes for each data text card design field. You need to modify the values for each linked data text card field to reflect the attributes of the individual field. Define bar code fields as text fields.

1. Select the data text card design field, using the Previous and Next buttons, for which you want to define a link.

2. Complete the link definition for the current field by modifying the default values inserted by AutoLink and entering values in the appropriate boxes.

The following Table 9 lists each link definition box that applies to data text and bar code fields and describes each.

TABLE 9

| Link Definition Text Box | Description of Entry |
| --- | --- |
| Field Type | Required. Leave as "Text." |
| Field Name | Required. Displays the name of the current field. AutoLink places the card design field name in this box. If not AutoLinked, you must type the name of the link definition field. |
| Field Equation String | Type a mathematical expression to be executed on the data input to this field when saved to the database or printed on the card. Use this feature primarily for bar code fields. Use the following mathematical operators to create your mathematical equation strings.<br>+     addition<br>−     subtraction<br>>     greater than<br><     less than<br>=     equal to<br>!=     not equal to<br><>     not equal to |
| Field Prompt String | Required. AutoLink places "Enter" and the card design field name in this box. You can edit this entry. If not AutoLinked, you must enter the text to appear as a prompt for this field in the Data Capture window. |
| Field Validation String | Create a mask describing the field's contents. The operator's input in the Data Capture window field must match the mask created in this text box. This feature is useful for use with bar code |

TABLE 9-continued

| Link Definition Text Box | Description of Entry |
| --- | --- |
| | fields. Create the mask using the following characters to designate the type of input required.<br>9   numeric input<br>A   uppercase alpha input<br>a   lowercase alpha input<br>X   uppercase alphanumeric input<br>x   lowercase alphanumeric input<br>In addition, you can use any other punctuation desired. To create a field validation string for social security numbers, for example, you would enter: 999-99-9999 |
| Field Width | Required. Specify the length of the field in number of characters. The width you specify must fit within the card field boundaries, considering the physical length of the field, as well as the point size and font used, on the card design. The system displays an error massage if the field width would exceed the card design field area. |
| Field Capture Order | Required. Specify the position of the field in the Data Capture window in relation to the other link fields. |
| Linked Database Field | Select the name of the database field to which you want to link this card design field. The system will save data input to this field in the database. |
| Mandatory Entry Field | Check this box if you want the field to be a required field on the Data Capture window. The system displays an error message if the operator attempts to tab past this field or print of save the card without making an entry. |
| Changeable Field | Check this box to make the field modifiable. |
| Save in Audit Log | Check this box if you want all activity involving this field to be logged to the Audit Log. |

3. Do one of the following:
- To define link for another text field, go back to step 1 of this section.
- To define a link for an image field, go to "Defining an Image Field Link."
- To define a composite field, go to the following section, "Defining a Composite Field Link."
- To complete the link definition for this card design, go to "Saving the Link Definition" later in this section.

Defining an Image Field Link

AutoLink placed default values in some of the Link Definition boxes for each image card design field (there is probably only one.). You can modify the values for each linked image card field to define the image that the field will contain.

1. Select the image card design field, using the Previous and Next buttons, for which you want to define a link.
2. Complete the link definition for the current field by modifying the default values inserted by AutoLink and entering values in the appropriate boxes. The following Table 10 lists each link definition box that applies to image fields and describes each.

TABLE 10

| Link Definition Text Box | Description |
| --- | --- |
| Field Type | Required. Leave as "Image." |
| Field Name | Required. Displays the name of the current field. AutoLink places the card design field name in this box. If not AutoLinked, you must type the name of the link definition field. |
| Field Prompt String | Required. AutoLink places "Enter" and the card design field name in this box. You can edit this entry. If not AutoLinked, you must enter the text to appear as a prompt for this field in the Data Capture window. |
| Field Capture Order | Required. Specify the position of the field in the Data Capture window in relation to the other link fields. |
| Linked Database Field | Select the name of the database field to which you want to link this image field, if you plan to save cardholder images to the database. The system will save the captured image to this field in the database. |
| Field Image Type | At this time, JPEG (Joint Photographic Experts Group) is the only supported image type to which the system outputs. JPEG is a type of image file format that uses a lossy compression technique to achieve high compression ratios. |
| Field Compression Type | Specify the resizing algorithm to use when compressing the image:<br>Standard   Resizes by determining the average pixel values. This method produces |

TABLE 10-continued

| Link Definition Text Box | Description | |
| --- | --- | --- |
| | | satisfactory output at a faster output than linear resizing. |
| | Linear | Calculates resizing by interpolating pixel values. It sacrifices speed quality. |
| Image Capture Device | At this time, "Camera" is the only supported capture device. | |
| Mandatory Entry Field | Check this box if you want the field to be a required field on the Data Capture window. The system displays an error message if the operator attempts to tab past this field or print or save the card without making an entry. | |
| Changeable Field | Check this box to make the field modifiable. | |
| Save in Audit Log | Check this box if you want all activity involving this field to be logged to the Audit Log. | |

3. Do one of the following:
   To define link for another image field, go back to step 1 of this section.
   To define a link for a text field, go back to "Defining a Text Field Link."
   To complete the link definition for this card design, go to "Saving the Link Definition" later in this section.

Defining a Composite Field Link

There may be times when you want to combine one or more database fields into a single field on the card. For example, you may store the cardholder's first and last names as separate fields on the database, but want to place them as a single field on the card. To do this you must create a composite field. A composite field is a field that contains two or more fields. When you build a composite field, you specify each component field to be part of the composite field in the order in which it is to appear when printed on the card. In addition, you can specify that the system perform any of the following on any of the component fields.

Pad the component field with a specified character

Strip the component field of unprintable characters

Trim the component field of null characters

Add a user-defined text string, of up to 10 characters, to the component field

Figure 50:
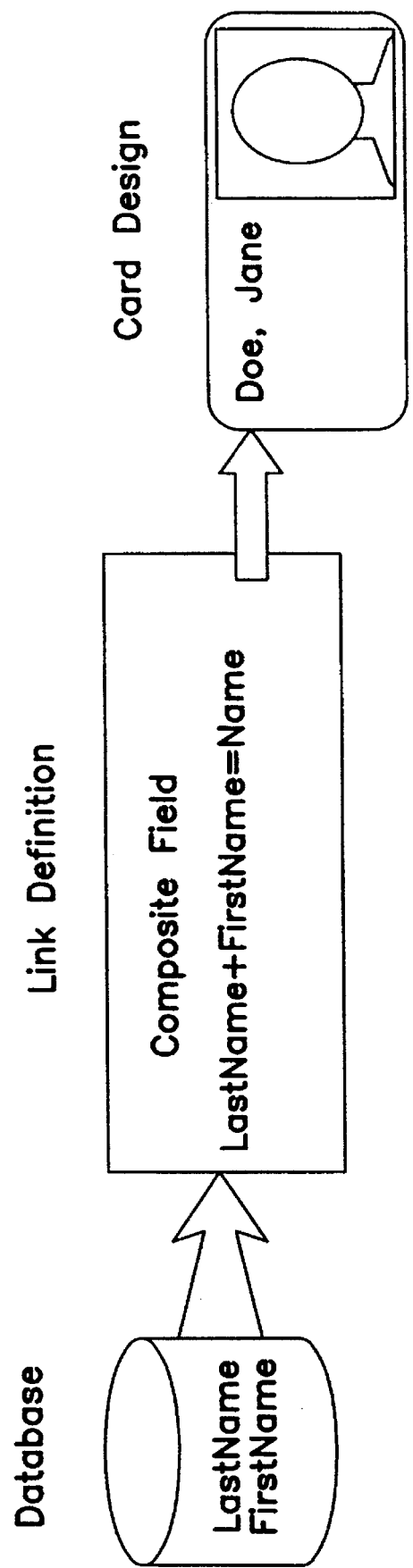
FIG. 50 is a schematic illustration illustrating composite field linking.

The FIG. 50 illustrates how composite fields work. Before you create a composite field in the link definition, you must create a field on the card design for the composite field. You should not create fields on the card design for the composite field components. You do not want to print the composite field components as separate fields. If you want to create a composite field for the example illustrated above, for instance, you would create the Name field on the card design; you would not create a FirstName field or LastName field on the card.

In the Link Definition dialog box, you must manually create links for each of the components of the composite field. AutoLink does not create links for fields that are not on the card design. You link each component field to its respective database field. You define links for each component of the composite field so they appear in the Data Capture window. Therefore, using the above example, you would manually create links for the FirstName and LastName fields. You would link these fields to their respective database fields. You would not link these fields to the card design.

You must also remove the field that you intend to use as the composite field from the Link Definition. You must redefine this field as a composite field type.

Lastly, you define the composite field in the Composite Field Definition dialog box. In this dialog box you specify each component of the composite field, in the order in which their values are to appear on the printed card. You can then apply padding, stripping, trimming, and user-defined text strings to the components, as necessary. For example, you would define the Name composite field by choosing the LastName field first, followed by the FirstName field. You would then specify that the system trims and strips both components. You would need to add a user-defined text string of a comma and space to the LastName field.

Using the following procedure to create a composite field in your link definition:

1. Create a data text field on the card design for the composite field. Refer to Section 7, Card Design.
2. From the Links menu, choose New Badge. If you have already created a link definition for this card design, choose Edit Badge.
   The Link Definition dialog box appears:
3. From the Linked Card Design list, choose the card design for which you want to define a composite field. A message box asking if you want to use AutoLink appears.
4. Choose Yes.
   The system establishes initial links for each data text and image field on the card design. The list of data text and image fields on the card design appears in the Card Design Field Links box. The name of the composite field will appear in this list.
5. Using the procedures in the previous sections, define the links for each of the fields on the card except for the card design field that will become the composite field.

Creating Links for the Composite Field Components

Using the following procedures to create the components of the composite field:

1. In the Field Type box, choose Text.
   You must choose the field type even if the Field Type box currently displays "Text."
2. In the Field Name box, type the name of the composite field component.
3. From the Linked Database Field list, choose the database field to which you want the composite field component to be linked.
4. Using the procedures described in the previous section, Defining a Data Text Field, to continue to define the link for this field.
5. When you have defined the link for the composite field component, choose the Add button.

The system adds the field to the link definition.

The field name will not appear in the Card Design Field Links box. To see if the field for which you have created the link has been added to the link definition, choose the List button.

6. Repeat steps 1 through 5 for each composite field component.

When you have finished defining each component field that will make up the composite field, you are ready to define the composite field itself.

Defining the Composite Field

Use the following procedures to define the composite field itself:

1. Use the Previous or Next button to select the composite field as the current field.

The field will be highlighted in the Card Design Field list.

2. Remove the field from the link definition by choosing the Delete button.

By choosing delete, you are not deleting the field itself. You are simply removing it from the link definition.

Figure 51:
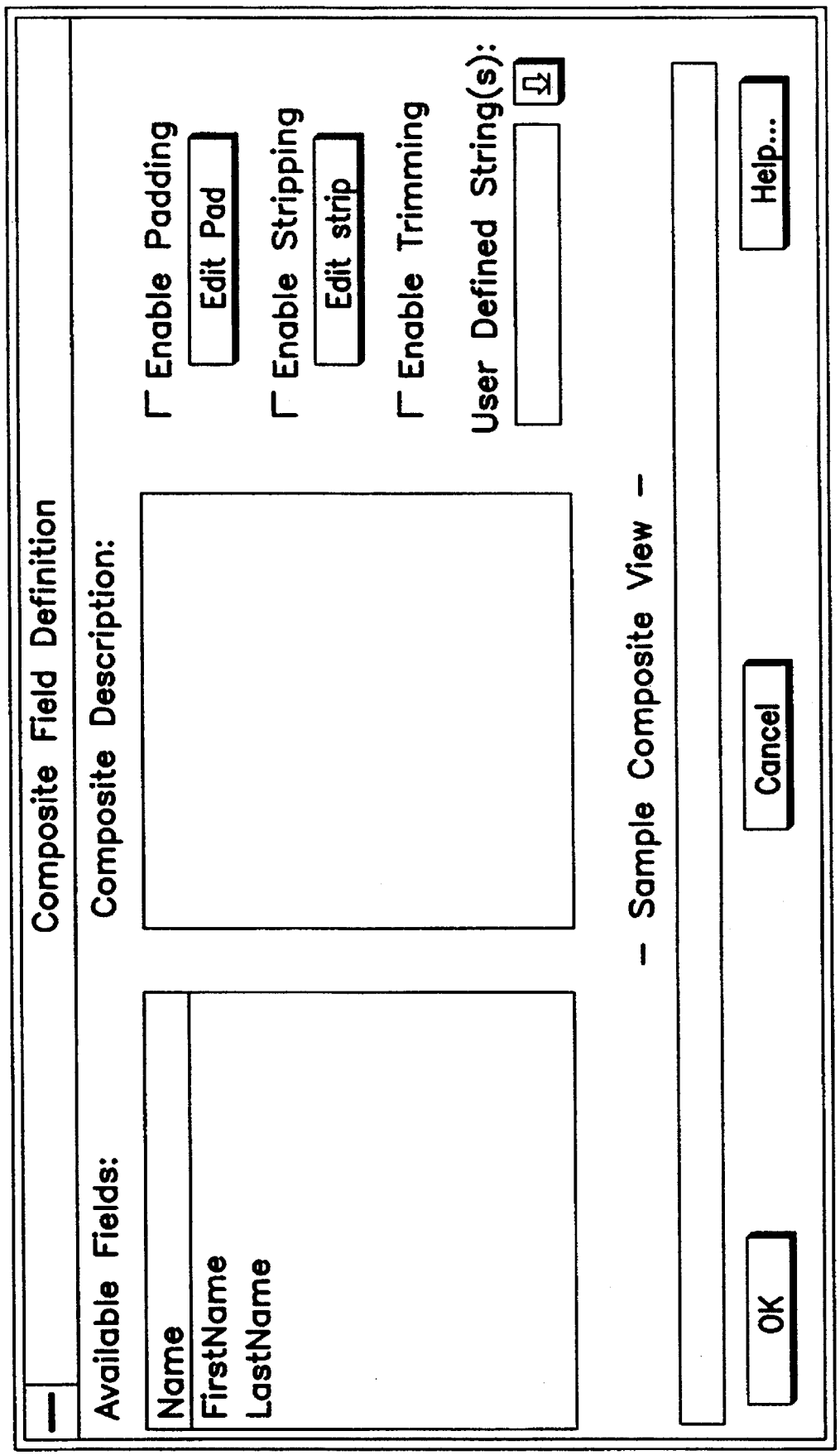
FIG. 51 is an illustration of a Composite Field Definition dialog box.
Figure 54:
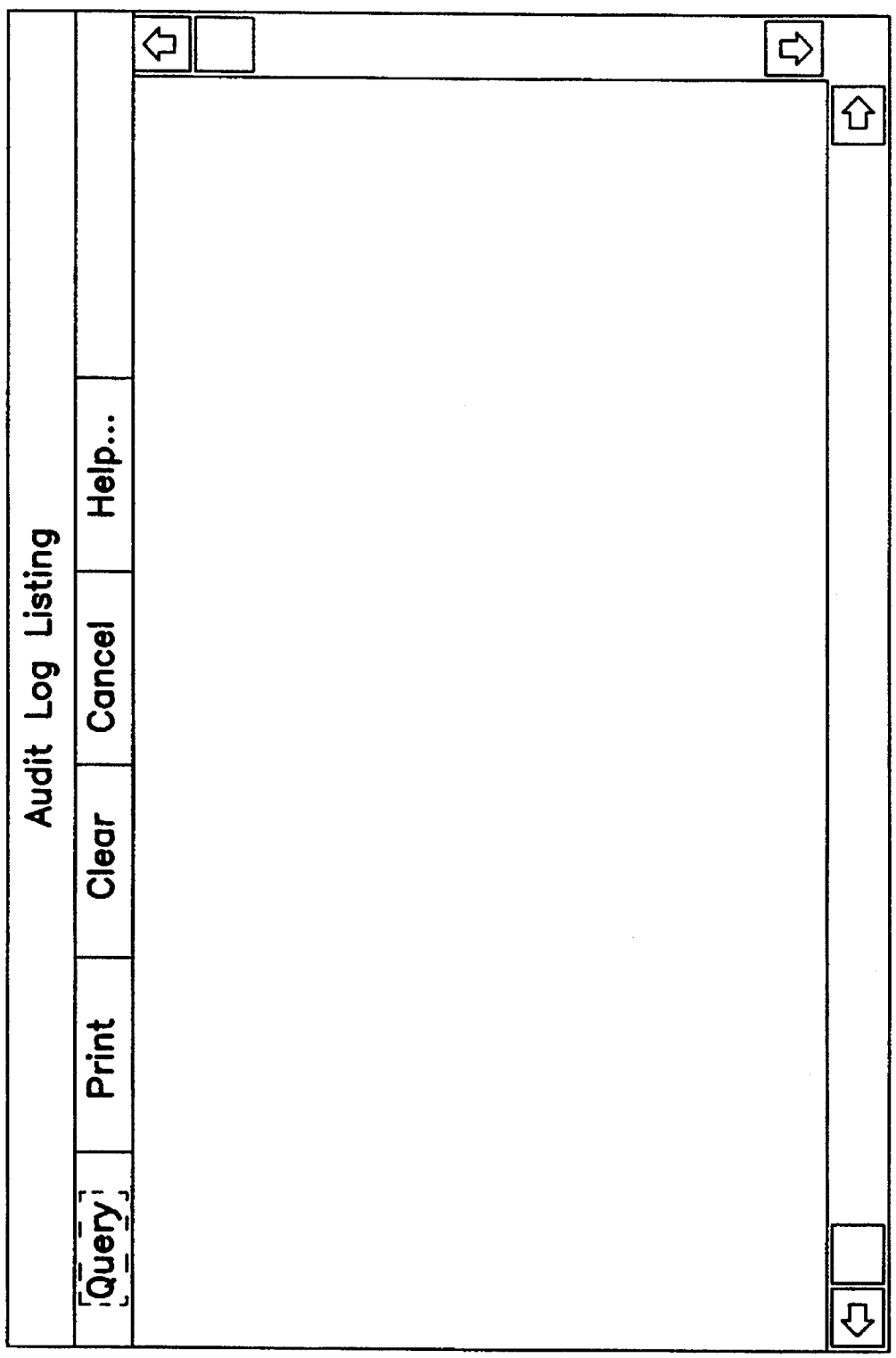
FIG. 54 is an illustration of an Audit Log Listing dialog box present in a preferred embodiment of the present invention.

3. Choose COMPOSITE from the Field Type list. The Composite Field Definition dialog box appears, see FIG. 51.

All of the available text fields that have been defined for the Link Definition appear in the Available Fields box. To the right of the Available Fields box is the Composite Description box. This box will list the composite field components in the order in which you add them to the composite field. This is the order in which they will appear on the card when printed. The highlighted field in the Composite Description box is the current field.

Specifying User-Defined Text Strings

In addition to the composite field components, you can specify text strings of up to 10 characters to print on the card at any position within the composite field. You must place these text strings into the composite field in the position in which they are to appear in the composite field on the card. For instance, to create the Name composite field in the previous example, you would want to place a text string consisting of a comma and space between the LastName field and the FirstName field. You must specify the text string after you add the LastName field, but before you add the FirstName field. Therefore, you should plan and create any user-defined text strings before you add fields to the composite field.

1. In the User Defined String(s) box, type a text string that you will want to add to the composite field.

2. Click on the arrow box.

The text string appears in the pull-down list.

Adding the Composite Field Components

You must specify each component of the composite field, in the order in which it is to be printed, within the composite field, on the card. As you specify each component, its name appears in the Component Description box. You can remove a component from the Component Description box.

1. Do either of the following:

In the Available Fields box, double-click on a composite field component.

In the User-Defined String(s) pull-down list, double-click on any user-defined text string.

2. Repeat step 1 for each component of the composite field. Remember to add the components in the order in which they are to appear within the composite field on the card. For example, if the composite field is Name and you want its value to appear on the card with the cardholder's first name first, followed by a comma, and the last name, you would double-click on the FirstName field first, followed by the user-defined string and the LastName.

3. Do one of the following:

Choose OK to save the composite field definition as it is.

Go on to the following section to select options to manipulate a composite field's component field's values.

Manipulating the Component Field's Value

For each component in the composite field, you can choose to have the system pad, strip, and trim its value as it relates to the database. These options do not apply to the component field's value when printed on the card. The following Table 11 describes these three options.

TABLE 11

| Option | Description |
| --- | --- |
| Padding | Pads the value with a specified character when stored to the database. |
| Stripping | Removes up to 10 specific characters from the field's value when retrieved from the database. You specify the characters to remove. |
| Trimming | Removes non-printable characters and spaces from either side of the field's value. |

1. From the Composite Definition box, choose the composite field component for which you want to manipulate its value.

The field appears highlighted indicating that it is the current field.

2. Do any of the following:

Select Enable Padding to pad the field's value with a specified character.

The Padding dialog box appears, see FIG. 52.

a. Type the character with which you want to pad the field's value in the Enter Pad Character box.

b. Type the number of times the pad character is to repeat as padding in the Enter Number Times box.

c. Choose OK.

Select Enable Stripping to strip the field's value of up to 10 specified characters.

The Strip Character Dialog Box appears, see FIG. 53.

a. In the Enter Character box, type the characters (10 maximum) that you want The system to remove from the field's value when it retrieves the value from the database.

b. Choose OK.

3. Repeat steps 1 and 2 for each composite field component whose value you want to manipulate.

4. Choose OK to save the composite field definition.

You return to the Link Definition dialog box:

Completing the Composite Field Definition

After defining the composite field components, you must complete the definition of the composite field in the Link Definition dialog box.

1. In the Card Design Fields Link box, select the card design field to which you want to link the composite field.

2. Choose the Add button.

3. Do one of the following:

To define link for another composite field, go back to step 1 of this section.

To define a link for a text field, go back to "Defining a Text Field Link."

To define an image field link, go to the following section, "Defining an Image Field Link."

To complete the link definition for this card design, go to "Saving the Link Definition" later in this section.

Saving the Link Definition

The last step to building a link definition is to save it:

Choose the OK button.

If you have not entered pertinent link information, the system will display a message box indicating what is missing. It also highlights the particular text box on the Link Definition dialog box for which data is missing or in error.

Edit Badge

Once you build and save a link definition, you can edit it. The same procedures apply to editing a link definition that apply to creating one. You do not, however, have to save each link to a field after making changes to its link definition. You can add and delete a field's link from the link definition. If you plan to make changes to a link definition that involve the database or the card design, it is recommended that you make the necessary changes to the database table and card design before you edit the link definition. Editing a link definition involves the following procedures:

Choosing the Badge to Edit

Adding a Field to the Link Definition

Editing a Field in a Link Definition

Deleting a Field in the Link Definition

Choosing the Badge to Edit

Before you can edit a link definition, you must select the badge. A badge name is associated with each link definition. Therefore, by selecting the badge name, you select the link definition to which it is associated.

1. From the Links menu choose Edit Badge.
   The Badge List dialog box appears.
2. From the Badge Name box, select the name of the badge (link definition) that you want to edit.
3. Choose OK.
   The Link Definition dialog box appears displaying the data for the link definition associated with the badge.

Adding a Field to the Link Definition

You can add a field to the link definition. Before you add the field, however, you must add the field to the card design, if you will want the field's value to be printed on the card. Refer to Card Design. If you want the field's value to be saved to the database with the cardholder's record, you must add the field to the database definition. Refer to Database Management.

1. Click on the arrow box next to the Field Type box to display the pull-down list of field types available.
2. From the list of field types, choose TEXT, IMAGE, or COMPOSITE.
   The system removes the existing information from the current field's link definition and displays default values for the new field in the appropriate text boxes.
   If you choose COMPOSITE, the Composite dialog box appears. Before you add a composite field, you must add the fields that are to become the composite field components.
3. You can enter the new field's link definition in the appropriate text boxes in the Link Definition dialog box, or Composite dialog box. For complete procedures and information regarding link definitions for these field types, refer to New Badge earlier in this section.
4. When you have entered all of the link definition information for the new field, choose the Add button. If the new field is linked to a field on the card design, the field name will appear in the Card Design Field Links box. If the new field is linked to the database, the new field name will appear in the Field Names dialog box.
5. Do any of the following:
   To save the Link Definition with the changes, choose the OK button.
   To add another field to the link definition, repeat steps 1 through 4 above.
   To edit an existing field in the link definition, go on to the following section, Editing a Field in the Link Definition.
   To delete a field from the link definition, go on to Deleting a Field From the Link Definition.

Editing a Field in the Link Definition

Once you have added a field to the link definition, you can edit it. If you make changes to a field's link definition and it is linked to a card design field, make sure you have made the appropriate changes to the card design before you change the link definition. If you make changes to a field's link definition and it is linked to a database field, make sure you make the appropriate changes to the database design before you change the link definition.

Choosing the Link Definition Field to Edit

You can edit any information in the Link Definition dialog box. You edit the link definition on a field-by-field basis, like how you build the link definition. Therefore, in order to edit link definition information, you must make sure that the field for which you want to edit the link definition is the current field. You can use two methods to display the current field link information.

Choosing from the linked card design fields
   This is the faster method to display the link for a particular field, but you can only choose link information for fields that originate on the card design.

Choosing from all linked fields
   Using this method of selecting the current field link to display in the Link Definition dialog box allows you to select any linked fields as the current field.

Choosing the Current Field from the Linked Card Design Fields

You can quickly display the link information for any linked card design field:

Select any linked card design field in the Card Design Field Links box.
   The link information for the selected field appears in the text boxes in the Link Definition dialog box. This is the current field.

Choosing the Current Field from All Linked Fields

Although not as fast, this option enables you to select any linked field in the link definition. Because your link definition may contain linked fields that are not on the card design, you cannot select the current field using the previous method. You can use one of two methods to select these fields:

Choose the Next button to display the next field in the link definition or choose the Previous button to display the previous field in the link definition.

or

1. Choose the List button.
   The Field Names dialog box appears. This dialog box lists all of the fields that have been linked in the link definition.
2. Select the link field for which you want to display information in the Link Definition dialog box.

3. Choose the OK button.
   The Link Definition dialog box appears, displaying information for the selected field.
   If the field you select is a composite field, the Composite dialog box appears.

Editing the Link Definition Field's Data

1. To edit the link definition field's data in the Link Definition dialog box, refer to Defining a Field earlier in this section.
2. Do any of the following:
   To save the Link Definition with the changes, choose the OK button.
   To edit another field in the link definition, repeat the procedures above.
   To add another field to the link definition, refer to Adding a Field to the Link Definition.
   To delete a field from the link definition, go on to Deleting a Field From the Link Definition.

Deleting a Field from the Link Definition

You can delete any field from the link definition. However, before you delete the field from the link definition, you should be aware that if the field is linked to the card design, the field's value will no longer print on the card. If the field is linked to the database, it's value will not be stored to the database. In fact, by removing the field from the link definition, the field will no longer appear as a text or image box in the Data Capture window.

Choosing the Link Definition Field to Delete

You can edit any information in the Link Definition dialog box. You edit the link definition on a field-by-field basis, like when you build the link definition. Therefore, in order to edit link definition information, you must make sure that the field for which you want to edit the link definition is the current field. You can use two methods to display the current field link information:

Displaying the current card design field link.
   This is the faster method to display the link for a particular field, but you can only choose link information for fields that originate on the card design.

Choosing from the list
   Using this method of selecting the current field link to display in the Link Definition dialog box allows you to select any linked fields as the current field.

Displaying a Linked Card Design Field as the Current Field

You can quickly display the link information for any linked card design field:

Select any linked card design field in the Card Design Field Links box.
   The link information for the selected field appears in the text boxes in the Link Definition dialog box. This is the current field.

Displaying any Linked Field as the Current Field

Although not as fast, this option enables you to select any linked field in the link definition. Because your link definition may contain linked fields that are not on the card design, you cannot select the current field using the previous method. You can use one of two methods to select these fields:

1. Choose the Next button to display the next field in the link definition or choose the Previous button to display the previous field in the link definition.

or

Choose the List button.
   The Field Names dialog box appears. This dialog box lists all of the fields that have been linked in the link definition.

2. Select the link field for which you want to display information in the Link Definition dialog box.
3. Choose the OK button.
   The Link Definition dialog box appears, displaying information for the selected field.
   If the field you select is a composite field, the Composite dialog box appears.

Removing the Field

Once the field you want to delete from the link definition is displayed in the Link Definition dialog box, you can delete it by:

Choose the Delete button.
   If the field was linked to the card design field, its name will still appear in the Card Design Fields Link box. The field's name, however, will not appear in the Field Names dialog box, which you can access by choosing the List button in the Link Definition dialog box.

Deleting a Link

You can delete any link from the system. However, if you delete a link, remember that you also loose the Data Capture screen and its links to the database and card design fields that are associated with the link.

1. From the Links menu, choose Delete Badge.
   The Badge List dialog box appears:
2. From the Badge Name box, select the badge (link definition) that you want to delete.
3. Choose OK.
   A dialog box asking that you verify the deletion appears.
4. Do one of the following:
   To delete the link, choose Yes.
   To not delete the link, choose No.

Importing/Exporting a Badge

When you create a link, the system saves the information associated with the link in an internal database. Because the link definition becomes part of that database's structure, you cannot simply copy the link definition to a diskette to transport it to another system. Therefore, you must export the link definition to a destination and import it from a specified source.

1. From the Links menu, choose Import/Export Badges.
   The Import/Export Badge dialog box appears, see FIG. 40.

Exporting Badges

1. From the Specify First box, choose the function you want to perform.
   The system defaults to the drive and directory in which the badge records reside.
2. In the Badge Records box, select the badges (link definitions) that you want to export.
   If the badge records (link definitions) you want to export reside in a different drive or directory, change those in the appropriate dialog box lists before selecting the badge records to export.
3. Choose OK.
   The system exports the badge records (link definitions) to the specified drive and directory.

You must use the import function to retrieve the badge records.

Importing Badge Records

You must import any badge records that have been exported.

1. From the Drives list, select the drive on which the badge records to import reside.

2. From the Directories box, select the directory in which the badge records to be imported reside.
3. From the Specify First box, choose the Import function. A list of badge records appears in the Badge Records box.
4. From the Badge Records box, select the badge records to import.
5. Choose OK.

The system imports the specified badge records into its internal database structure.

Activity Management

The system provides a log that serve as a useful production management tool:

Audit Log

This log tracks all the system production activity. It is useful for analyzing operator production data.

Monitoring Production

If your site outputs a large volume of cards and operator production rates are important, monitoring system production will be an important consideration. The system provides a tool that allows you to display and/or print production activity. The Audit Log monitors all production activity, including user, module(s) used, date/time, and operation. The Audit Log tracks a maximum of 1,000 entries; when it reaches that limit, new entries overwrite the oldest entries.

You can view and print the log. In addition, you can query the Audit Log for specific entries that meet your search conditions.

Viewing the Audit Log

You can view the current Audit log.

From the Logs menu, choose Audit Log. The Audit Log window appears, see FIG. 46.

Querying the Audit Log

To view system activity, you must specify the information that you want to see. You specify this information in a SELECT statement. You build your select statement, using SQL syntax, by choosing from the Query Builders displayed on the Query dialog box, see FIG. 55.

1. From the Audit Log Listing window, choose the Query button.

The Log Query dialog box appears:

In the Query Statement box, the system places a default SELECT statement. This statement automatically returns all of the possible records showing database fields, users, and operations. You can display this activity by choosing the Query button.

If you want to specify the user, database field, or operation for which you want to report, you must create your own SELECT statement. For more information on SELECT statement syntax, refer to Section 6, Database Management.

SELECT Statement Syntax for Log Query

Use the following syntax to build a basic SELECT statement:

SELECT ALL WHERE <where_name> <comparison operator> <value>

The following Table 12 describes each component of the basic SELECT statement.

TABLE 12

| Component | Description |
| --- | --- |
| SELECT | Use to introduce the SELECT statement. |
| ALL | Specifies that The system retrieves all fields of those records meting the search condition. You can replace the ALL with the name(s) of a database field. If you specify more than one field, separate each with commas. In fact, build a SELECT statement of SELECT ALL to retrieve all production information. |
| WHERE | Introduces the WHERE clause, which states the search conditions. Use only if you want to specify search conditions. |
| <field_name> | Select one of the listed users or operations to specify the user or activity you want to query. Can by USER if retrieving production information based on one or more users, or OPERATION to query specific production information. |
| <comparison operator> | The system uses the comparison operator to compare the field name with the specified value. The operator states the conditions by which the query selects production information. The comparison operators include:<br>= Equal to<br>< > or = ! Not equal to<br>> Greater than<br>< Less than<br>>= Greater than or equal to<br><= Less than or equal to<br>– Wild card (one character)<br>% Wild card (more than one character) |
| <value> | The value, together with the comparison operator, states the condition, by which the query retrieves production information. If the <field_name> is PRODUCTION, you will enter a value of one or more specific operations. |
| AND,OR | Use these Boolean operators to build a compound SELECT statement, which specifies multiple conditions, or WHERE clauses, by which you query production data. |
| ( ) | Use the parenthesis to group WHERE clauses. Grouping WHERE clauses determines the order in which multiple search conditions are processes. The system processes those conditions enclosed in parenthesis first. |

Building Your Basic SELECT Statement

Use the following procedure to build the SELECT statement. Your system administrator will be able to help you if you need assistance.

You can choose the Restore button at any time to restore the SELECT statement to its original form. You can choose the Clear button to clear the Query Statement box and start over.

1. Choose the SELECT button.

The word "SELECT" appears in the Query Statement box.

2. Do one of the following:

Choose the ALL button from the Query Builders section.

Choose the one or more names of specific database fields for which you want to query production activity from the Database Fields list. Separate multiple fields with commas.

3. Choose the WHERE button.

The word "WHERE" appears in the Query Statement box.

4. Do one of the following:

Type "USER" in the Query Statement box to add search conditions that specify one or more users to query.

Type "OPERATION" in the Query Statement box to add search conditions that specify one or more operations to query.

Type DATE to specify one or more dates for which you want to report.

Type TIME to specify a time or time period for which you want to report.

5. Choose one or more comparison operator.

6. Do one of the following:

Choose one or more of the users listed in the Users list to query production activity for specific users. Separate multiple users with commas.

Choose one or more of the operations listed in the Operations list to query production activity for specific system functions. Separate multiple operations with commas.

Enter a value of your own to specify the user(s) or operation(s) you want to retrieve.

Choose the Date or Time button to add placeholders to the SELECT statement. Replace the placeholders with a specific time or date.

You can establish the date and time format in the Windows Control Panel.

7. Do one of the following:

Choose the Query button to display the production activity specified in your SELECT statement.

Add an ADD or OR to your SELECT statement to add search criteria to your SELECT statement. Repeat steps 4 through 6 to add additional search criteria to the SELECT statement.

Printing the Audit Log

Once you display the Audit Log, you can print a copy of it.

Choose the Print button.

The displayed audit log prints to a local printer

If the printer to which you are connected is the ImageCard II, you will need to connect to a different printer in Printer Setup.

Clearing the Audit Log

After viewing and printing the Audit Log, you can clear the Audit Log window to create another.

Choose the Clear button.

The system clears the Audit Log window.

SUMMARY

Figure 56:
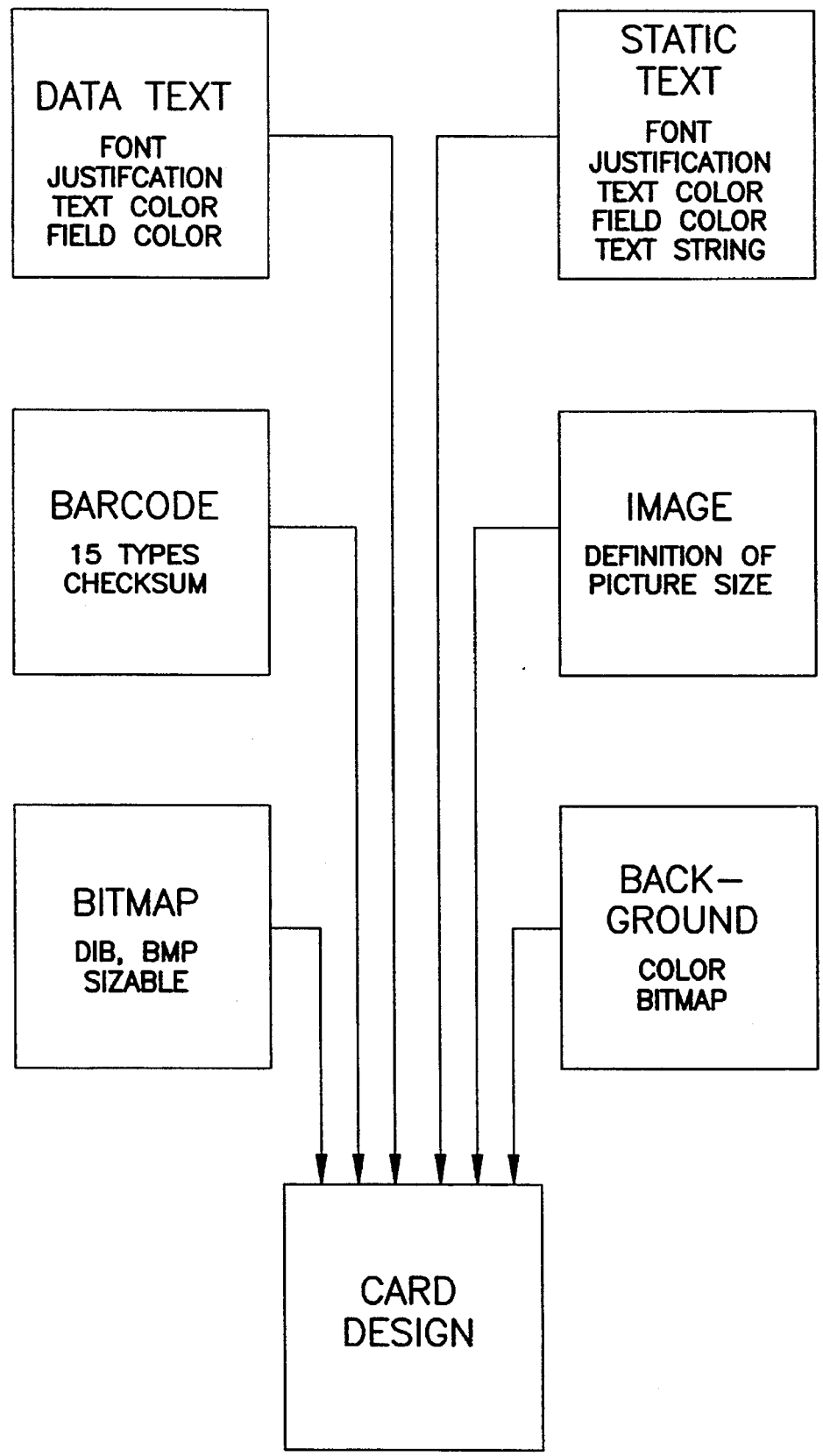
FIG. 56 is a block diagram illustrating some of the various types of data used by the present invention to create a card.
Figure 57:
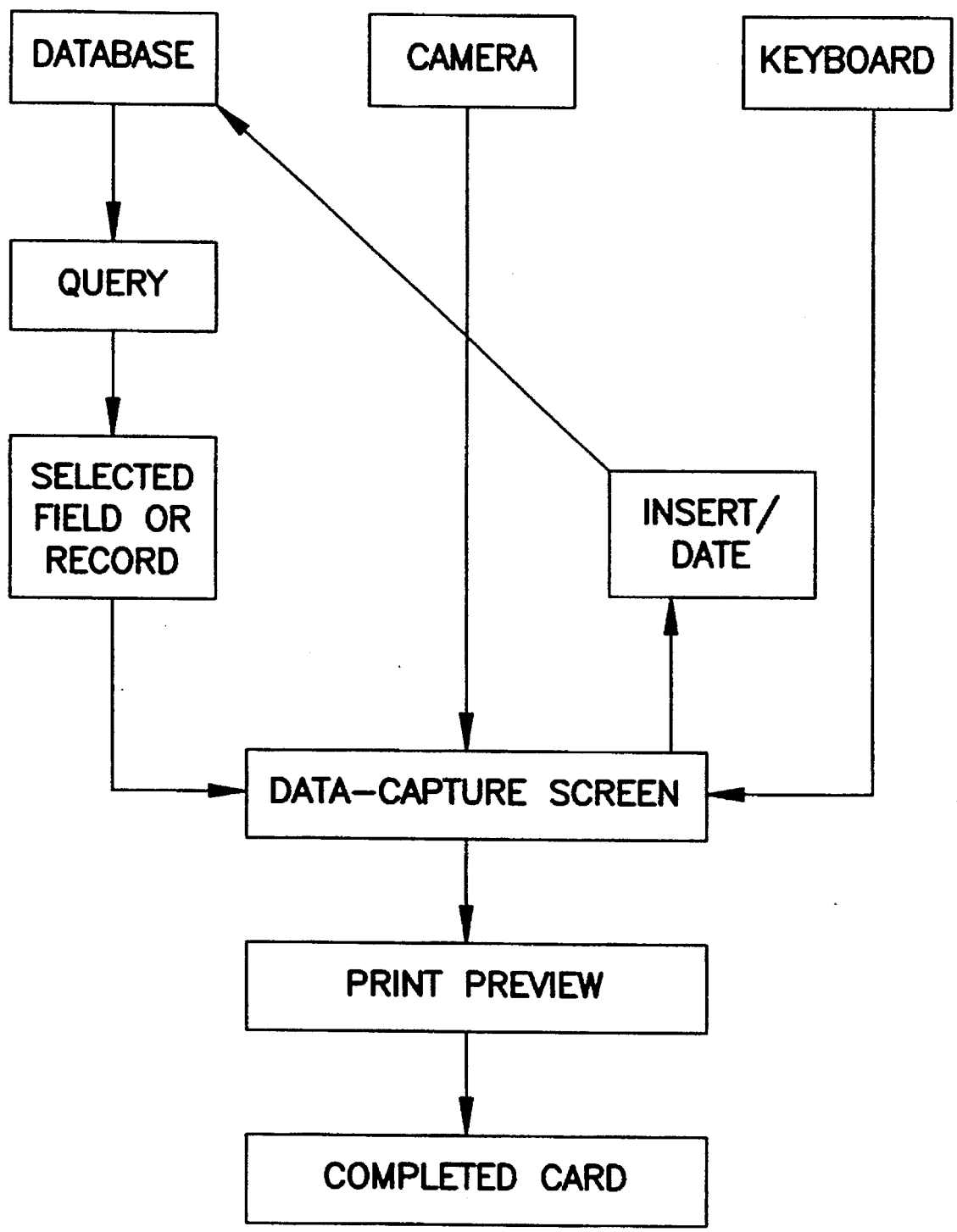
FIG. 57 is a block diagram illustrating Data Capture Screen interaction with different cardholder data sources including database, camera, and keyboard.
Figure 58:
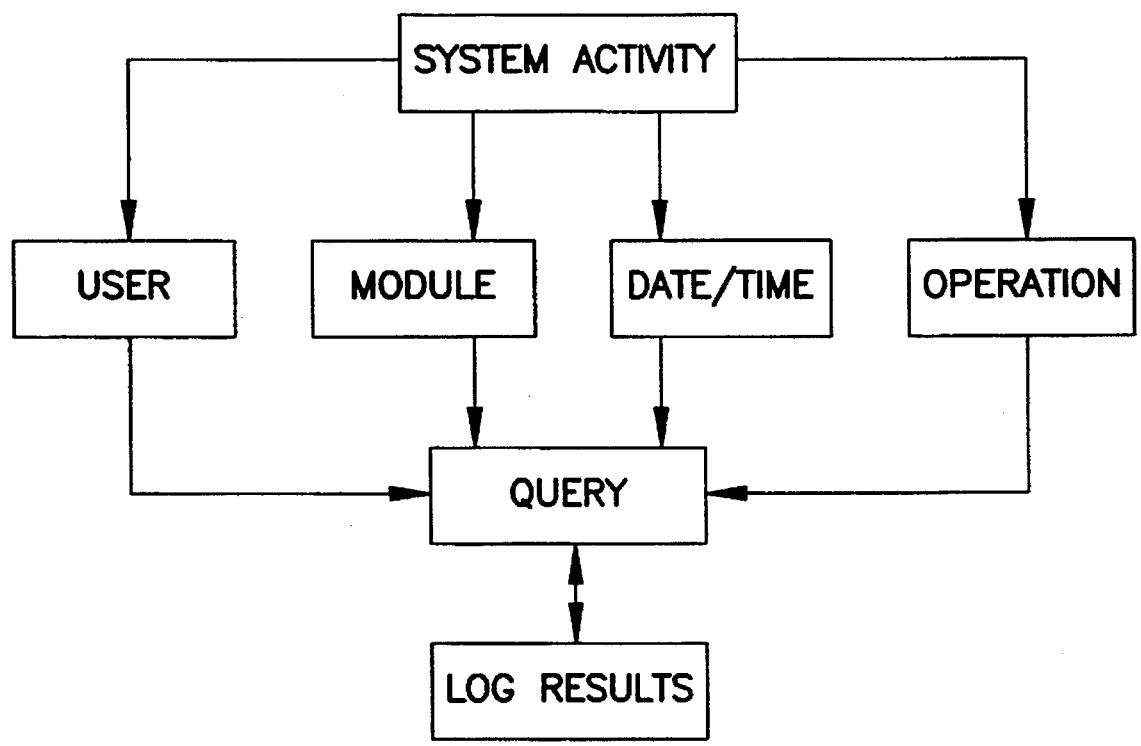
FIG. 58 is a block diagram illustrating system activity log functions of the present invention.

In summary the present invention provides a card creation apparatus and method which can produce a card using any combination of text, photographical images, barcode, and graphics (see FIG. 56). The present invention links database information, video image input from a camera, and user input from an input device such as a keyboard and allows presentation in a Data-Input or Data Capture Screen. Upon editing card holder data on the Data Capture Screen, the database can be accordingly updated. The present invention provides a print preview function wherein the card can be viewed as it will actually appear upon being printed out. As shown in FIG. 58, the present invention monitors its (system activity) so that logs can be obtained based on user, module function, data/time, and/or operation.

Data Structures

There are four primary data structures in the system in addition to the Cardholder data structure(s). These structures include files for the card layout or design, user management/security, link function, and transaction log. The definition of these structures will expand as the system takes on additional functionality.

Figure 59:
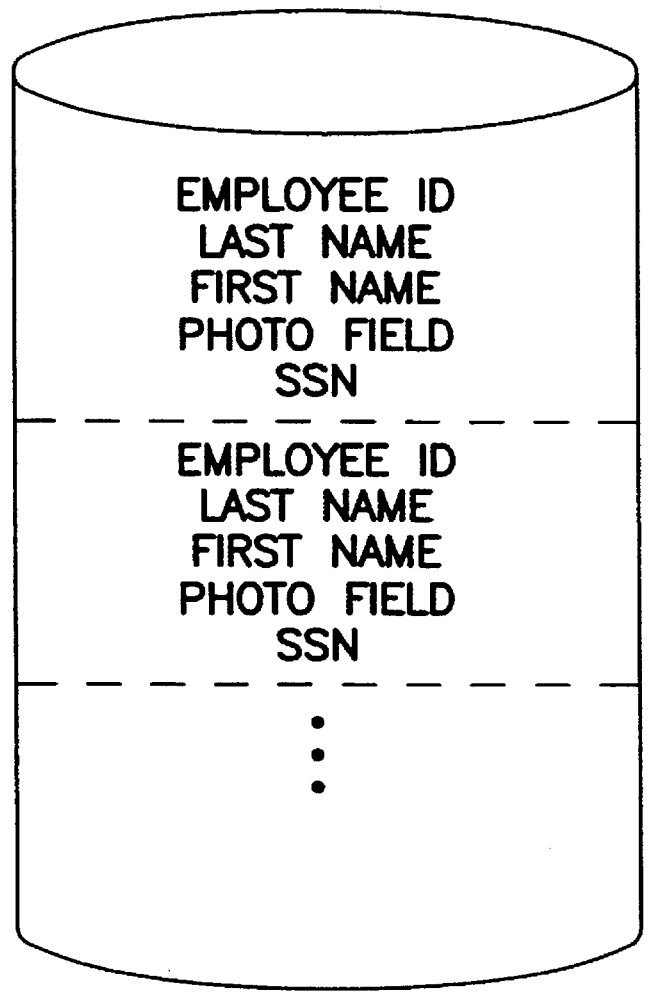
FIG. 59 is an illustration of an embodiment of a customers data structure.

The cardholder data, also referred to as customer data, is stored and maintained in "open" industry standard formats. Open connectivity is facilitated by industry standards such as that defined by the Microsoft ODBC architecture. As shown in FIG. 59, the customer data may take on any number of standard database formats which support an ODBC compliant Driver (ISAM or SQL) such as:

FoxPro

Access

Dbase

Paradox

The customer data might include information such as:

Employee ID

Last Name

First Name

Photo Field (image)

Social Security Number (SSN)

etc.

Figure 60:
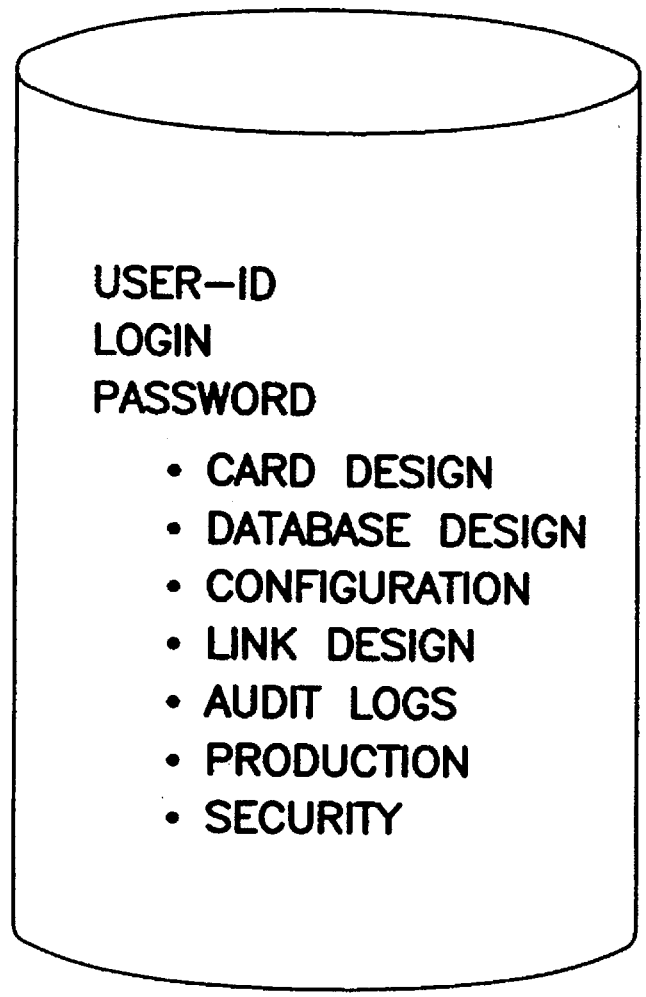
FIG. 60 is an illustration of an embodiment of a users data structure.

The Users.Dat data structure as shown in FIG. 60 includes information required for user management and security. It basically stores user information to control access to different parts of the system. Information stored in this structure includes:

User-ID

Login

Password

Function Access

Card Design

Database Design

Configuration

Link Design

Audit Logs

Production

Security etc.

etc.

Figure 61:
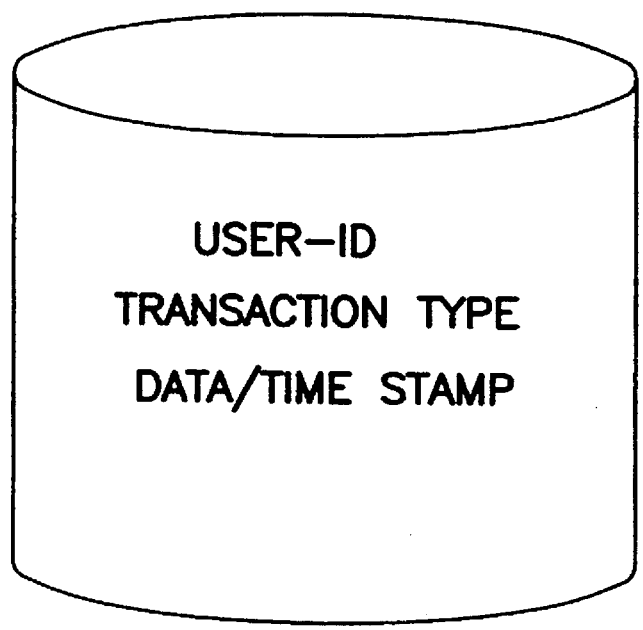
FIG. 61 is an illustration of an embodiment of a transaction log data structure.

The Transaction Log data structure as shown in FIG. 61 tracks system activity. Information stored in this structure includes:

User-ID

Transaction Type

Date/Time Stamp etc.

Figure 62:
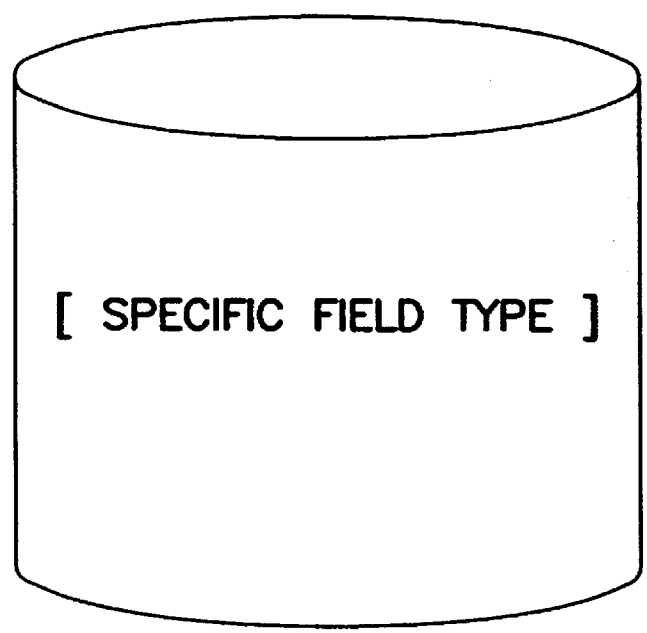
FIG. 62 is an illustration of an embodiment of a card design data structure.

The Cards.dat data structure as shown in FIG. 62 stores information which contains card format or layout specifications. The specific data stored in this structure will change as additional functions such as embossing, mag stripe encoding, logic programming, etc. are added to the system. Examples of data stored in this information include:

Name of Card Design

Portrait or Landscape

Card Background

Stretched

Tiled

Overlay Areas [or Full Card]

Field X,Y Coordinates

Field Rotation

Field Types

Static Text (font print size, color, background color)

Variable Text (font print size, color, background color)

Bitmap

Image

Barcode

Figure 63:
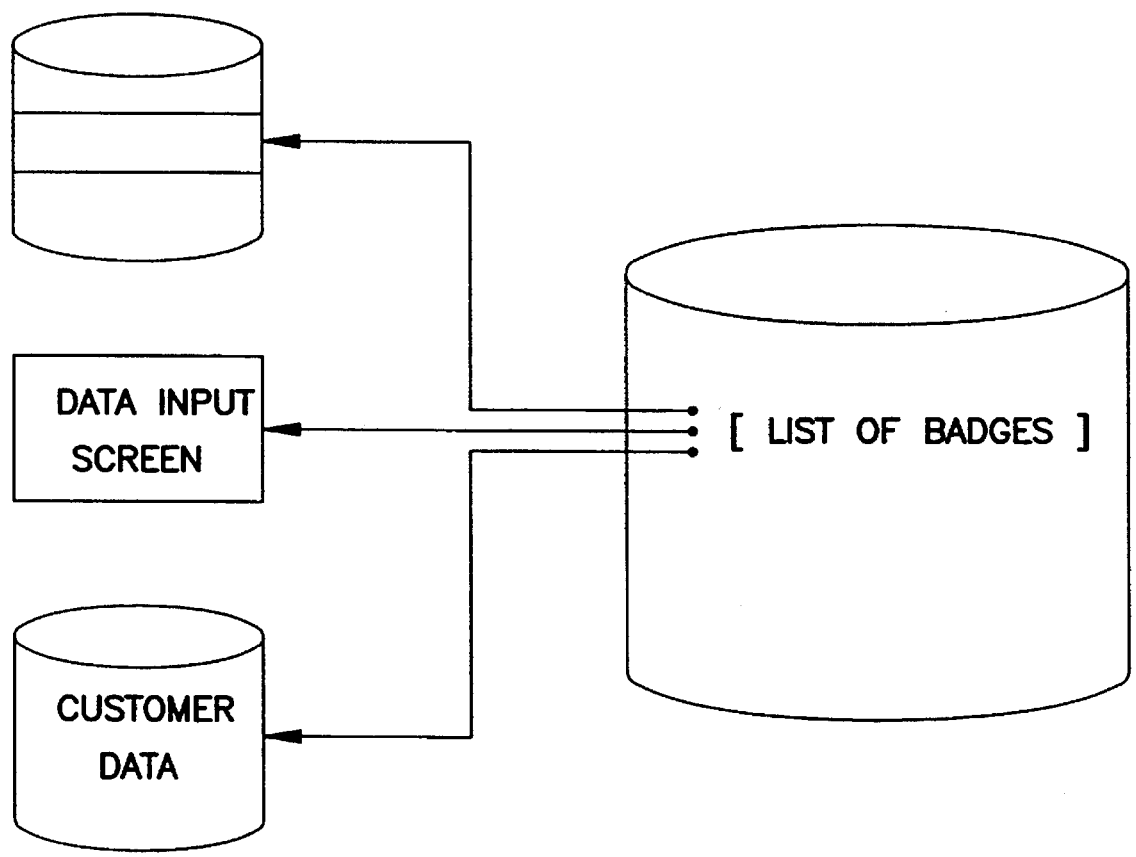
FIG. 63 is an illustration of an embodiment of a links data structure.

The Linds.Dat data structure as shown in FIG. 63 includes the list of Badges available for production. The Link structure ties the entire system together. The primary structures that are linked together include: Link to Card Design, Link to Customer Database, and Input to screen format and prompts.

Figure 64:
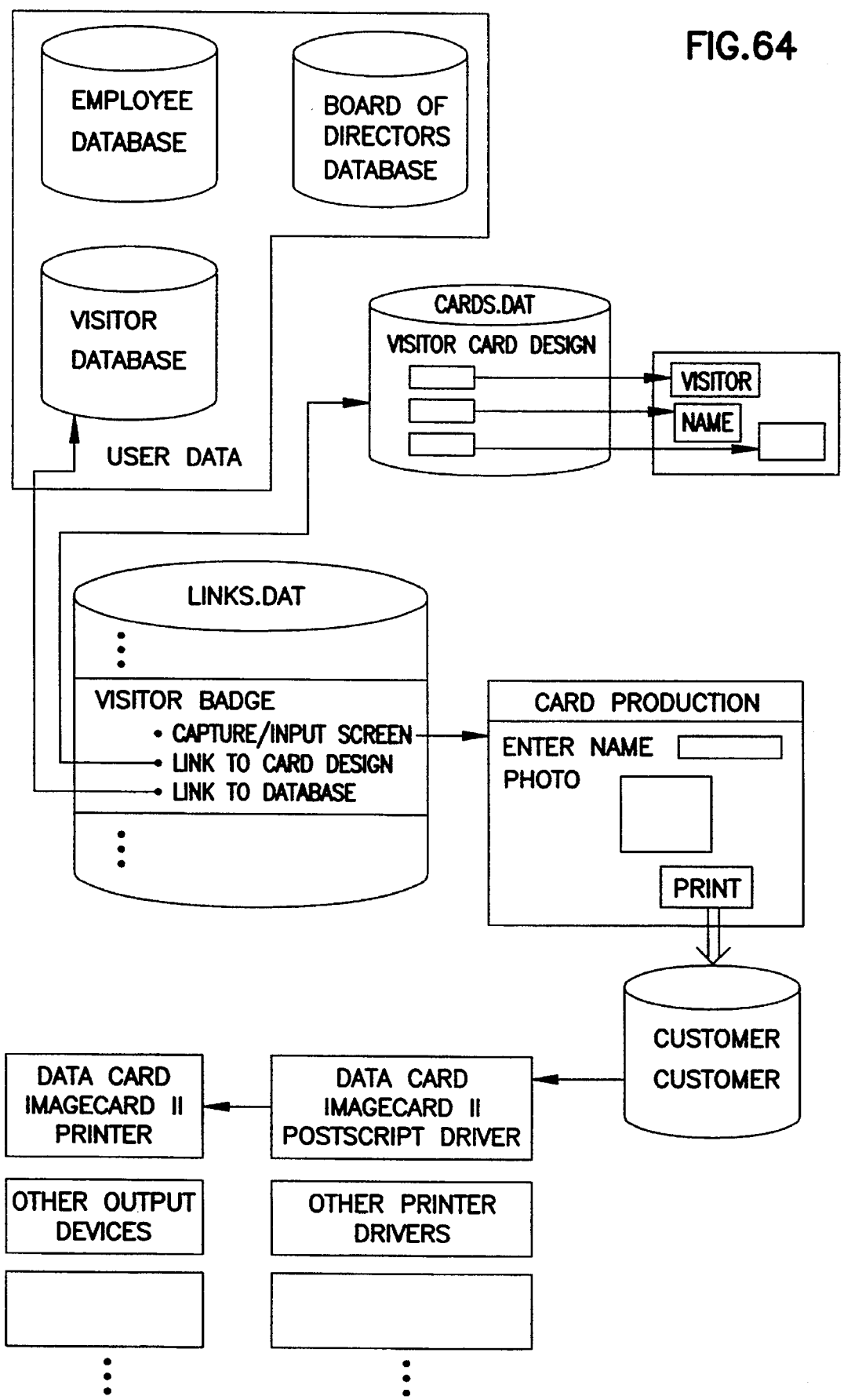
FIG. 64 is an illustration of database interactions.

An example of various data structure interactions is shown in FIG. 64. It will be appreciated that the data structures may take on varying configurations and interactions and still be in keeping with the principles of the invention.

External Links

The external design of the card creation system 40 is broken into two areas. The areas covered in this section are:

Filters

Dynamic Data Exchange (DDE)

The areas of Internal Design affected by this implementation is discussed in the sections that follow.

Filters provide a method in which third-party developers can extend the functionality of the product. The primary purpose of Filters is to extend functionality without requiring modification of the main product. Examples of filters are custom bar code check digit calculation and data validation. The input for Filters is a Windows Dynamic Link Library (DLL) that is in a predefined format. For example, the entry points of the DLL must be consistent so the system can access them at runtime.

The operator or administrator enables Filters using Configuration functions. A filter is associated with a particular field in a badge form during the Link phase. The system accesses the Filter during the Production phase.

The inputs and outputs of Filters vary depending on the purpose of the filter. For example, a filter may require the operator to enter data in a specific format in production.

A link field may have exactly one input device. The default is the edit field on the production screen. Alternate input devices are cameras, signature pads, etc.

A link field will have one or more output devices. The card is the default output device. Additional output devices are the magstripe encoder, an embosser, etc. An output device is a piece of hardware and it's device driver.

A filter modifies data. It modifies the data of a production screen element (an edit field or image, etc.) It executes when a trigger or event happens. After the filter modifies the data, it can be sent to one or more places. Examples:

A filter may change all characters to uppercase, on a lose focus event, and then return the data to the screen after the user has entered the data (it may then be inserted to the database or printed). Note: By pressing insert or print, the field will lose focus.

A filter may add a checksum to a field that is saved to a database. The screen data is not modified.

After reading the database, a filter may strip off a checksum before it is displayed to the screen.

To attach filters, the users will have to select the output devices first. Internally each field will have a list of output devices. Each output device will have a list of filters.

Turning now to an example filter/DLL, a BarCode Custom Checksums filter may be provided. Some customers prefer to create their own checksums to be used with Barcodes. This can now be accomplished through the use of the .INI file and a DLL which will produce the checksum and add it to the barcode data. Each time a customer requests a custom checksum a new DLL must be created. No changes will be required in the core card creation apparatus 40 (i.e., no recompilation of software code is required).

An .INI file will store the checksum DLL names. The entries in .INI must be under the heading CUSTOM BAR CODE CHECKSUMS. Each bar code type must have its own entry if it will have any custom barcode checksums. The entry names for the bar codes are the same as the bar code names listed in the Card Designer with all spaces removed. No spaces are allowed in the entries. All DLL names must have the DLL extension included in the entry. For example,

[CUSTOM BAR CODE CHECKSUMS]

Code128=Cust1.DLL,Cust2.DLL,Mycust.DLL

In this case, the Bar code "Code 128" has two user installed checksum DLLs. It should be noted that there are no spaces in the tag to the left of the equal sign. Also note that there are no spaces following the commas between the file names.

In the card designer, when the user selects a Barcode type, software code must be added to scan the .INI file and look for any custom checksum DLL entries for the selected Barcode type. If found, insert the entries in the checksum list box. Save the information in the ChecksumDLL variable.

Also, in production, if there is an entry in the Checksum DLL variable, then the DLL must be loaded. A pointer to the DLL's function (AddCustomCheckDigit) must be added and the function must be called for the barcode data (this will append the checksum). Finally, the library must be unloaded when finished.

The function in the DLL must be:

int    AddCustomCheckDigit(LPSTR    barcodeString, WORD bufferSize, WORD BarType)

Some barcodes, by definition, require mandatory checksums. In this case, the users checksum is added to the data followed by the mandatory checksum. If the barcode does not have a mandatory checksum, the custom checksum will be the only checksum appended.

To satisfy the requirement of Visible checksums, two functions exist:

BOOL CTextField::DoesFieldNeedCheckDigit( . . . );

This returns TRUE if the current text field is attached to a Link Field and the Link Field is also attached to a barcode field. This call also collects the bar code type, the checksum type and the name of the custom check digit DLL.

AppendCheckSum(. . .);

Appends either the Strandware checksum digits or the custom checksum digits.

This leads to some complications in that some barcode types put a binary number as the check digit, others interpret the binary digit and display it as character. For example, assume the calculated checkdigit is 68. Some barcode strings will display as:

NNNN68. Yet, CODE39 displays it as: NNNND.

At this time it is known that CODE39, MSI Plessy, and Int 2 of 5 are the barcodes who's checksums are translated to ASCII characters in this manner.

Another related filter/DLL, is Custom barcodes which can be added by providing a Windows DLL to draw the custom barcode. A custom checksum DLL can be used in conjunction with a custom barcode DLL.

When the custom barcode DLL is installed, the .INI file must be modified so that the Card Designer can show the custom barcode to a user.

The usage of a custom barcode DLL will be as follows:

in Card Designer, the barcode dialog box will show the name of the custom barcode DLL so that a user can select it.

whenever the barcode must get printed (to the printer or screen), the system will load the custom barcode DLL into memory and call the functions required to validate and/or draw the barcode.

To give the user the ability to select a particular custom barcode DLL, the .INI file (found in the windows directory) must get changed. The Card Designer will use the "Barcode" "Custom" .INI setting to display custom barcode DLLs in the barcode dialog. An example of the .INI setting follows:

[Barcode]

Custom=cust_bar.dll, new_bar.dll

In the Card Designer system 40 barcode dialog box "cust_bar.dll" and "new_bar.dll" will get displayed in the "Barcode Type" combobox (in addition to the standard barcodes).

A custom checksum DLL can be associated with a custom barcode DLL. To do that an additional .INI setting must get added to section "Custom Bar Code Checksums". An example follows:

[Custom Bar Code Checksums]

new_bar.dll=newbarck.dll

When "new_bar.dll" is selected as the bar code type, "newbarck.dll" will be displayed in the check digit "Type" combobox.

Two functions are called from a custom barcode DLL. They are ValidateBarcode and DrawBarcode, which are explained below.

DrawBarcode should take the barcode data that is passed to it and draw it in the passed rectangle. This function should not be used to display popup error messages because it will get called during the WM_PAINT handling. If there is an error, DrawBarcode should draw an error barcode.

Parameters:

HDC Handle to a device context to draw the bitmap to, note that that this may be the screen or the printer LPCSTR Pointer to the barcode data int Printer resolution of the card printer RECT Rectangle, in device coords, to put the barcode into. On entry to DrawBarcode the viewport extents have been set so that 1 device unit maps to 1 pixel of the device that is associated with the passed device context.

int orientation (0, 90, 180, 270)

Return values:

0=Ok

1=Invalid data

2=Barcode is too big for the field

ValidateBarcode should take the barcode data that is passed to it and do two things. The first is to make sure that the passed data is valid. The second is to make sure that the resulting barcode fits into the passed rectangle. One thing that ValidateBarcode should not do is to draw in the passed rectangle.

The card designer system 40 will always display a message box if an error value is returned. ValidateBarcode can put up error messages for invalid data, if they are more precise than "Invalid Data" (which is what will be displayed).

Parameters:
| | |
|---|---|
| HDC | Handle to a device context to draw the bitmap to, note that that this may be the screen or the printer |
| LPCSTR | Pointer to the barcode data |
| int | Printer resolution of the card printer |
| RECT | Rectangle, in device coords, to put the barcode into. On entry to DrawBarcode the viewport extents have been set so that 1 device unit maps to 1 pixel of the device that is associated with the passed device context. |
| int | orientation (0, 90, 180, 270) |

Return values:
0 = Ok
1 = Invalid data
2 = Barcode is too big for the field

Yet another filter/DLL is a live video capture DLL which is integrated into the card system 40 or can be used by some other program which is capable of calling a DLL.

The capture DLL provides a means of capturing a live image. It remains independent from the software. As a result, changes can be made to the capture DLL without affecting the core software or requiring a major upgrade to the card creation system 40.

The capture software produces 3 files. First the "base file" which is the captured image as seen in the live video. This file normally is captured as a 16 bit Targa file (smallest type with maximum resolution). The second file is the "cropped file" which saves the image portion which has been cropped by the operator. The last file is the "resized" cropped image resized to the X/Y coordinates passed to the capture program. The name of this file is the name passed to the DLL (extension determines format). If no name is given to the DLL, the DLL uses the name in the Temp.INI file for final save name.

Another filter/DLL example is for supporting the encoding of magstripes using the DataCard 160 encoder/reader. This encoder requires software for the 160 to allow emulation of the American Magnetics Corporation (AMC) 712 encoder/reader. The following will outline this DLL and highlight the differences between this DLL and the DLL intended for the AMC712.

The purpose of this DLL is to give a simple interface that allows the DataCard 160 encoder to be driven with a minimum of internal code. This DLL is one of a series of output filters (or formatters) that will be used with the card creation apparatus 40. The purpose of the output filters, in general, is to provide a method for adding output devices while minimizing the amount of code that must be added to the core software to support these devices.

This DLL is basically the same as the AMC712 DLL which is described below.

First, the software calls the FilterControl function with the BEGIN_PRODUCTION escape. This is currently done for each card, but could eventually be done only once at the beginning of production. Next, FilterControl is with the BEGIN_CARD escape. Following this, the ProcessMagstripe function is called with three arguments: an integer indicating the track number, a character pointer to the data to be encoded, and an integer indicating the number of bytes to be encoded.

Then, FilterControl is called with the END_CARD escape. At this point, the user will be prompted to swipe a card through the encoder. The "Print" button, is disabled among others, before it calls this. After a return value is received from the function call, the disabled buttons are re-enabled. Finally, FilterControl is called with the END_PRODUCTION escape.

For each of these functions, a positive value means the function call was a success, while a negative value indicates a failure. A zero value would indicate that the function is not implemented.

The other external link is Dynamic Data Exchange (DDE) which is employed to expose Production mode functionality to external processes (other Windows applications). The card creation apparatus 40 exposes Production functionality by enabling the system to be a DDE server. Limited functionality is available such as selecting a badge form, entering data into the production window, transferring control to the apparatus 40 for capture and printing, and data retrieval from the production window. Badge forms associated with a database are not supported.

The inputs to the DDE option come in the form of commands from a DDE client. Third-party developers can create DDE clients using published information about the apparatus 40.

The output of the DDE comes in the form of automated Production. The results of such automation depends on the implementation of the DDE client.

This document defines a DDE API/interface for Production. Client applications will be able to issue DDE Execute commands to control the production window. Client applications will be given the following abilities through the DDE interface:

Bring up the production window and select a badge type

Fill in fields of the production window with information

Transfer control to Card creation apparatus 40 to capture fields and print cards Retrieve data that was entered by the user Before calling any DDE Commands, Client applications must determine whether or not Card creation apparatus 40 is currently executing. If it is not, then call WinExec to load the Card creation apparatus 40 executable. When Card creation apparatus 40 is loaded it will register its service name "Card creation apparatus" and topic ("Production"). Client applications must call DdeConnect using "Card creation apparatus" and "Production" before calling any of the DDE commands.

Parameters MUST be enclosed in quotes or else the command will not be parsed correctly.

The card creation apparatus 40 DDE interface will consist of a set of execute command handlers—each of the commands are described below. Note: each parameter must be enclosed in quotes.

STARTCARD

Description

Tells Card creation apparatus 40 to start a new card using Badge Name (the passed parameter) as the selected badge type. If the production window is active and Badge Name is the selected badge type then the production window will get cleared.

STARTCARD can be used in two ways. The first way is to call STARTCARD at the beginning of every card, even if the badge type does not change—this is recommended. The advantage to this is that the production window is cleared at the beginning of each new card. The second way is to only call STARTCARD when the badge type changes.

Parameters
  Badge Name—corresponds to Badge Name in the link definition

Return values
  Placed onto the clipboard (format=CF_TEXT)
  OK
  ERROR 001: Invalid number of parameters
  ERROR 002: Unable to access production window
  ERROR 003: Badge name not found
  ERROR 006: Database connection not allowed Sample execute strings
  [STARTCARD ("EMPLOYEE")]
  [STARTCARD ("NEW EMPLOYEE")]

FILLFIELD

Description

This command allows client applications to pass information to Card creation apparatus 40. FILLFIELD will associate Text Data (a passed parameter) with the field specified by Field Name (a passed parameter). If Field Name is a text field, then Text Data should be a text string. If Field Name specifies a capture field, then Text Data should be a pathname denoting a captured image.

Parameters
  Field Name—corresponds to Field Name in the link definition
  Text Data—the data to put into the field Return values
  Placed onto the clipboard (format=CF_TEXT)
  OK
  ERROR 001: Invalid number of parameters
  ERROR 004: Field name not found
  ERROR 007: Error translating image Sample execute strings
  [FILLFIELD ("FIELD NAME", "Fred Murray")]
  [FILLFIELD ("FIELD1", "Fred")]

DOCARD

Description

This command will make the Card creation apparatus 40 production window the active window. The user will then be able to complete the data entry (to capture fields and fill text fields) and press the print or exit button. The data transferred with previous FILLFIELD commands will be displayed in the production window.

After the user presses PRINT or EXIT, Card creation apparatus 40 will ignore all user input (it will respond to dde execute messages though) until either an ABORT, STARTCARD, or FILLFIELD is called. The way that I forsee the DOCARD command to be used is as follows:

Call STARTCARD and FILLFIELD(s)

Call DOCARD

Create a timer and call STATUS from the timer function

When a status of PRINT PRESSED is received call GETFIELD(s) to retrieve desired fields.

For another card call STARTCARD or to end dde call ABORT

Parameters
  None

Return values
  STATUS must be called to get the return value.
  NOT COMPLETE
  PRINT PRESSED
  EXIT PRESSED
  ERROR 005: No card selected Sample execute strings
  [DOCARD]
  [DOCARD()]

STATUS

Description

This command returns the current status of the DOCARD command. How to use the STATUS command: the client application will execute a DOCARD command, create a timer, and then call the STATUS command until the clipboard contains something other than NOT COMPLETE.

Parameters
  None

Return values
  Placed onto the clipboard (format=CF_TEXT)
  Same as DOCARD

Sample execute strings
  [STATUS]
  [STATUS()]

GETFIELD

Description

This command allows client applications to retrieve information from the Card creation apparatus 40 production window. GETFIELD will put the data associated with Field Name (a passed parameter) onto the clipboard. If the field is an image field and no image has been selected then "ERROR 008: No Image" is returned on the clipboard.

Note that the image files generated by Card creation apparatus 40 are JPEG files (generated by the Accusoft Image Format Library). Also, the image filenames that Card creation apparatus 40 generates will be reused when a new card is created, so copy (or rename) the files that are returned.

Parameters
  Field Name—field name to retrieve information from.

Return values
  Placed onto the clipboard (format=CF_TEXT)
  ERROR 001: Invalid number of parameters
  ERROR 004: Field name not found
  ERROR 005: No card selected
  ERROR 007: Error translating image
  ERROR 008: No Image text containing the information Sample execute strings
  [GETFIELD ("FIELD1")]
  [GETFIELD ("FIELD 1")]

ABORT

Description

Throw away any current information and return Card creation apparatus 40 into interactive mode.

Parameters
  None

Return values
  OK

Sample execute strings
  [ABORT]

SHOWQW

Description

Command Card creation apparatus 40 to minimize, maximize, or restore itself. This command can be used by a client application to minimize Card creation apparatus 40 when the client application needs to take control.

Parameters
  Command—can be MIN, MAX, or RESTORE

Return values
  OK
  ERROR 001: Invalid number of parameters

Sample execute strings:
  [SHOWQW ("MIN")]
  [SHOWQW ("RESTORE")]

SHOWBUTTON

Description

Command the Production window to show (make visible) or hide the buttons that are available on the Production window. Note that all buttons are visible after a call to STARTCARD which changes the Badge Name.

Parameters
  Button—CLEAR, PRINT, or EXIT
  Action—SHOW or HIDE

Return values
  OK
  ERROR 001: Invalid number of parameters
  ERROR 005: No card selected
  ERROR 009: Invalid button Sample execute strings
  [SHOWBUTTON ("CLEAR", "HIDE")]
  [SHOWBUTTON ("PRINT", "SHOW")]

The DDE commands must be properly sequenced, or else the DDE interface will not function correctly. The example usage of the DDE API calls use the EMPLOYEE badge that is included with Card creation apparatus 40 as an example. The example follows.

First, start up Card creation apparatus 40 and minimize it.

Next, start up the Clipboard Viewer (to see the return codes)

Then start up the utility to send DDE execute commands

Via the utility, send the following DDE commands:

[STARTCARD("EMPLOYEE")]

[FILLFIELD("FIRSTNAME", "John")]

[FILLFIELD("LASTNAME", "Smith")]

[FILLFIELD("Bar", "12345")]

[DOCARD]

The DOCARD command results in Card creation apparatus 40 being maximized and getting activated. The image field on the card can then be captured and the card printed.

[STATUS]

When the DOCARD command is sent, a windows timer should be created. On each timer tick call the STATUS command until the STATUS command returns something other than NOT COMPLETE.

[GETFIELD("IMAGE")]
  (image filename is returned in the clipboard)

[STARTCARD("EMPLOYEE")]

Starting another card of the same card type—this call will clear all fields.

The DDE API gives customers the ability to put information onto and get entered information off of the Production window. Customers can be provided with solutions for environments that don't support ODBC.

Some limitations on the DDE API exist, including:

No database support—a badge that is connected to a database can not be used by the DDE interface.

The card creation apparatus 40 DDE interface will only drive the Production window in the preferred embodiment.

Does not support multiple execute commands in one execute string.

Does not work with international strings.

No signature capture support

It will be appreciated by those skilled in the art that the DDE API may be given the ability to control the Production window without having to transfer control to it. Some of the required commands for this capability are:

CAPTUREFIELD: brings up capture dll associated with passed field.

DOPRINT: send information to the card printer without bringing up Card creation apparatus 40

DOPREVIEW: bring up Card Preview window, again without bringing up Card creation apparatus 40.

Having read the foregoing description, it is to be understood that even though numerous characteristics and advantages of various embodiments in accordance with principles of the invention have been set forth in the foregoing description, together with details of the structure and function of the invention, the disclosure is illustrative only and changes may be made in detail, especially in matters of shape, size and arrangement of the parts within the principles of the invention to the full extent indicated by the broad general meaning of the terms in which the appended claims are expressed.

What is claimed is:

1. A method of creating a card, comprising the steps of:
   (a) interactively creating a predetermined card design by displaying the predetermined card design and modifying specific positions on a planar surface of a card for each layout frame of a video picture, cardholder information fields, and static fields;
   (b) capturing cardholder information corresponding to the cardholder information fields;
   (c) previewing an image of a card having the predetermined card design including the video picture, cardholder information, and static fields within the predetermined card design substantially as can be printed; and
   (d) printing the card.

2. A card creation apparatus, comprising:
   (a) microprocessor means for controlling operation of the card creation apparatus based on a predetermined card design which specifies positions on a planar surface of a card for layout frames of a video picture and cardholder information fields which are to be printed on the card, the microprocessor means including design means for interactively creating the predetermined card design by displaying the predetermined card design to a user and modifying specific positions on a planar surface of a card for each layout frame of the video picture and the cardholder information fields in response to several user commands of a plurality of user commands;
   (b) input means, operatively coupled to the microprocessor means, for inputting to the microprocessor means the plurality of user commands and cardholder information corresponding to the cardholder information fields;
   (c) video camera means, operatively coupled to the microprocessor means, for obtaining a video picture of a subject; and
   (d) display means, operatively coupled to the microprocessor means, for displaying an image of the predetermined card design including the video picture and cardholder information within the predetermined card design substantially as can be printed in response to one user command of the plurality of user commands.

3. The card creation apparatus of claim 1 wherein the design means comprises means for placing static fields in the predetermined card design such that a card background can be specified for use with several related cards.

4. The card creation apparatus of claim 3 wherein the microprocessor means selects a card background from a plurality of card backgrounds based on contents of cardholder information associated with a particular cardholder.

5. The card creation apparatus of claim 1 wherein the design means comprises means for designating a particular cardholder information field in the predetermined card design as a bar code field.

6. The card creation apparatus of claim 5 wherein the bar code field is a black on black bar code.

7. The card creation apparatus of claim 1 wherein the microprocessor means further comprises database interface means for storing and retrieving the cardholder information in a card creation database.

8. The card creation apparatus of claim 7 wherein the microprocessor means further comprises a linker means for generating a link file and a Data Capture Window by selecting one predetermined card design from a plurality of predetermined card designs with associated cardholder information fields and subsequently determining particular sources for the cardholder information as well as particular storage destinations for the cardholder information in response to user commands.

9. The card creation apparatus of claim 8 wherein the linker means includes means for incorporating particular source and destination designations for the video picture in the link file and the Data Capture Window in response to user commands.

10. The card creation apparatus of claim 7 wherein the database interface means is open database connectivity (ODBC) compliant such that at least some customer information can be stored and retrieved from a database external to the card creation apparatus.

11. The card creation apparatus of claim 1 wherein the microprocessor means comprises a filter means for extending functionality of the card creation apparatus beyond a core set of features.

12. The card creation apparatus of claim 1 wherein the microprocessor means comprises an external command means for exposing a core set of features of the card creation apparatus to function calls external to the card creation apparatus.

13. The card creation apparatus of claim 1 further comprising interface means, operatively coupled to the video camera means and the microprocessor means, for storing the video picture into a memory of the microprocessor means in response to another user command of the plurality of user commands.

14. The card creation apparatus of claim 13 wherein the microprocessor means further comprises Chroma Key processing means for editing the stored video picture to revise a picture background of the video picture with another picture background and subsequently storing the edited video picture in place of the stored video picture in the memory of the microprocessor means.

15. The card creation apparatus of claim 13 wherein the microprocessor means further comprises post-exposure processing means for editing the stored video picture to alter an average light intensity level of the video picture and subsequently storing the edited video picture in place of the stored video picture in the memory of the microprocessor means.

16. The card creation apparatus of claim 13 wherein the microprocessor means further comprises image processing means for editing by scaling and cropping the stored video picture and subsequently storing the edited video picture in place of the stored video picture in the memory of the microprocessor means.

17. The card creation apparatus of claim 1 wherein the microprocessor means further comprises automatic data input means for enhancing cardholder information input through the input means.

18. The card creation apparatus of claim 17 wherein the automatic data input means comprises means for providing a default value in one of the cardholder information fields.

19. The card creation apparatus of claim 17 wherein the automatic data input means comprises means for adjusting a font size assigned to a particular cardholder information field in the predetermined card design when data input to the particular cardholder information field exceeds a predetermined character length.

20. The card creation apparatus of claim 17 wherein the automatic data input means comprises means for automatically incrementing a numeric value in a particular cardholder information field when an associated card is printed.

21. The card creation apparatus of claim 17 wherein the automatic data input means comprises means for generating revised contents of a particular cardholder information field based on data input to the particular cardholder information field through the input means.

22. The card creation apparatus of claim 1 further comprising printer means, operatively coupled to the microprocessor means, for printing on a card the predetermined card design including the video picture and cardholder information within the predetermined card design substantially as can be printed in response to another user command of the plurality of user commands.

23. The card creation apparatus of claim 22 wherein the printer means comprises means for interpreting an Encapsulated PostScript file which describes the predetermined card design including the video picture and cardholder information within the predetermined card design to be printed.

24. The card creation apparatus of claim 22 wherein the microprocessor means comprises means for selecting between at least two printer means such that cards can be printed from at least two different printing means.

25. The card creation apparatus of claim 1 further comprising signature capture means, operatively coupled to the microprocessor means, for obtaining a video picture of a subject's signature from a pressure sensitive pad.

26. The card creation apparatus of claim 1 further comprising scanner means, operatively coupled to the microprocessor means, for obtaining a video picture of a subject from a still photograph.

27. The card creation apparatus of claim 26 wherein the microprocessor means comprises means for rotating an orientation of the video picture from the scanner means such that orientation within the predetermined card design of the video picture can be modified.

28. The card creation apparatus of claim 26 wherein the scanner means is compatible with a protocol for exchanging information between the microprocessor means and the scanner means such that hardware within the scanner means is directly accessed by at least one user command from the plurality of user commands.

29. The card creation apparatus of claim 1 wherein the microprocessor means comprises security means for restricting access to different functions within the card creation apparatus based on individual user passwords.

30. A card creation apparatus, comprising:
 (a) input means for inputting a plurality of user commands and cardholder information;
 (b) microprocessor means, operatively coupled to the input means, for controlling operation of the card creation apparatus based on a predetermined card design, the microprocessor means including design means for interactively creating the predetermined card design by displaying the predetermined card design to a user and modifying specific positions on a planar surface of a card for each layout frame of a video picture and cardholder information fields which stipulate the cardholder information to be printed on the card in response to several user commands of the plurality of user commands;
 (c) video camera means for obtaining a video picture of a subject;
 (d) interface means, operatively coupled to the video camera means and the microprocessor means, for storing the video picture into a memory of the microprocessor means in response to another user command of the plurality of user commands;
 (e) display means, operatively coupled to the microprocessor means, for displaying an image of the predetermined card design including the stored video picture and cardholder information within the predetermined card design substantially as can be printed in response to one user command of the plurality of user commands; and
 (f) printer means, operatively coupled to the microprocessor means, for printing on a card the predetermined card design including the stored video picture and cardholder information within the predetermined card design substantially as can be printed in response to another user command of the plurality of user commands.

31. The card creation apparatus of claim 30 wherein the design means comprises means for placing static fields in the predetermined card design such that a card background can be specified for use with several related cards.

32. The card creation apparatus of claim 31 wherein the microprocessor means selects a card background from a plurality of card backgrounds based on contents of cardholder information associated with a particular cardholder.

33. The card creation apparatus of claim 30 wherein the design means comprises means for designating a particular cardholder information field in the predetermined card design as a bar code field.

34. The card creation apparatus of claim 30 wherein the microprocessor means further comprises database interface means for storing and retrieving the cardholder information in a card creation database.

35. The card creation apparatus of claim 34 wherein the microprocessor means further comprises a linker means for generating a link file and a Data Capture Window by selecting one predetermined card design from a plurality of predetermined card designs with associated cardholder information fields and subsequently determining particular sources for the cardholder information and video picture as well as particular storage destinations for the cardholder information and video picture in response to user commands.

36. The card creation apparatus of claim 34 wherein the database interface means is open database connectivity (ODBC) compliant such that at least some customer information can be stored and retrieved from a database external to the card creation apparatus.

37. The card creation apparatus of claim 30 wherein the microprocessor means comprises a filter means for extending functionality of the card creation apparatus beyond a core set of features.

38. The card creation apparatus of claim 30 wherein the microprocessor means comprises an external command means for exposing a core set of features of the card creation apparatus to function calls external to the card creation apparatus.

39. The card creation apparatus of claim 30 wherein the microprocessor means further comprises Chroma Key processing means for editing the stored video picture to revise a picture background of the video picture with another picture background and subsequently storing the edited video picture in place of the stored video picture in the memory of the microprocessor means.

40. The card creation apparatus of claim 30 wherein the microprocessor means further comprises post-exposure processing means for editing the stored video picture to alter an average light intensity level of the video picture and subsequently storing the edited video picture in place of the stored video picture in the memory of the microprocessor means.

41. The card creation apparatus of claim 30 wherein the microprocessor means further comprises image processing means for editing by scaling and cropping the stored video picture and subsequently storing the edited video picture in place of the stored video picture in the memory of the microprocessor means.

42. The card creation apparatus of claim 30 wherein the microprocessor means further comprises automatic data input means for enhancing cardholder information input through the input means.

43. The card creation apparatus of claim 42 wherein the automatic data input means comprises a mechanism selected from the group consisting of:

(a) means for providing a default value in one of the cardholder information fields;

(b) means for adjusting a font size assigned to a particular cardholder information field in the predetermined card design when data input to the particular cardholder information field exceeds a predetermined character length;

(c) means for automatically incrementing a numeric value in a particular cardholder information field when an associated card is printed; and (d) means for generating revised contents of a particular cardholder information field based on data input to the particular cardholder information field through the input means.

44. The card creation apparatus of claim 30 wherein the printer means comprises means for interpreting an Encapsulated PostScript file which describes the predetermined card design including the video picture and cardholder information within the predetermined card design to be printed.

45. The card creation apparatus of claim 30 wherein the microprocessor means comprises means for selecting between at least two printer means such that cards can be printed from at least two different printing means.

46. The card creation apparatus of claim 30 further comprising signature capture means, operatively coupled to the microprocessor means, for obtaining a video picture of a subject's signature from a pressure sensitive pad.

47. The card creation apparatus of claim 30 further comprising scanner means, operatively coupled to the microprocessor means, for obtaining a video picture of a subject from a still photograph, the scanner means being compatible with a protocol for exchanging information between the microprocessor means and the scanner means such that hardware within the scanner means is directly accessed by at least one user command from the plurality of user commands.

48. The card creation apparatus of claim 30 wherein the microprocessor means comprises security means for restricting access to different functions within the card creation apparatus based on individual user passwords.

* * * * *